(12) United States Patent
Mishelevich

(10) Patent No.: US 12,407,543 B2
(45) Date of Patent: *Sep. 2, 2025

(54) INTERNET OF THINGS APPLIANCE PROVIDING EXTENDED-CAPABILITY MESSAGING

(71) Applicant: David J. Mishelevich, Playa Del Rey, CA (US)

(72) Inventor: David J. Mishelevich, Playa Del Rey, CA (US)

(73) Assignee: KinnecTed AI Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,311

(22) Filed: Dec. 30, 2024

(65) Prior Publication Data
US 2025/0132945 A1    Apr. 24, 2025

Related U.S. Application Data

(63) Continuation-in-part of application No. 18/634,944, filed on Apr. 14, 2024, now Pat. No. 12,184,445,
(Continued)

(51) Int. Cl.
*H04L 12/28* (2006.01)
*G05B 19/418* (2006.01)
*G16Y 40/35* (2020.01)

(52) U.S. Cl.
CPC .......... *H04L 12/283* (2013.01); *G05B 19/418* (2013.01); *G16Y 40/35* (2020.01); *G05B 2219/2642* (2013.01)

(58) Field of Classification Search
None
See application file for complete search history.

(56) References Cited

U.S. PATENT DOCUMENTS 10,063,640 B2    8/2018    Chen et al.
10,230,681 B2    3/2019    Ge et al.
(Continued)

FOREIGN PATENT DOCUMENTS

WO    WO2019097546 A1    5/2019
WO    WO2024030873 A1    2/2024

OTHER PUBLICATIONS

Tunc, Uzlu and Ediz Saykol, 19th International Conference on Computational Intelligence and Communication Networks (CICN), Sep. 16-17, 2017, Girne, Northern Cyprus, pp. 93-96.
(Continued)

*Primary Examiner* — Walter J Divito

(57) ABSTRACT

To effectively operate in an increasingly prolific Internet of Things environment, one best has the ability to message, whether device status, actions taken, recommendations for actions or other information to those with a need to know or respond to device-execution instructions. Traditional messaging such as texting and e-mail typically are limited in that they can neither provide automatic audio output to the recipient nor can they may be automatically relayed or contain execution instructions for target devices. The present invention is an appliance that communicates with other IoT devices that provides Extended-Capability Messaging with these capabilities and can include AI and optionally configured in a secure version. Artificial-Intelligence elements of a variety of types can be included in Extended-Capability Messaging Appliances and these and other AI elements constitute a Hybrid AI Backbone. The Hybrid AI Integrator in takes results from multiple Artificial Intelligence elements and develops one or more conclusions.

29 Claims, 39 Drawing Sheets

Related U.S. Application Data which is a continuation-in-part of application No. 18/357,115, filed on Jul. 22, 2023, now Pat. No. 11,962,432.

(60) Provisional application No. 63/391,788, filed on Jul. 24, 2022.

(56) References Cited

U.S. PATENT DOCUMENTS

| | | |
|---|---|---|
| 10,901,380 B2 | 1/2021 | Kim et al. |
| 10,944,638 B1 | 3/2021 | Chamarajnager |
| 10,944,746 B1 | 3/2021 | Zhuang |
| 11,055,447 B2 | 7/2021 | Jain et al. |
| 11,146,416 B2 | 10/2021 | Li et al. |
| 11,276,001 B1 | 3/2022 | Sutherland |
| 11,373,045 B2 | 6/2022 | Bealby-Wright |
| 11,736,523 B2 | 8/2023 | Sites |
| 11,803,363 B2 | 10/2023 | Mathad et al. |
| 2014/0308930 A1* | 10/2014 | Tran .................. H04W 4/50 455/414.1 |
| 2016/0195881 A1 | 7/2016 | Britt et al. |
| 2018/0234260 A1 | 8/2018 | McLaughlin et al. |
| 2020/0228485 A1 | 7/2020 | Ge et al. |
| 2021/0356279 A1 | 11/2021 | Szigeti |
| 2022/0237523 A1 | 7/2022 | Kwon et al. |
| 2022/0245459 A1 | 8/2022 | Laskaridis |
| 2023/0000028 A1 | 1/2023 | Benassi |
| 2023/0154464 A1 | 5/2023 | Han et al. |
| 2023/0169402 A1 | 6/2023 | Mathur |
| 2023/0409983 A1 | 12/2023 | Aradhyula |

OTHER PUBLICATIONS

Amit Levy, Bradford Campbell, Branden Ghena, Daniel B. Giffin, Pat Pannuto, Prabal Dutta, and Philip Levis. 2017. Multiprogramming a 64 kB Computer Safely and Efficiently. In Proceedings of SOSP '17. ACM, New York, NY, USA, 2017 18 pages. https://doi.org/10.1145/3132747.3132786.

Pwavodi, Joshua, Ibrahim, Abdullahi Umar, Pwavodi, Pwadubashyiyi Coston, Al-Turjman, Fadi and Ali Mohand-Said, "The role of artificial intelligence and IoT in prediction of earthquakes: Review." Artificial Intelligence in Geosciences, 5 (2024) 100075, 19 pages, KeAi Communications Co., China.

Abdulmalek, S.; Nasir, A.; Jabbar, W.A.; Almuhaya, M.A.M.; Bairagi, A.K.; Khan, M.A.-M.; Kee, S.-H., "IoT-Based Healthcare Monitoring System towards Improving Quality of Life: A Review," Healthcare 2022, 10, 1993, pp. 1-32, MDPI, Switzerland https://doi.org/10.3390/healthcare10101993.

Rosie Dobson, PHD; Robyn Whittaker, PHD; Lorien C Abroms, DSC; Dale Bramley, MBCHB; Caroline Free, PHD; Hayden Mcrobbie, PHD; Melanie Stowell, MSC; Anthony Rodgers, PHD, "Don't Forget the Humble Text Message: 25 Years of Text Messaging in Health," Journal of Medical Internet Research, pp. 1-8, JMIR Publications, Canada.

* cited by examiner

| SensorActuatorOther | GenericDeviceType | GenericSubElement | Description | DataSent |
|---|---|---|---|---|
| Sensor | THM | T-Read | Temperature-Humidity-Motion | TemperatureValue |
| Sensor | THM | H-Read | Temperature-Humidity-Motion | HumidityValue |
| Sensor | THM | M-Read | Temperature-Humidity-Motion | MotionValue |
| Sensor | THM | ReadingAll | Temperature-Humidity-Motion | TakeReadings |
| Actuator | Valve-Flow | Flow-Rate | Watering Valve | FlowRate |
| Actuator | Valve-Flow | Flow-On | Watering Valve | ActuateValve-On |
| Actuator | Valve-Flow | Flow-Off | Watering Valve | ActuateValve-Off |

| Commercial | GenericDeviceType | GenericSubElement | SpecificPartNumber | SpecificInstruction |
|---|---|---|---|---|
| Company100 | THM | T-Read | C100-5334 | Sub-T |
| Company100 | THM | H-Read | C100-5334 | Sub-H |
| Company100 | THM | M-Read | C100-5334 | Sub-M |
| Company100 | THM | ReadingAll | C100-5334 | Sub-All |
| Company100 | Valve-Flow | Flow-On | C100-A1010 | AV-On500 |
| Company100 | Valve-Flow | Flow-Off | C100-A1010 | AV-Off500 |

FIG. 12A

| Installation | Appliance | SensorActuatorOther | EndDeviceType | CommericalVendor | SpecificPartNumber | EndDeviceID |
|---|---|---|---|---|---|---|
| Agri1 | Appl142256 | Sensor | THM | Company100 | C100-5334 | Sensor3447789 |
| Agri1 | Appl142256 | Sensor | THM | Company100 | C100-5334 | Sensor3447790 |
| Agri1 | Appl142256 | Sensor | THM | Company100 | C100-5334 | Sensor3447791 |
| Agri1 | Appl142256 | Sensor | THM | Company100 | C100-5334 | Sensor3447792 |
| Agri1 | Appl142256 | Actuator | Valve-Flow | Company100 | C100-A1010 | Actuator5653120 |
| Agri1 | Appl142256 | Actuator | Valve-Flow | Company100 | C100-A1010 | Actuator5653121 |

| SENSOR PROGRAMMING | | |
|---|---|---|
| | Param 1 | Param 2 |
| Register Sensor | Sensor ID | ID |
| Register Sensor Aggregator | Sensor Aggregator ID | ID |
| Appliance ID | ID | ID |
| Communications Method | Type | BTE |
| Primary Application | Application | ID |
| Set Sensor Sampling Rate | Samples Per Minute | 1 |
| Set Sensor Lower Limit for Alarm | Degrees F | 46 |
| Set Sensor Upper Limit for Alarm | Degrees F | 95 |
| Turn Sensor Off | T/F | T |
| Turn Sensor On | T/F | T |
| Read Sampling Rate | T/F | T |
| Read Sample | Temperature | |
| Low Threshold Triggered | T/F | F |
| High Threshold Triggered | T/F | F |

1520

| ACTUATOR PROGRAMMING | | |
|---|---|---|
| | Param 1 | Param 2 |
| Register Actuator | Actuator ID | ID |
| Register Actuator Aggregator | Actuator Aggregator ID | ID |
| Appliance ID | ID | ID |
| Communications Method | Type | Wireless |
| Primary Application | Application | ID |
| Initiate Action | T/F | T |
| Stop Action | T/F | F |
| Units | Angular Degrees | |
| Unit Step | Degree | 3 |

FIG. 15

(DATE/)TIME-SPECIFIC REMINDERS

SELECT CONFIGURATION — SELECT OR NEW — DROP DOWN (2010)

| SELECT DEVICE BY ID | SELECT-DATE | SELECT-TIME | DEVICE(/GROUP) INSTRUCTION(S) | MESSAGE TYPE | NOTIFICATION ID |
|---|---|---|---|---|---|
| DROP DOWN | Input or Date Picker | Input or Date Picker | DROP DOWN | DROP DOWN | DROP DOWN |
| Sensor Device S77-402 | 4/11/2022 | 1430 | Take Sensor Reading | Notify Group | N-1736 |
| Actuator Device Group A1893 | | 0600 | Turn-On 1/2 hour | Notify Group | N-1738 |

AUTOMATED REPLIES

SELECT CONFIGURATION — SELECT OR NEW — DROP DOWN (2110)

| SELECT DEVICE OR DEVICE GROUP BY ID | SELECT CATEGORY | SELECT SUBCATEGORY | MULTISELECT TARGETS |
|---|---|---|---|
| DROP DOWN | DROP DOWN | DROP DOWN | DROP DOWN |
| Sensor Device S77-402 | Send-Agri-Action | Manual Watering-20min | Actuator Device Grp A77-402 |
| Group 1427 | Environ-Response | Agri-Action-Notif-4 | Operations |
| Group 1427 | Environ-Response | Agri-Action-Notif-4 | Client-Mgmnt |

INTERNET OF THINGS APPLIANCE PROVIDING EXTENDED-CAPABILITY MESSAGING

CROSS REFERENCE TO RELATED APPLICATIONS

This is a Continuation-in-Part Non-Provisional Patent Application that claims benefit of Non-Provisional patent application Ser. No. 18/634,944 entitled "INTERNET OF THINGS APPLIANCE PROVIDING EXTENDED-CAPABILITY MESSAGING" filed Apr. 14, 2024 which in turn claims benefit of Non-Provisional patent application Ser. No. 18/357,115 entitled "INTERNET OF THINGS APPLIANCE PROVIDING EXTENDED-CAPABILITY MESSAGING" filed Jul. 22, 2023 which claims priority to Provisional Patent Application No. 63/391,788 filed Jul. 24, 2022, entitled "INTERNET OF THINGS APPLIANCE PROVIDING EXTENDED-CAPABILITY MESSAGING."

INCORPORATION BY REFERENCE

All publications, including patents and patent applications, mentioned in this specification are herein incorporated by reference in their entirety to the same extent as if each individual publication was specifically and individually cited to be incorporated by reference.

FIELD OF THE INVENTION

Described herein are systems and methods for messaging appliances with Artificial-Intelligence functionality for the Internet of Things.

BACKGROUND OF THE INVENTION

Computer-based transmission of messages developed over a period of time (first e-mail over Arpanet in 1971 and first text messages from a mobile phone in 1992). The number of devices capable of sending and/or receiving messages has grown tremendously and shows no sign of abating. Not only have the numbers of computers (desktops, laptops, and servers) and smartphones grown, the number of Internet of Things (IoT) is huge and it has estimated that by 2030, there will be 24.1 billion IoT devices in the world.

A set of Low Power Wide Area Network (LPWAN) communications protocols and devices such as LTE-M, NB-IoT, Sigfox, and LoRaWAN and associated infrastructure has been developed. LPWAN availability supports enabling connection of devices that require small quantities of data, low bandwidth, and long battery life (up to 10 years). It is possible to provide solar power as well for battery recharging. A number of IoT devices match these.

Operating-System Security

An important consideration is security. The vast majority of computer operating systems are based on the C/C++ languages. Inherently there is a danger of stack- and heap-based buffer overruns and return-oriented programming (van Oorschot, 2022). Memory leaks are a serious problem. While deployment of secure operating systems will come very slowly, Mozilla has sponsored the development of the Rust programming language (Klabik and Nichols, 2019) and it has been adopted by such entities as Amazon Web Services and Microsoft. Operating systems built upon Rust include Tock (Levy et al. 2017) and Redleaf (Narayanan et al., 2020).

Communications

Communications protocols have advanced significantly. A driving force has been the deployment of hundreds of millions of devices connected to sensors and the desire to communicate using low power. One way to utilize low power is efficiently getting communication to and from connected devices and another is to transmit and receive data at lower data rates.

One way to categorize communications in terms of required power is that Low Power Wide Area Networks (LPWAN) use protocols like LTE-M and NB-IoT and Normal Power Wide Area Networks (NPWAN) use protocols such as those like 4G and 5G that support regular cellular communications. Low-Power Wide-Area-Network elements/protocols are part of the LTE family. LTE stands for Long Term Evolution. It was first developed for use in 4G by the 3rd Generation Partnership Project (3GPP). With respect to sensor-related devices, LPWAN communications continuous significant growth.

Characteristics of some of LPWAN communications protocols are shown in the table 100 shown in FIG. 1. The columns are Communications Protocol Name 105, Data Throughput Rate 110, Range 115, Power Consumption 120, and Topology 125. Other such protocols will be developed in the future and the invention will apply to them as well. According to ABI (https://www.abiresearch.com/press/nb-iot-and-lte-m-issues-boost-lora-and-sigfox-near-and-long-term-lead-lpwa-network-connections/) by 2026, NB-IoT and LTE-M will capture over 60% of the 3.6 billion LPWA network connections. Of the remaining 40% share, LoRa and Sigfox will account for over 80% of the non-cellular LPWA network connections.

Use Cases

Extended-Capability Messaging supports use cases that involve sensors and actuators as well as IoT devices like smartphones and smartwatches whether they involve sensors or not. Of course, smartphones have a number of sensors or not such as acceleration sensing, compass-point sensing, light, and temperature.

Sensor-Based Use Cases

A table 200 of representative sensor-based use-case areas 205 is shown in FIG. 2. To support these, a large number of sensors are available, some, for example, for measuring temperature, motion, ambient light, humidy, barometric pressure, wind speed, location, electrical properties, magnetic properties, acceleration, physical location, compass heading, sound characteristics, chemical properties, and taking images.

There are many subcategories. For example, in the smart factory, reports on the status of lift trucks can be communicated including messages generated to workers such as it is time to plug in the lift truck for recharging. In the health arena, the magnitude and frequency of tremor can be transmitted to healthcare workers and other stakeholders for patients with Parkinson's Disease or essential tremor. In the world of greenhouses, temperature and monitoring of vapor pressure deficit are key.

Non-Sensor-Based Used Cases

A table 300 of representative non-sensor use cases 305 appears in FIG. 3. In some cases, the categories appear in sensor use cases as well. The non-sensor-based use cases primarily revolve around time-specific actions or operating devices (like turning on lights or unlocking a lock) where the status is not known before or after an action is taken (like whether a light is currently on or off or a lock is in a locked position or not). Actually, for cases involving time-specific reminders, there would be sensing involved if one considers a clock as "sensing time."

Iot Background

The term IoT (Internet of Things) has evolved to be extremely important because of the hundreds of millions of IoT devices. As applied to hardened industrial facilities the term has been expanded to lloT (Industrial Internet of Things). The term IoT will be used here whether could be classified at lloT or not.

Outstanding Problems

Several problems with current messaging systems include:
- Messages travel from node to node but are not relayed to further destinations
- No easy way to automatically send messages
- Messages are not verbalized for the recipient but remain in text
- Messages do not include GPS location information
- Messages not integrated with sensor or actuator data, if applicable
- Messages are not set up to carry instructions to sensors and actuators A critical consideration in IoT sensor-based applications is the importance of being able to generate effective messaging generated at the edge to get those who have a need to know notified immediately. Another aspect is the concept of messaging such as that of text, e-mail, or custom messages containing instructions to change the characteristics of a sensor (such as its sampling rate or what constitutes an alarm condition), determine processing, or to effect a change (like controlling activation for turning on a valve or a heater based on sensor determined conditions). In addition, a key need is to provide a vehicle for conveniently adding effective messaging to sensor and actuator environments. Thus, the need for an appropriate appliance for doing so, including the capability to message between a sensor and actuator directly so actions can be taken (like turning an actuator like a valve on) based on input from a sensor (like soil too dry) at the edge without sending sensor information to a regional or central server and have the instructions to the actuator sent from there.

SUMMARY OF THE INVENTION

The present invention provides a mechanism for those with a need to know to be messaged if there is either an immediate need to know or the given message target is included in the recipients for those messages. Such messages may be delivered in a secure manner. Extended-Capability Messaging Appliance (EC Messaging Appliance or ECM Appliance or ECMA) for transmitting and receiving extended-capability messages, that, unlike traditional messaging can be delivered in audio in addition to text if the recipient supports that and can be relayed. The innovation invention includes implementation of virtual Extended-Capability Messaging Appliance devices such as desktop computers, laptop computers, servers, smartphones, and Internet-of-Things devices with the same capabilities. A primary target of the invention is support of sensor-based applications. Connections between the Sensor Device or Sensor Aggregator and the Extended-Capability Messaging Appliance can be done though a wired or wireless connection (such as Bluetooth, Wi-Fi, or cellular) or the Appliance can either be a plug-in or integrated into the Sensor Device or Sensor Aggregator board. The same is true for an Actuator Device or Actuator Device Aggregator or a combining of Sensor and Actuator Device elements. The Sensor Aggregator can be an LPWAN gateway.

The entire universe of sensors are candidates for their data streams to be incorporated. examples are, but not limited to, sensing temperature, motion/acceleration, gravity, light, moisture, humidity, fluid level, vapor pressure, orientation, gyroscope, location sensor (e.g., GPS), compass heading, weight, pressure, magnetometer, barometer, acidity, compass reading, chemical characteristics, wind speed, radiation level, fingerprint, facial identification, imaging, and proximity. In certain situations, even short-range sensors like NFC and RFID Tag readers are applicable. Sometimes, applicable sensors will be built into devices such as smartphones. Among input devices are microphones, switches, and keyboards. Among output devices are vibration, sound annunciator, speaker, lights, valves, RF transmitter, electrical stimulation, ultrasound stimulation, and motors. Actuators are varied as well for effecting heating and cooling, turning on and off valves including the ability to regulate flow, unlocking and locking access portals, operating robots, raising or lowering of platforms, turning lights on and off and varying illumination, and regulating of vacuum. Covered applications are inherently IoT and depending on the context are lloT (Industrial Internet of Things). The (I) IoT ecosystem contains implementations and/or standards such as the OPA UA Foundation including its legacy OPA configurations into which Extended-Capability Messaging can be incorporated.

An example of the invention is a Sensor Device measuring humidity at a given soil depth, the associated Extended-Capability Messaging Appliance detecting that the soil moisture is too low and sending Extended-Capability Messages (optionally including GPS coordinates) to those with a need to know (e.g., operations, operations management, regional management, client). Further, the Extended-Capability Messaging Appliance can directly interact with an actuator turning an irrigation valve on or, if so configured, can interact with the actuator directly or send the ECMA associated with a non-local Actuator an Extended-Capability Message (ECM) with instructions to turn on the Actuator. This is an example of IoT computing/control at the edge rather than always involving a central server function. Such edge interactions can include Artificial Intelligence.

Artificial Intelligence (AI) applied locally or at a central server can include looking a Sensor Data patterns in a given agricultural operation or operations in a defined geographic region and have Machine Learning/Deep Learning detect patterns that offer predictive value as well as making recommendations for actions. AI can also be included on the server side in the form of Machine Learning, Deep Learning, Federated Learning, or Model-Based or Rule-Based Knowledge Base Systems. Other Big Data analysis tools could be applied as well.

The Extended-Capability-Messaging Appliance System is not meant to replace existing sensor systems but to integrate with them and augment their capabilities by adding functionality.

BRIEF DESCRIPTION OF THE DRAWINGS

FIG. 12A illustrates tables of configuration definitions containing generic device definitions and mapping to specific manufacturer's parts. FIG. 12B shows the definition of parts for a specific configuration.

FIG. 15 shows a user interface for encoding instructions for an agricultural sensor.

FIG. 20 illustrates a user interface for the message generation.

FIG. 21 shows a user interface for the configuration of automatically generated messages.

FIG. 50 shows a table of sensor-based use cases.

FIG. 51 shows a table of non-sensor-based cases.

DETAILED DESCRIPTION OF THE INVENTION

Introduction

Figure 1:
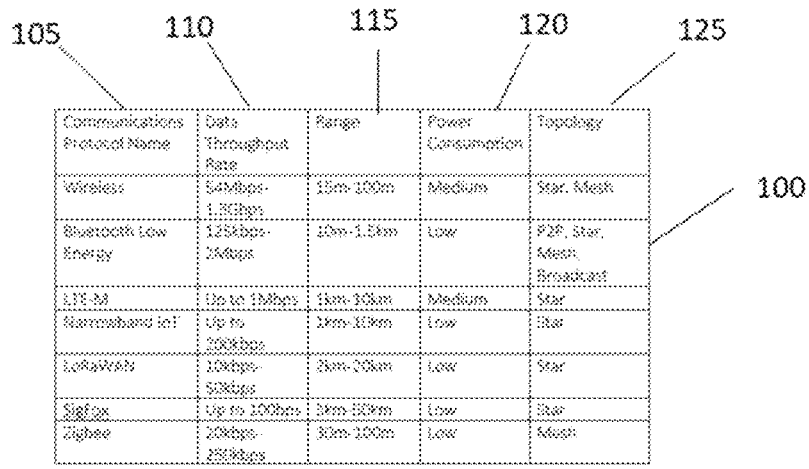
FIG. 1 shows a table of characteristics of some widely used Low Power Wide Area Network communications protocols.
Figure 2:
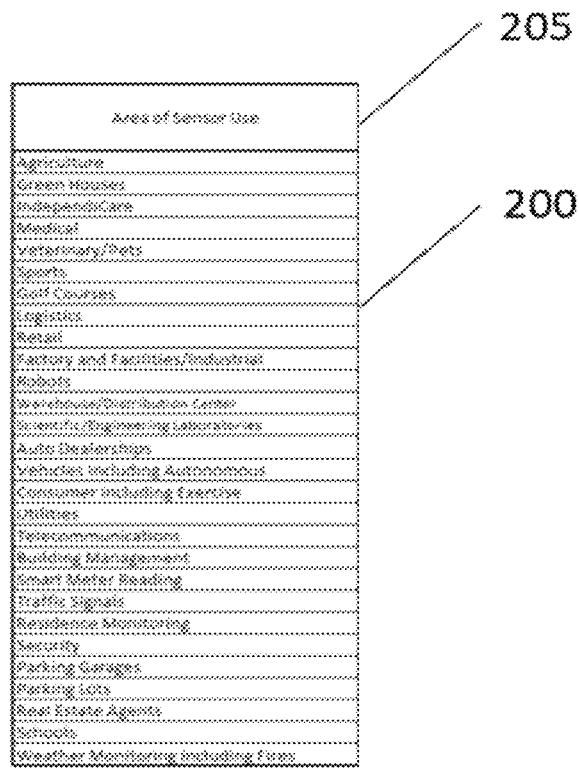
FIG. 2 shows a table of representative sensor-based use-case areas.
Figure 3:
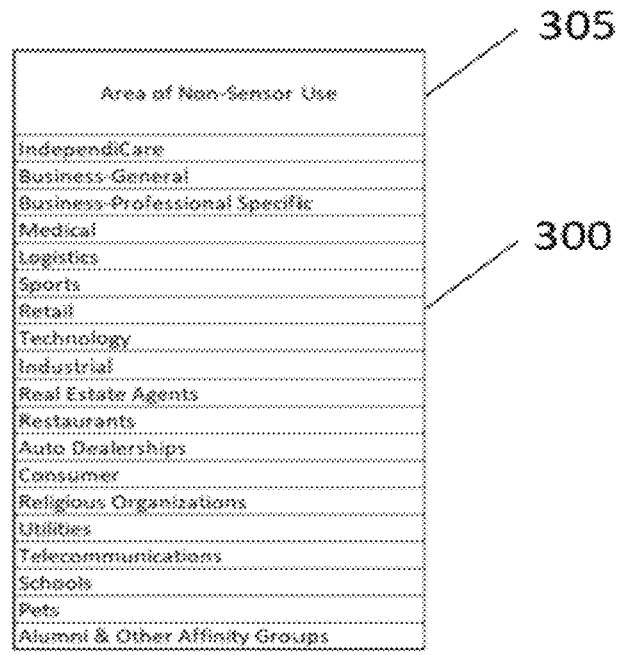
FIG. 3 shows a table of representative non-sensor-based use-case areas.

Extended-Capability Messages (ECMs) are dedicated to providing pertinent information to those with a need-to-know about a given circumstance so they can be in more control of their own destinies or deliver instructions to sensors or actuators and optionally transfer non-instructional data to and from such devices. An Extended-Capability Message (ECM) or EC Message may be initiated based on location considerations, time considerations, sensor-data conditions, and other criteria including volition of the message source for any reason. The invention is based on a distributed (usually Internet of Things (IoT) including Industrial IoT (IIoT)) architecture including, in most cases, one or more Extended-Capability Messaging Appliances (ECMA). IoT is understood to cover IIoT as well. Elements include a central web-server database with associated web-based applications with communications of programs and databases on one or a multiple of web and other servers with and among IoT devices, desktop or laptop computers, and other computing devices. IoT devices are understood non-phone-based IoT devices as well as smartphones. As to smartphones, IOS, Android Smartphones, or phones with other operating systems are included. EC Messages can be generated from Smartphone/other IoT devices, including smartphones to each other or through central web-based database. The invention, with its Extended-Capability Messaging Appliances, covers not only sending messages based on conditions related to sensor values but also the receipt of EC messages to change sensing characteristics (like increasing or decreasing the frequency of sampling or changing the threshold value in reference to wish an alarm would be generated). The invention further includes EC messages coming in to determine processing and control actuators (such as opening a door or closing a valve). The case is also included where an EC Message is generated from a sensor that a problem condition exists (such as a fluid level in a tank is too low) and instructions directed by an associated ECMA to an actuator communicated directly without having to be interpreted by a central-server function) (such as to turn on an input valve to a tank). The latter hybrid approach is example of computing at the edge to improve efficiency by decreasing the load on central servers who operationally may not need the information. In some cases, the sensor, actuator, and an EC Messaging Appliance can be collocated or even integrated. Among the categories of EC Message Appliance messages are instructions on processing within the EC Messaging Appliance as well as instructional messages to other IoT devices. Overall messages can be received, transmitted, or processed. Sources of messages are manifold and include programmed into the appliance device including in response to Input/Output (IO) conditions, received from another ECM Appliance, received from a non-ECM Appliance IoT device, downloaded from a regional database, downloaded from a central database, calculated internally, contained in any read-only memory, and generated by Artificial Intelligence. Instructions for generating messages can be downloaded partial or whole database, or obtained from an incremental update. Message actions are generated and transmitted by the remote ECM Appliance are triggered by one or more factors selected from the group consisting of time and location, instruction, Artificial Intelligence applied to available inputs, and meeting criteria in an analyzed sensor data stream. The instructions can cause one or more of informational-message actions such as audio, telephone, light output, vibration, visual display, text messages, text messages with indication of originating position based on GPS coordinates, e-mail messages, e-mail messages with indication originating positions based on GPS coordinates, forced notifications, images, binary, custom messages, operator actuators, operate robots, instructions to other ECM Appliances, instructions fo other IoT devices, and other messaging means. Message actions by the ECM Appliance are triggered by one or more of time, location, instruction, Artificial Intelligence, and meeting criteria in an analyzed sensor data stream-Messages are delivered via one or more of directly, other ECM Appliance, regional server, and central server with messages to targets being relayed or not relayed The general approach is to create new innovations to increase delivered value plus integrate with appropriate hardware and software solutions of others for overall benefit.

Definition of Extended-Capability Messaging

Extended-Capability Messages are of several types:
>>>Extended-Capability Messages where the messages are generated by conditions determined in an ECMA based on incoming data from a sensor. In response to such input (e.g., farm soil too dry), messages may be generated instructing an actuator to engage (e.g., turn a watering valve on) and to notify appropriate parties with a need-to-know sensor values and action taken). Messages sent to such stakeholders may be based on situations over an interval of time or average values rather than being sent for each single event.
>>>Extended-Capability Messages where the messages are sent to message targets where the receiving device has Extended-Capability Messaging-capability built with downloading of an Extended-Capability Messaging database such that contained to-be-triggered messages, can be triggered by events such as time or date and time, be delivered with audio, have the ability to be relayed with addition of GPS coordinates when messages are relayed forward. Intended recipients who have installed the Extended-Capability Messaging capabilities on their devices must also have given the potential Extended-Capability Message source permission to add database records to the potential Extended-Capability Messaging recipients database to be download. >>>Extended-Capability Messages can also contain instructions to sensor or actuator devices to change their behavior. An example of an instruction is triggering data collection or change sampling frequency. Message sources could be automatons for relaying purposes rather than people. This can be useful in the context in Artificial-Intelligence Agent configurations. It may also be used to send EC Messages to suitably equipped sensor and/or actuator aggregators. Simple Extended-Capability Messages where scheduled or immediate messages are sent directly from a source such as a smartphone or an ECMA connected to a sensor or actuator device to a target recipient, but not cannot be delivered with audio and GPS coordinates and cannot be relayed through to that target recipient's next level of recipients because the message target is not suitably equipped to interpret those messages for additional actions.

Triggering of Extended-Capability Messages

Triggering of Extend-Capability Messages can be accomplished with or without involvement of a downloaded database depending on the type of triggering. One or more of the following can trigger a message: matching a condition in the downloaded database such as finding a detected condition like reading of an RFID tag and associating with one or more Extended-Capability Messages (EC Messages or ECM) with condition being (a) detected from measurements from one or more sensors such as, but not limited to, GPS, RFID tag reader, beacon, accelerometer, pressure, weight, camera, electrical variable, magnetic variable, physical variable, physiological variable, (b) time detected (fixed, periodic, episodic) with condition satisfied by one or more, criteria such as, but not limited to (i) downloaded from a database and developed within the associated network, (ii) triggering one or more of messages of type, but not limited to, e-mail, calculated, AI-generated, audio, telephone, vibration, light, instructions to one or a more networked devices, and other to be delivered to one or more targets having a need to know selected from, but not limited to person and system for one or more purposes, such as, but not limited to, prompting/reminder a person to take action, prompting/reminding a person to pay attention, instructing a device to perform a given action, and instructing a system to perform a given action.

In some embodiments, skeletal messages are sent to a central-server complex where they are completed and recipients determined, if not already supplied, and distributed via an Extended-Capability Messaging Server (ECMS).

Functionality, there are several subtypes of Extended-Capability Messages.
>>>Sensor-data messages that are immediate (rather than being preplanned) and triggered according to criteria specified such as a sensor value being out of range. Sensor-Data Messages may be initiated on a time-specific basis such as sending the current value at 6 AM and 6 PM each day.
>>>Time-specific messages are daily (occur at the same time each day) or episodic (calendared on same or future day).
>>>Instruction-specific messages that deliver instructions to IoT devices for configuring or operating them such as set the sampling rate of a sensor, reading a sensor value, setting the flow rate of a valve actuator or turning that actuator on for two minutes or operating a robot.
>>>Location-specific messages are triggered by location (e.g., GPS or RFID-tag detection).

Messaging Mechanics

Extended-Capability Messages (ECM) contain information useful to the recipients (usually on a need-to-know basis) informing them events that have or are going to occur such as date/time-specific reminders including instructions to take actions or notifications that such actions have or are going to occur. The full content or message-content templates are held in a central database. In most cases, extracts from that database are packages into databases to be downloaded into Internet of Things devices of broad scope and including such devices as smartphones and ECM Appliances. A smartphone itself can be an ECM Appliance. A key consideration is that various mechanisms for messaging like Message Queuing Telemetry Transport (MQTT), Advanced Message Queuing Protocol (AMQP) and/or Open Platform Communications-Unified Architecture (OPC UA) can be employed in Appliances, if applicable and desired, but this is completely separate from and unrelated to Extend-Capability Messaging.

Figure 4:
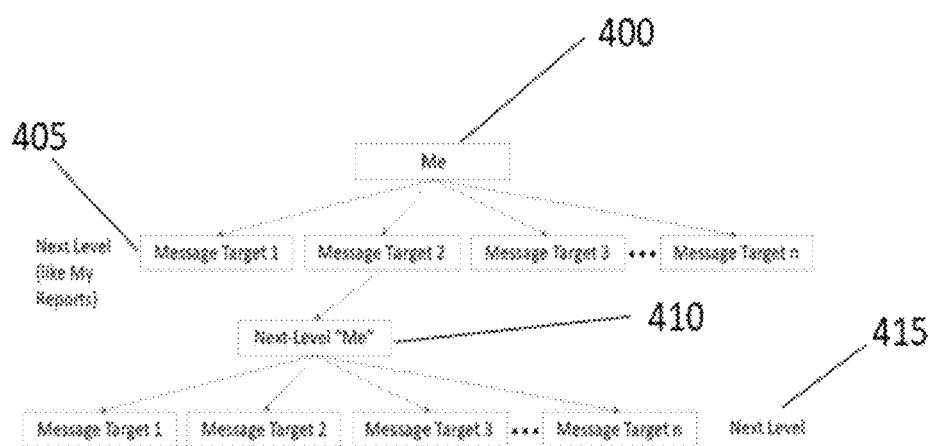
FIG. 4 shows the hierarchy of targets for Extended-Capability Messages as automatically generated.

The targets for Extended-Capability Messages are automatically generated through a hierarchical mechanism called cascaded messaging. In the hierarchy shown in FIG. 4 the targets are defined at each level by including specific individual or groups as targets, perhaps included in categories and subcategories. When categories/subcategories of recipients are designated, when they are passed on to a recipient who has an Extended-Capability-Messaging-Enabled Device will have the appropriate messages automatically related. If the originator 400 in FIG. 4 sends EC Messages in the "My Reports" category 405 to Message Targets in that row, a message recipient (which may be a group) at the next level 410 can further transmit the message to its Message Targets in row 415 based on the category or category/subcategory. Note that message originator 400 only knows the category/subcategory it designated, the ultimate targets are dynamically defined by the category/subcategory and does not know the actually target addresses unless copies are sent to the initiating messaging element at one or more levels above in the messaging hierarchy. Inferences can be made however, if say a category is say MY_REPORTS, the expectation may be that their own appropriate MY_REPORTS will successively ultimately receive those original messages. An ECM can be a message of any type, include instructions or not, and can be directed to a target outside the message hierarchy.

Interaction Among Database Tables

Figure 5:
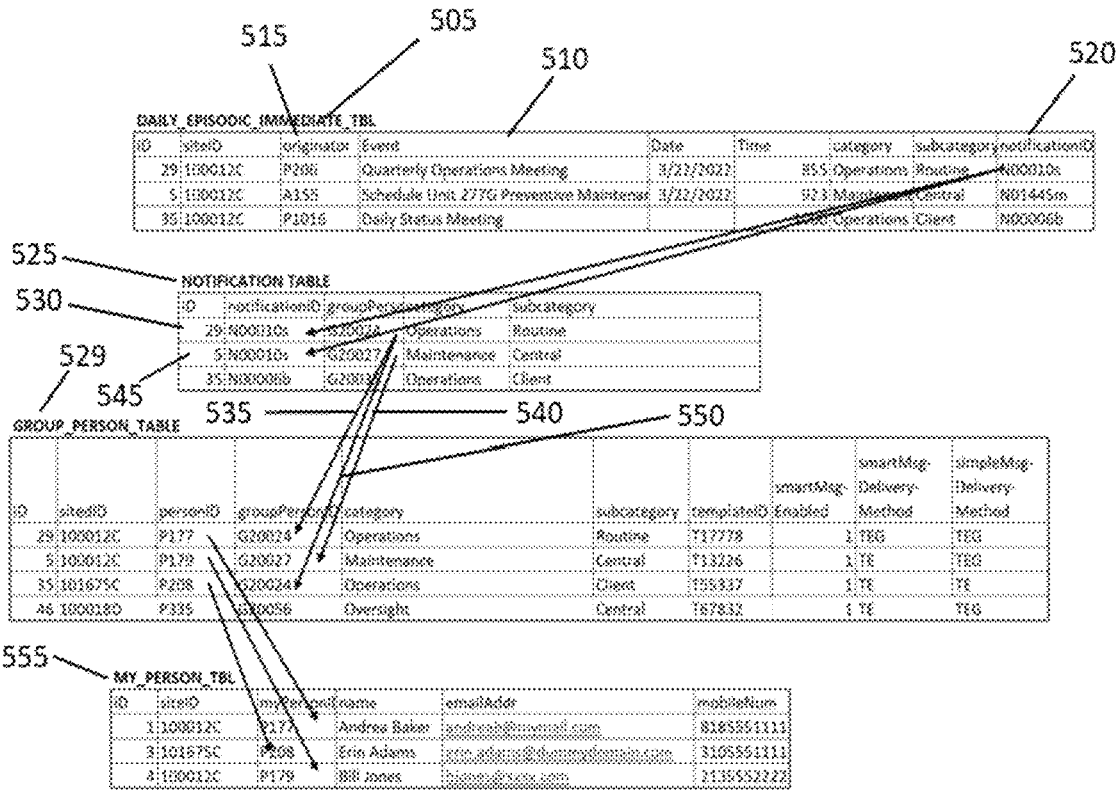
FIG. 5 demonstrates the relationship and interaction among the web-based central database tables.

FIG. 5 demonstrates the relationships and interactions among the web-based central database tables. The DAILY_EPISODIC_IMMEDIATE_TBL 505 represents tables that contain the events inserted into the database and subsequently messaged. In the case of the sample table, the events are time specific reminders to be delivered. In some cases, messages are generated by insertion of records based on the results of execution of instructions covered in the discussion and example of FIG. 6. In the example in FIG. 5, message events 510 are purely date/time specific such as "Schedule Unit 277G Preventive Maintenance using Protocol MPM-134." The originator 515 in this table is the originator of the given message and could be an applianceID or a personID. In the example of FIG. 5, each event is associated with a Notification ID 520, in this case, N00010s. This is pointer to the same Notification ID in the Notification Table 525. Row 530 with iD 29 lists the groupPersonID G20024, which provides pointers 535 and 540 to GROUP_PERSON_TABLE 529 to personID's P177 and P208. Row 545 with iD 5 lists the groupPersonID G20027 which provides a pointer 550 to personID P179. In the GROUP_PERSON_TABLE, person P179 has the Category of Maintenance and Subcategory of Central using Message Template T13226 with ECM enabled with ECM Delivery of TEG (meaning text, e-mail, and send GPS coordinates). The second relevant entry is person P177 having the Category of Operations and Subcategory of Routine using Message Template T12778 with ECM enabled with ECM Delivery of TEG (meaning text, e-mail, and send GPS Coordinates). The third relevant entry is person P208 having the Category of Operations and Subcategory of Client using Message Template T55337 with ECM enabled with ECM Delivery of TE (meaning text and e-mail). The Message Template is used where the EC Message is not complete unless the template is filled out in cases where say data from a sensor is to be inserted into a message. The selected persons have pointers to the MY_PERSON_TBL 538 so the e-mail addresses and mobile numbers for text addresses can be obtained. Person P179 from the MY_PERSON_TABLE 538 has name Bill Jones, e-mail address bions@xxxx.com, and mobile number 2135552222, Person P177 from the MY_PERSON_TABLE 538 has name Andrea Baker, e-mail address, andreab@mymail.com, and mobile number 8185551111, and Person P208 from the MY_PERSON_TABLE has name Erin Adams e-mail address crin.adams@dummydomain.com and mobile number 3105551111. The Notification Table can have more than one entry to point to more than one group_person_tbl to point to multiple entries in my_person_tbl from more than one group_person_table entry. The context is the notification message triggered by a timed alarm (or sensor value if not sent as an immediate EC Message. When the EC Message arrives at an EC Messaging Capable device such as a smartphone on which the EC Messaging App has been downloaded, the message will be delivered, if desired, in an audio format using Text-to-Speech (TTS) conversion. If target is not EC Message Enabled then message received as regular text message or e-mail. The MY_PERSON or other table includes login information, if required, to perform such as functions as to place an Extended-Capability Message into a database to be downloaded to the Appliance of an intended message recipient.

Figure 6:
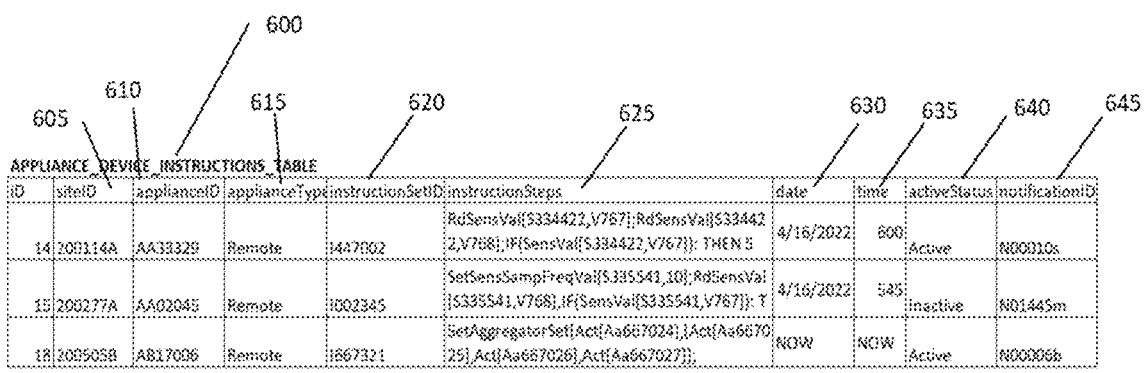
FIG. 6 shows the Appliance Device Instructions Table that contains the instructions for controlling sensors and actuators.

Instruction processing is a key element. For example, instructions may be delivered to a sensor and activator such as changing sensor sampling frequency or to instruct an actuator to turn on for 10 minutes if sensor humidity readings show earth dry. FIG. 6 shows an APPLIANCE DEVICE INSTRUCTIONS TABLE 600. Referring to FIG. 5, the messaging and connections for this table are handled in the same way as for the DAILY_EPISODIC_IMMEDIATE_TBL 505 in FIG. 5. Again, the iD is auto-incremented (as is the figure in this table, there may have been record deletions), there is siteID 605 for the given specific locations, the applianceID 610, applianceType 615 which will Remote or Central, the instructionSetID 620 which is the basis for the instructionSteps 625 that contains the specific instructions that are transmitted to the applicable sensors and/or actuators, date 630 and time 635 for transmission (date and time could be Now for immediate transmission), the activeStatus 640 which is Active or Inactive (a given status may be made Inactive for now but perhaps Activated in the future), and notificationID 645 that drives the messaging activities as covered in FIG. 5 in the way that the DAILY_EPISODIC_IMMEDIATE_TBL 505 does in FIG. 5.

Figures 7, 8:
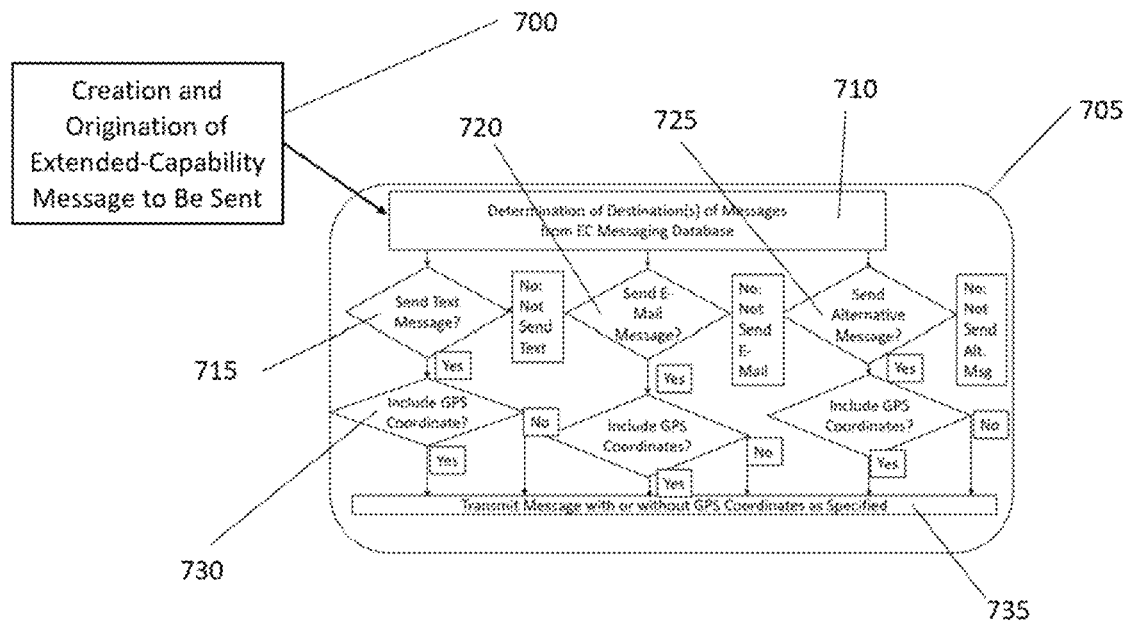
FIG. 7 shows the processing of various message types after the creation and origination of an Extended-Capability Message.
FIG. 8 illustrates a Log Table of events that have occurred.

FIG. 7 shows creation and origination of ECM to be transmitted 700 followed by subsequent processing 705 starting with 710 determinations of destinations for the messages. According the instructions contained in the ECM Data Base, the type(s) of message(s) are defined. For text message 715, if the answer of whether to include is No, no text message is sent. If the answer is Yes, a check is made as to whether GPS coordinates are to included or not 730. If the answer to that is Yes, the text message is sent with GPS coordinates in; if the answer is No, the text is sent without GPS coordinates in 735. For e-mail messages 720, if the answer of whether to include is No, no e-mail message is sent. If the answer is Yes, a check is made as to whether GPS coordinates are to included or not. If the answer is Yes, the e-mail is sent with GPS coordinates in 735; is the answer is No, the e-mail (including those to e-mail groups) is sent without GPS coordinates in 735. For alternative messages, if the answer of whether to include is No, no alternative message is sent. If the answer is Yes, a check is made as to whether GPS coordinates are to included or not. If the answer is Yes, the alternative message, such as instructions to a sensor or actuator, or a sensor or actuator aggregator, is sent in 735; is the answer is No, the alternative message is sent without GPS coordinates in 735. Examples of alternative messages are blog posts, Twitter messages, Facebook or other social media messages, including other messaging applications such as WhatsApp. The ECM database includes login information required, if any, to access those applications.

Log Table

FIG. 8 shows a Log Table. When an event occurs, whether time, location, or sensor/actuator triggered, an entry is inserted in the local and eventually the central log table. The entries in the table in FIG. 8 are iD 805, the siteID 810, the sourceID 815 (which, depending on the type of EC Message, may be a personID), the event itself 820, sensor/actuator status 825, date 830, and time 835. The triggers for sending EC Messages and thus generating insertion of entries into the Log Table maybe alert conditions developed during the processing of sensor data that may causes changes in actuator status as well. The Log Table allows the review and evaluation of the sequence of events and is a frequent source of data for Artificial-Intelligence processing. One mechanism for doing so is to play the sequence back (for example, sensor values or actuator status) on a geographic or schematic map. Another is to play the sequence back in dynamic tables, perhaps incorporated in a dashboard.

Iot-Based Systems

Figure 9:
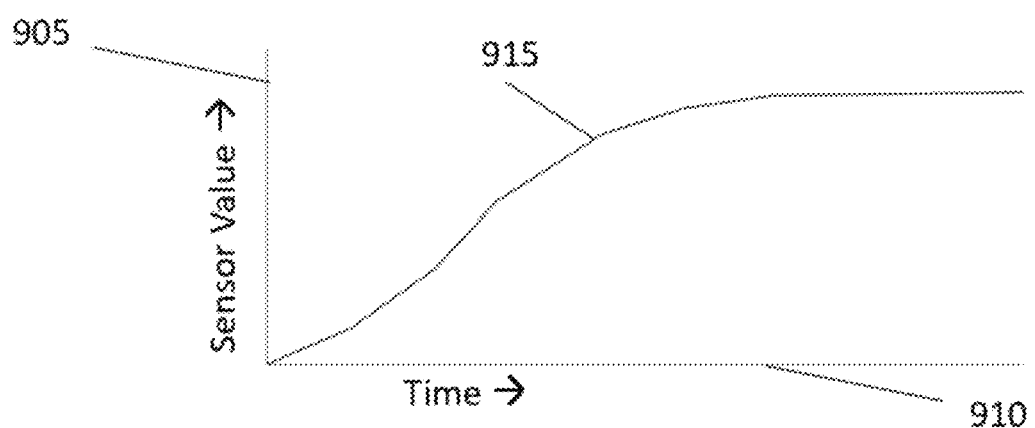
FIG. 9 shows a graph of a sensor value over time.

A critical context for Extended-Capability Messaging are IoT-based systems. These can be sensor-based systems gathering data from and allowing the selection of data to be transmitted or status message to be transmitted or control-based systems taking actions, perhaps based on that sensor-based information. For example, if an under-watering condition is detected, an Extended-Capability Message would be transmitted instructing a control-based device to irrigate for 15 minutes. In another implementation, as shown in the graph of FIG. 9 with sensor value 905 is plotted against time 910 resulting in line graph 915 where a sensor, instead of irrigating for a period of time, the sensor, for example, keeps taking readings at the designated interval (which may be changed over time) and the watering stopped when a plateau in moisture level or a specified level is reached.

For the purposes of this invention, a smartphone or a computer transmitting or receiving text, e-mail, or other messages is included in the scope of IoT devices.

Figure 10:
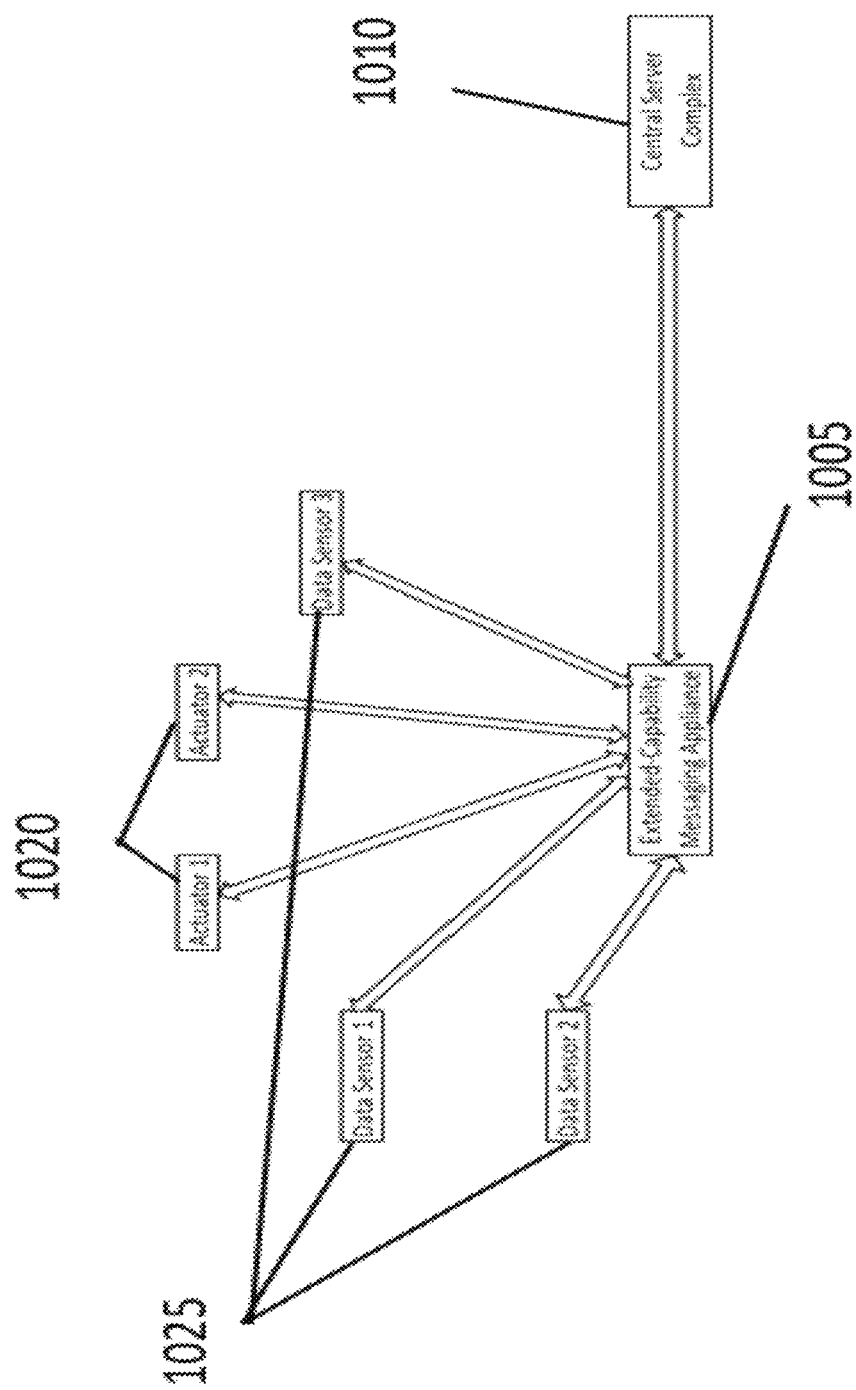
FIG. 10 illustrates a configuration of an Extended-Capability Messaging Appliance having input from multiple sensors with messaging interaction with a Central Server Complex.

FIG. 10 provides an example ECM configuration in the context of an IoT application where an ECM Appliance (ECMA) is deployed in conjunction with three sensors and two actuators Both sensors and actuators, as well as communications ports are input/output (IO) devices. Sensor IO and actuator IO describe communications with sensors and actuator devices. A hardware Appliance is used to allow use of sensors and actuators whose hardware and perhaps software would not have to be altered. This does not mean, however, that an Appliance plus sensor and/or actuator could not be contained in one form or another in a single assembly. Communications among the elements will generally be done with, but not restricted to, Low Power (LP) such as LoRa with parts are under a network management protocol such as Low-Power Wide Area Network (LPWAN). For the communications segment between the ECMA and the Central Server Complex, the use of an LPWAN approach like LoRaWAN (Long Range Wide Area Network) is likely to be used but conventional cellular communications such as 4G or 5G (categorized here as Normal Power Wide Area Network (NPWAN)) may be used. Other LPWAN protocols can be used such as NB-IoT (Narrow Band IoT) in Extended-Capability Messaging. Various transmission rates apply to different LPWAN communications means along with varying transmission distances and other factors. For example, NB-IoT uses communications frequencies that are licensed by the Federal Communications Commission while LoRaWAN uses unlicensed spectrum.

In FIG. 10, ECMA 1005 is prepared by downloading a database for local use containing relevant records for the given case extracted from a central database containing ECMs. Bilateral communications are provided to Central Server Complex 1010. Interactions are provided with sensors 1015 and actuators 1020. Messages of multiple types can be delivered based on the same action. For example, an EC Message of instructions may be sent to a sensor device to change its sampling frequency and in addition, EC Messages may be sent to those with a need to know that the instruction has been sent. Another scenario is where a time-specific reminder is sent to take a reading and that trigger sending an EC Message to those with a need to know with a report of the results. One type of message would contain instructions that one or more sensors, as applicable. Multiple messages mandating such a change in sampling frequency for a given set of sensors might be issued during a 24-hours period. Messages coming into ECM appliances, from a downloaded database or an alternative source such as another ECM appliance or server include instructions to IO devices, including iot devices, including messages to be delivered, conditions under which messages are to be delivered, timing of messages to be delivered, whether fixed or episodic variable, instructions for any executable purpose instructions for processing data within the ECM appliance device, Artificial Intelligence applied to available inputs including Large-Language Model input prompts and output text, location-specific prompts to be executed, time-specific prompts to be executed including downloading database with instructions and prompts from an external source, and uploading a database containing logged ECM appliance events, condition-specific prompts to be executed, instructions to download a database, with instructions and prompts from an external source.

Interactions Between ECM Appliance and Sensor-Data Devices

While most of the transmissions from a sensor to the ECM Appliance will be raw data with some processing to be performed in the ECM Appliance, a sensor may have output that is an alert that a threshold has been exceeded or may transmit data that has been designated as abnormal. In such cases, the ECM Appliance can be programmed accordingly. This includes handling some of the processing with information contained in the sensor-device specific PROM/ROM (not reprogrammable), EPROM (reprogrammable) or EEPROM (reprogrammable) included in the Appliance. In this specification PROM is understood to cover PROM, ROM, EPROM, and EEPROM. For reprogrammable devices, the ECM Appliance has the capable of downloading the reprogramming instructions (firmware) from the central database and executing them. Selected functions may be encoded in an FPGA or ASIC.

In some cases, the ECM Appliance will transmit the conclusion of its processing for processing in the sensor-data device and/or transmission over the sensor-data device normal communications channel. In embodiments for cases where the sensor processes information output by the ECM Appliance, changes in the sensor would need to be made, if not already included, to handle that output. In most circumstances, configured embodiments involving ECM Appliances will use unmodified sensors and actuators. The invention provides a unique approach to sensor and actuator handling that combines the communication of Extended-Capability Messages. Is not likely that SDD will send alert-condition values to its central location rather than raw data stream.

When a sensor transmits a sample result to the ECMA, the EMCA, based on instructions from a prior message, processes that result. Sample actions that might be taken are:

| If Sensor Sample Result | The Take Action |
| --- | --- |
| Sample in normal range (say soil wetness) | Do nothing or send ECM to target group A that sensor had value ___ that is in the specified normal range |
| Sample out of range but not critical (soil drying) | Send ECM to target group B (that may include A) that sensor had value ___ that |

| If Sensor Sample Result | The Take Action |
| --- | --- |
| | is out of specified normal range and if maintained, action will be taken |
| Sample out of range and critical (soil needs watering) | Send instructions to actuator (in this case a watering-valve actuator) to turn on and send ECM to target group B (that may include A) or group C that sensor had value ___ that is critically out of specified normal range and that an action of turning on the watering-valve action has been taken. |

Figure 11:
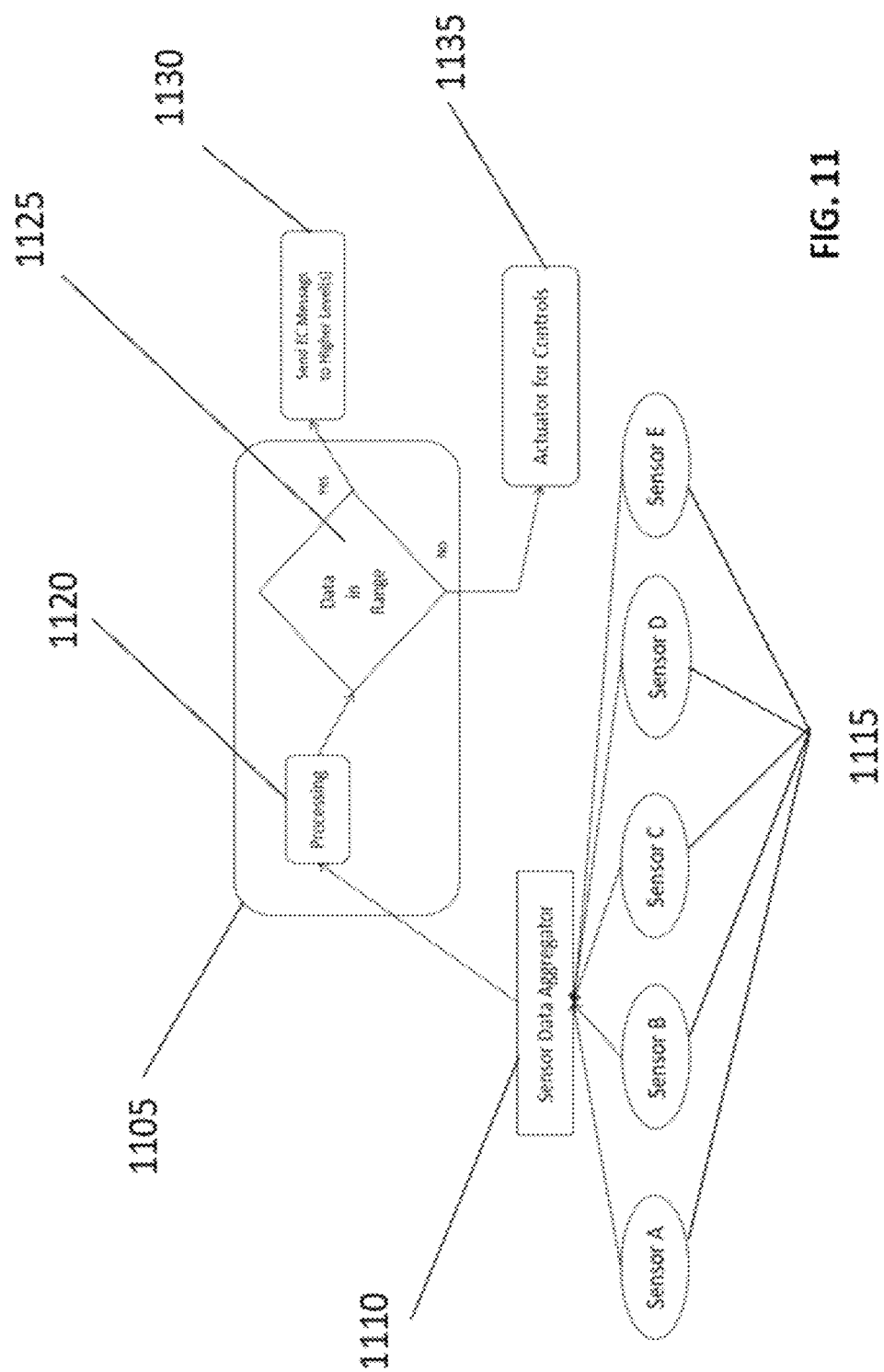
FIG. 11 shows a case of messaging being determined by processing of sensor input relative to a threshold.

FIG. 11 shows an example diagram and partial flow chart for processing of sensor data values. In this case, sensors Sensors A to E 1115 are interfaced to Sensor Data Aggregator 1110 which in turn is interfaced to EC Messaging Appliance 1105. In the Messaging Appliance 1105, data from Sensor-Data Aggregator 1110, its output is processed in 1120 and a decision is made in Decision Block 1125 in which if the Data are in Range, a status message is sent through channel Send EC Messages to Higher Level(s) 1130. Alternatively, a message could be sent if the data were out of range, but in the case in the figure, if the Data are Out of Range, an instruction is sent to Actuator for Controls 1135 to take an action to correct the situation. Messaging Appliance based on its downloaded database will sent the text, e-mail, and other messages. The EC Messaging Appliance can do processing to see if criteria met to generate messages of various types. In one case, the Sensor or other IoT device will have processing built-in to notify Messaging Appliance what message to send as well as when. In another case, the Sensor or other IoT device will provide stream of data to Messaging Appliance and processing to determine what message to send and when will be determined there.

In one embodiment, instead of the Remote EC Messaging Appliance directly sending the EC Message directly, but the Messaging Appliance will send a configured message to its target server and the text, e-mail, and other messages will be sent from there. The configured message will be processed on the Message-Implementation Server and recipients and what type of message will be contained in the database on that server and that information never downloaded to the Messaging Appliance. In one mode, a Virtual Messaging Appliance will reside completely at the central Sensor Data or other Target Server. In any case, typically all the reminders delivered will be logged in the Central Extended-Capability Messaging Database Server. Functionally the Message-Implementation Server can include the capability to converting text messages to e-mail or other messages. That functionality can include the ability to fill information including data into a Message Template to be used in a text, e-mail, or other message.

Some examples of messaging are time-specific instructions to change sensor-data-collection parameters or instructions to the ECM Appliance on when to report back on sensor status or on sensor-data values. Note that application systems running on the web related to those sensors and actuators may have the capability of generating notices to personnel that something needs to be attended to but they are unlikely to message all the people with a need to know so that the recipients can be informed and to their jobs properly. A likely scenario is that operational personnel would be notified and depend on those individuals to notify their immediate management and others. The ultimate responsible party, say the owner of a farm whose agriculture IoT operation has been farmed out to an eternal turnkey service organization may have no clue how well their farm is operating.

Processing in Remote Appliance

In another embodiment, the ECM Appliance can accept direct or relayed messages without having had them downloaded in an ECM database. As to the downloading of the ECM database from the Central Database, that can be triggered by such a direct or relayed message or triggered by time specific reminders in the current (not-to-be-downloaded) database that was previously downloaded from the Central Database. This could include the ability to skip downloading that new database if the content has changed (e.g., by comparing checksums). Another capability is the ability of the ECM Appliance to deliver audio or instruct another IoT device to do so.

Even though the approach works particularly well when sensors and actuators are involved, time-specific reminders or location-specific reminders can be effectively delivered to smartphones, either with a special Extended-Capability Messaging App or with a modified version of a text-messaging app.

The behavior of the ECM Appliance can be programmed to be changed depending on who the originator of that message was. This would respect the priority established by those setting up/updating the Central Database.

In order to accommodate messaging including instructions to and from sensors and actuators, configuration or provisioning must be performed. FIG. 12A shows an example of data elements needed for classifying the generic element for sensor and device interactions. The sensor type Temperature-Humidity-Motion in FIG. 12A is abbreviated as THM in FIG. 12B. In the top table 1205 of FIG. 12A the generic devices are defined with SensorActuatorOther device appears in column 1209, the GenericDevice Type appears in column in 1213, the GenericSubElement in column 1217, the Description in column 1221, and DataSent in column 1225. In the bottom table of FIG. 12A 1245, an example of mapping appropriate commercial parts is shown with the Commercial Company in column 1249, the GenericDeviceType in column 1253, the GenericSubElement instruction in column in column 1257, the SpecificPartNumber in column 1261 and the generic SpecificInstruction in column 1265. In FIG. 12B in table 1265 the specific installation is configured with Installation appearing in column 1269, the involved Appliance in column 1273, the SensorActuatorOther in column 1277, the EndDeviceType in column 1281, CommercialVendor in column 1285, the manufacturer's SpecificPartNumber in column 1289, and the specific EndDeviceID in column 1293.

For a specific implementation, as shown in FIG. 12B, these generic instructions must be mapped to the specific instructions applicable to available commercial devices. This is supported by a Graphic User Interface running in a browser or application running on a computer or a smartphone to update tables in a web-based central database. Records related to a specific Extended-Capability Messaging Appliance are extracted at designated times and downloaded into the ECMA.

Coding of Sensor and Actuator Messages Including Instructions

In some embodiments, the manufacturer-specific instructions for devices contained in FIG. 12B are incorporated into a Programable Read-Only-Memory (PROM) or other device with equivalent functionality and plugged into the ECM Appliance PCB. Due to this, the instructions downloaded into ECMA are the generic ones of FIG. 12A. In addition to efficiency, this approach means that if a set of sensors and/or actuators from one manufacturer is swapped to that of another manufacturer, the generic instructions need not be altered.

Figure 13:
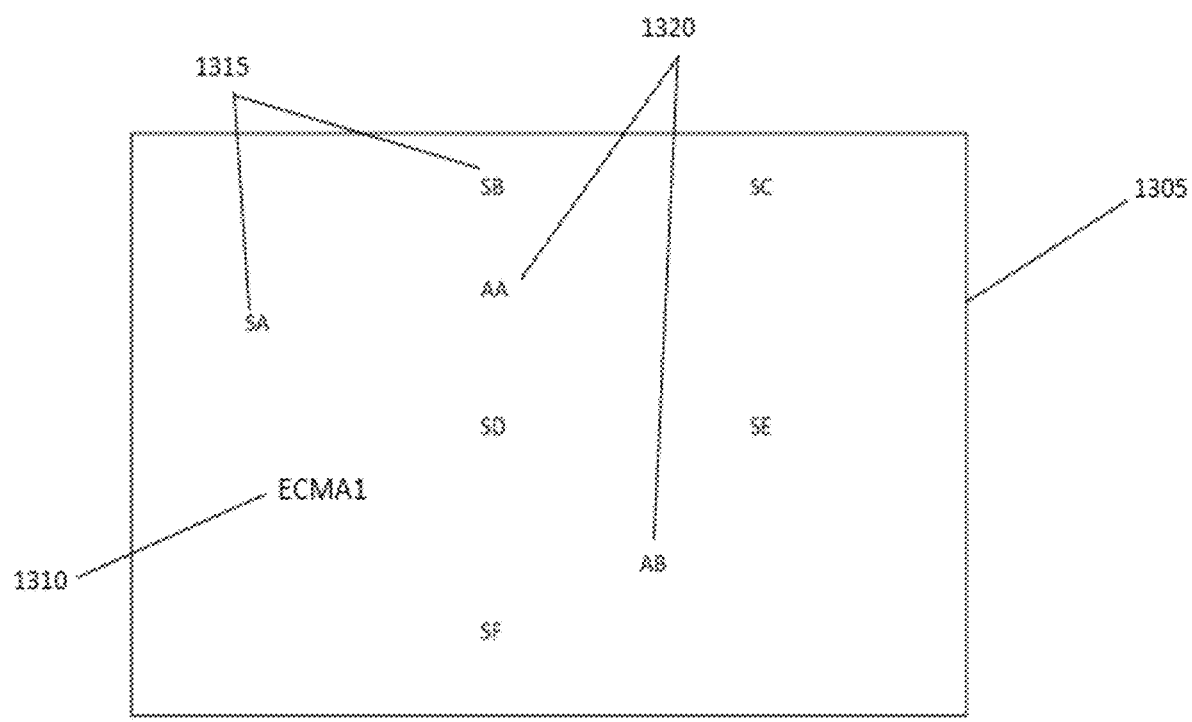
FIG. 13 shows a map of the geographic positions of an Extended-Capability Messaging Appliance and associated sensors and actuators.

One approach to setting up and operating an IoT-based farm, for example, is to present a user with a geographic map of IoT devices as illustrated in FIG. 13 1305. Element ECMA1 1310 is an Extended-Capability Messaging Appliance. Elements SA, SB (both noted as 1315 as representatives), SC, SD, SE, and SF are sensors and AA and AB (both noted as 1320) are actuators.

Figure 14A:
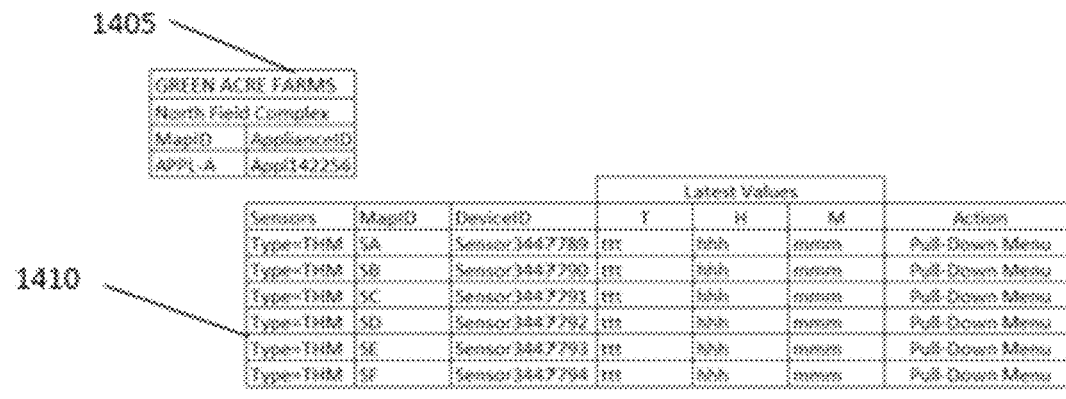
FIG. 14A illustrates a table of sensor and actuator characteristics and FIG. 14B shows a pull-down menu of sample actions.
Figure 14B:
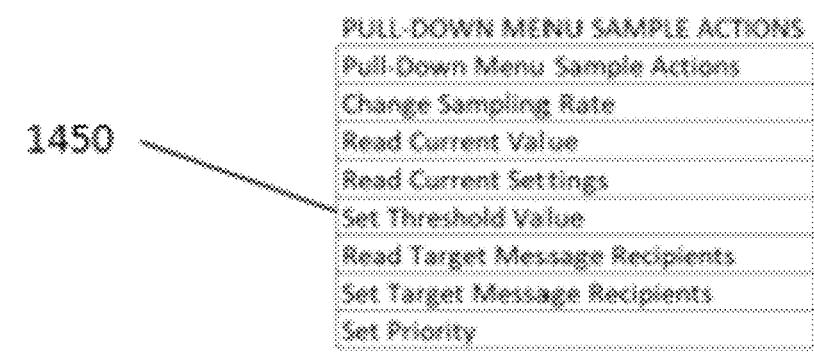

The characteristics of those sensors and actuators are shown in 14A that accompanies each such map using devices from FIGS. 12A and 12B. The location of the given configuration appears in 1405. A table 1410 includes columns for sensor type, MapID location on the map, the particular DeviceID, the latest values, and associated Action. Some typical actions are contained in pull-down menus are contained in FIG. 14B 1450. This includes the presentation of the latest values and FIGS. 13 and 14 can be combined on a display noting that the positions on the map of FIG. 13 are included in the elements of the rows of FIG. 14. Display of data can be done on demand, periodically or continuously. GPS coordinates can also be included if applicable.

A sample action based on a given sensor value (say humidity) is to turn on an actuator (irrigation valve) if the read value falls below (or, depending on the situation, rises above) a threshold value. The decision to actuate or not (or whether to message or not, and what message) may be driven by AI processing within the ECM Appliance, whether an AI Processor is installed or not. Another action is reading the complete configuration of a sensor, actuator, or one or more PROM, ROM, EPROM, and EEPROM devices installed in an ECM Appliance.

Programming the Appliances

The generic code shows the functionality of the Appliance and programming flow. Devices characteristics are placed in tables including instructions that are used to program those devices. The PROM, ROM, EPROM, EEPROM devices can be programmed by the ECM Appliance provider, the vendor of the sensor, actuator, or specialized device or by a (consulting) service bureau. Alternatively, the instructions could be alternately be embedded in the hardware of a special version of embedded processor. The characteristics of sensor and/or actuator aggregators are set as well in addition to IoT sensor and actuator gateways.

Figure 16:
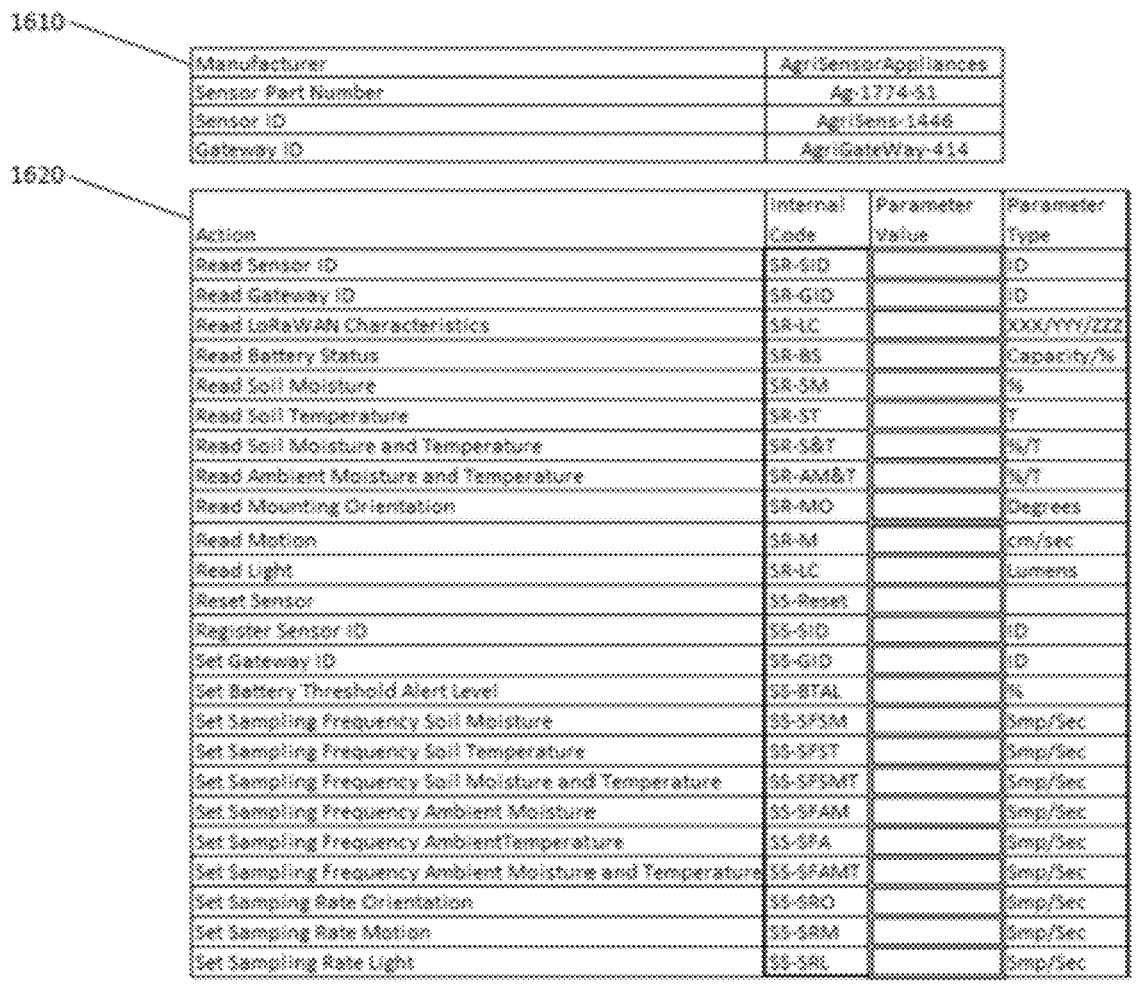
FIG. 16 illustrates a user interface for setting instructions for a specific sensor.

An example of a Graphic User Interface used to encode the instructions for an agricultural sensor for a designated commercial sensor is shown in the table 1510 and an actuator 1520 in FIG. 15. The specific instructions will be downloaded into an EEPROM or equivalent device that is either plugged in or integrated on the printed circuit board of an ECM Appliance. Alternatively, the download can be placed in the memory of the ECM Appliance. An example of a GUI for setting the instructions for a specific sensor is shown in FIG. 16 with device identification information in section 1610 and instruction information in the table in section 1620 including columns for Action, Internal Generic Instruction Code, the Parameter Value (if interface for reading data included) and the Parameter Type. The unitary instructions in Table 15 are assembled a set of one or more sequential instructions to accomplish a logical action or logical set of actions The process allows the user to configure and provide instructions to be downloaded by interaction by interacting with a high-level GUI without having to know the low-level instructions needed to perform actions because they are converted automatically once the device specific parameter values have been input into the system. This includes any ancillary information required if and as applicable (e.g., start-device programming, end device-programming, switch-to-next-parameter). The same process would be used for interacting with an actuator or a gateway.

Generic Programming Instructions

To support the functions of the Extended-Capability Messaging Appliance, the Appliance must be configured as to input including communications, processing of data (both conventional and Artificial Intelligence), and output including communications. Programming is done using the device-manufacturer-agnostic generic code. During instruction loading, the specific-vendor device information would automatically be filled into the instructions.

Figure 17:
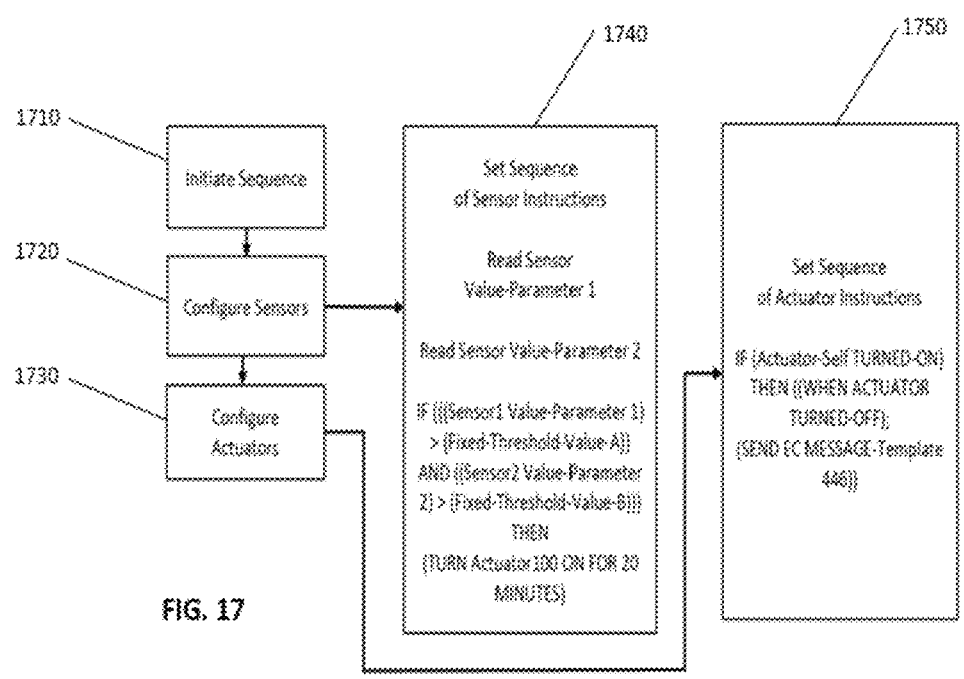
FIG. 17 is a sample flow chart for the programming of a typical remote ECM Appliance.

FIG. 17 illustrates a flow chart for programming sample for a typical Remote ECM Appliance. The process is initiated in 1710 followed by configuration of Sensors 1720, with detail shown in 1740, and configuration of Actuators 1730, with detail shown in 1750. The final step in the latter is to send an Extended-Capability Message to those with a need to know.

Figure 18:
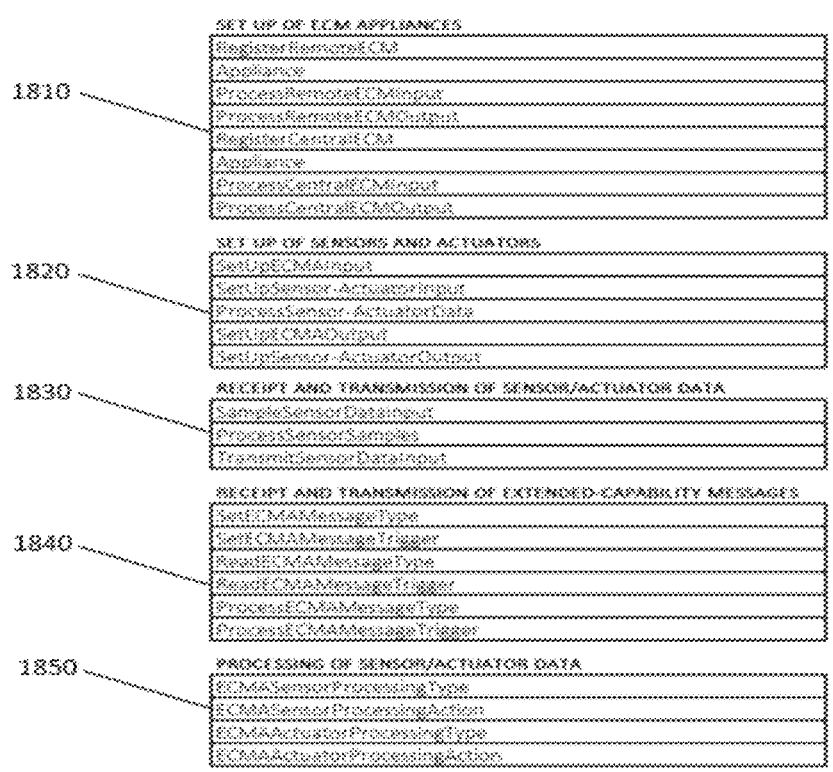
FIG. 18 illustrates a table of generic instructions.

A non-exhaustive set of generic programming instructions is shown in FIG. 18. This figure contains sample tables of instructions in various categories, set up of ECM appliances 1810, set up of sensors and actuators 1820, receipt and transmission of sensor/actuator data 1830, receipt and transmission of Extended-Capability Messages 1840, and processing of sensor/actuator data 1850. Much of the programming is to be done using graphical programming.

Each entry would have appropriate values for the various fields inserted. As appropriate there may be additional categories, instructions, or fields. A combined alternative example is a time-specific reminder message that one or more of the attached sensors should immediately take a sample reading and report back. Steps as in the above table would then be taken. Overall system configuration for the purposes of set up, modification, and monitoring by interaction with a Graphic User Interface or a command-line user interface whose generic instructions may, but not necessarily be, translated into vendor-device specific instructions.

Sensor-Based Systems

Sensor-Based Systems can include a variety of sensors. Examples are humidity, temperature, acceleration, motion, chemical, light, sound, GPS, gas, odor, seismometer, air flow, magnetic, pressure, tactile, level, rotation, proximity, pH, electrical current, metal, altitude, radiation, gravity, capacitance, resistance, inductance, color, tilt, shock, force, strain, imaging, stretch, Radar, Lidar, compass heading, and RFID tag readers, but this list is not exhaustive since there are future sensors to be created as well and this invention would cover them as well. Image sensors such as cameras included in devices such as Ring doorbell devices are included here as sensor-based devices as well. Further, speech recognition devices, including Alexa, Siri, and Google-Assistant are also included as sensor-based devices.

Non-Sensor-Based Systems

Non-Sensor-Based Systems include or other valves, light switches, light-level controllers, light-hue controllers, window-shade closure devices, locks, speech annunciators, robots, and any other actuating devices are included as Non-Sensor-Based Systems. Such systems can not only participate in the generation of status messages but also receive messages calling for actions. An example is an irrigation valve sending a status message (timed or requested) and receiving a message to open the valve. Actuator positions can also be read.

Extended-Capability Messaging to Those with a Need-to-Know in Context of Data-Sensor Devices Because of the values of the data, they transmit that can be transformed into information and hopefully into knowledge, the number of Data-Sensor Devices is constantly increasing significantly. The spectrum of use cases as noted above is both broad and increasing. The outstanding problem is getting the generated information (data and importantly interpretations) to those stakeholders with a need to know. While in some cases, the system to which the sensors are connected will automatically be that conduit, this is not universally be the case. Further, the range of stakeholders is likely limited. Although not exhaustive, the list of candidate stakeholders includes, operational staff, operational management, regional management, corporate management, and client team members. Typically, operational staff and perhaps operational management will get notifications immediately. Whether or not the other stakeholders get notified and, if they do, when is likely handled manually.

Extended-Capability Messaging improves the effectively and efficiency of the notification process by handling it automatically. For example, if humidity detectors in soil sense that the wetness is below what is required for a given crop, Extended-Capability Messages are transmitted automatically from the associated Data-Sensor EC-Messaging Appliance to central operations and rest of stakeholders previously mentioned. The messages are text or e-mail messages and possibly phone calls directed to smartphones or computer devices. When the stakeholder has the EC Messaging App on their smartphone or equivalent devices, given permission for messages from a given source to be inserted in their personal data bases, and downloads that tailored EC-Messaging Database to their device, EC text messages can be automatically delivered with audio, and any type of message can be delivered with the GPS coordinates of the relevant Data-Sensor or associated Sensor Aggregator. In addition, EC messages can be relayed to other recipients. With stakeholders having an immediate need-to-know as well as those with an interest being automatically notified, operational corrections can be quickly made and effective planning supported. In practice, ECM can be effectively applied in cases where sensor data are not involved like when date-time-, daily-time- or location-specific reminders are to be delivered. Extended-Capability Messaging is a powerful augmentation to standard messaging. The generation of a notification can trigger programmatic action that is not available if one triggers own alarm, generates or receives a text, generates or receives an e-mail or generates a telephone call. In the world of Internet of Things, transmission of Sensor Data typically is performed using a LPWAN protocol such as LTE M or NB-IoT over cellular channels.

Extended-Capability Messaging in Context of Non-Data-Sensor/Non-Actuator Devices Extended-Capability Messaging as applied to non-sensor/non-actuator is usually applied to date/time-specific reminders.

Extended-Capability Messaging Mechanisms

Figure 19:
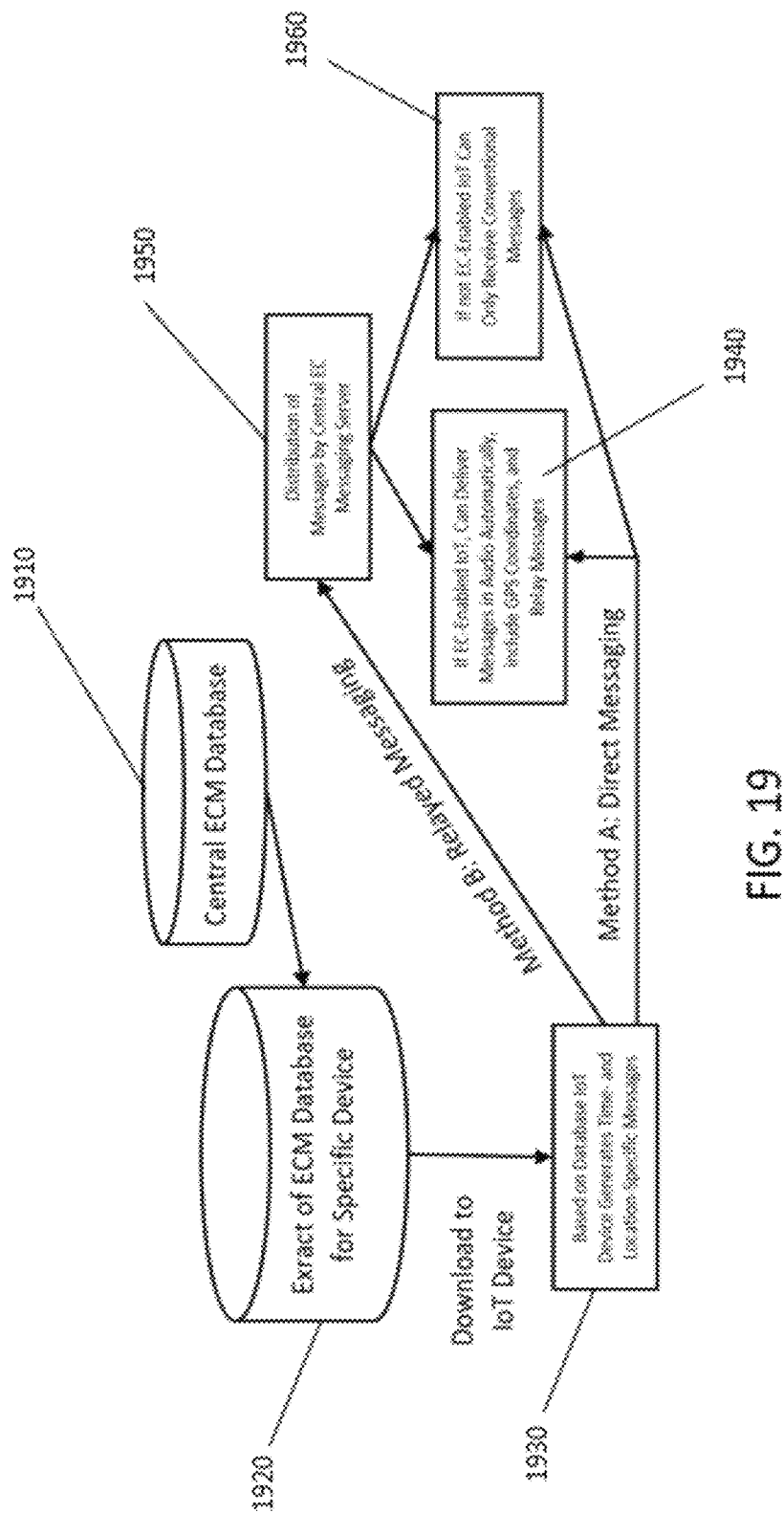
FIG. 19 is a diagram of the generation of Extended-Capability Messages.

As shown in FIG. 19, an extract of records 1920 is made from the central EC Messaging Database 1910 (e.g., MySQL) that are destined for an EC Messaging Appliance or other EC Messaging IoT device (including a smartphone) are packaged into a more portable data-base version like SQLite and downloaded to the given IoT device. That IoT device may be a smartphone. The message packages include what EC Messages are to be sent under what circumstances and for sensor-based situations will include instructions for how sensor data are to be processed and for non-sensor-based cases (e.g., actuators like valves) instructions to activate a device. The instructions may include input or output from Large Language Models.

Based on the time- and location-specific criteria contained in the downloaded database, messages are generated 1930. The message-delivery mechanism is of two types, Method A, Direct Messaging and Method B, Relayed Messaging. In Method A, messages are sent from the source to the target(s) without a server intermediary. In Method B, messages are all sent to a central Extended-Capability Messaging Server 1950 and then distributed to their next destinations by that server 1950. This distribution does not reach all the ultimate message destinations because the system supports relaying Extended-Capability Messages further by Extended-Capability Enabled Devices (including smartphones). If the receiving device is Extended-Capability-Messaging-Enabled Device, text messages can automatically be delivered in audio form, GPS coordinates included in text, e-mail messages, and alternative messages, and be relayed 1940. If the receiving device is not Extended-Capability-Messaging-Enabled Device, then only conventional text and e-mail messages can be delivered 1960.

Handling of Messaging on the Smartphone or Other Iot Device Message Content Input Setting up of collections of message targets, input of message content, and other elements can be performed through web-browser interactions on a computer or a smart device or an application on a smartphone. One of the inputs required is the mechanism for Message Originators to get permission from individuals and other sources already registered to send Extended-Capability Messages allowing a message Originator to include the request in the Message Originator's designated message recipients. Recipients of Extended-Capability Messages will need to have given permission allowing message sources to put messages to be downloaded to their device.

A GUI for configuration of messages, whether replies are not is shown in FIG. 20. The used in Select Configuration 2019 drop down selects whether one of the existing messages in the group of previously available messages 2020 is to be selected or whether a new message is to be configured. In the latter case, drop down lists for Device-by-Device ID, Date, Time, Device (/Group) Instructions(s), Message Type, and Notification ID) are available with navigation facilitated by bring up appropriate candidate entries based on keyed input. Message Type can be a message template that can be filled in by the source of the EC Message. Input can be from a web browser or application operating on a computer or smartphone.

Replies

One function of Extended-Capability Messaging is ability to automatically reply to acknowledge receipt of the message. Another is to notify the Originator of a message that an action requested in the incoming message has been compliance and the action executed. An example is that a senior who has been reminded to take the dog out has walked out the front door as indicated by the triggering by an RFID tag located at the door and the presence of the dog indicated at the approximately the same time by triggering of the smart ECM Appliance device on the senior by an RFID tag located on the collar of the dog. Major use of replies is to give follow-up instructions (like shut system down or water for ten minutes) plus EC Messages notifying others what you have done. Mechanisms for responding to actionable Extended-Capability Messages that are either displayed on a software interface that includes the capability for an actor such as a user or an agent acting on behalf of the user to reply with instructions using a Graphic User Interface (GUI) or an automated agent with or without a graphic user interface to catalyze actions to modify the behavior of that appliance and attached system elements. Typical actions are confirming suggested candidate actions, overriding suggested candidate actions, substituting for suggested candidate actions, setting specified variable values, providing specific instructions, asking another user to weigh in, and asking a system to weigh in. The mechanisms for reply to the actionable messages include being displayed on a software interface that includes the capability of one or a plurality of actors selected from the group consisting of user Sand automated agent.

A GUI for configuration of automatically generated messages, whether replies or not, is shown in FIG. 21. The used in Select Configuration drop down 2110 selects whether one of the existing messages in the group of previously available messages 2120 is to be selected or whether a new message is to be configured. In the latter case, drop down lists for Device or Device Group, Category, Subcategory, and Multiselect Target(s)) are available with navigation facilitated by bring up appropriate candidate entries based on keyed input. Note that for receiving and relaying Extended-Capability Messages, smartphone users will need to have installed the ECM App on their smartphone devices.

Extended-Capability Messaging Mechanisms in Context of Sensor-Data and Actuator Devices Connections between the Sensor Device or Sensor Aggregator and the Extended-Capability Messaging Appliance can be done though a wired or wireless connection (such as Bluetooth or Wi-Fi) or the Appliance can be a plug-in or integrated into the Sensor Device or Sensor Aggregator board. The same is true for an Actuator Device or Actuator Device Aggregator or a combining of Sensor and Actuator elements. An example is a Sensor Device measuring humidity at a given soil depth, the associated Extended-Capability Messaging Appliance detecting that the soil wetness is too low and sending Extended-Capability Messages (optionally including GPS coordinates) to those with a need to know (e.g., operations, operations management, regional management, client). Further, the Extended-Capability Messaging Appliance (ECMA) can directly interact with an actuator turning an irrigation valve on or, if so configured, can interact with the actuator directly or send the ECMA associated with a non-local Actuator an Extended-Capability Message (ECM) with instructions to turn on the Actuator.

Data streams from sensor/aggregator can take (a) their normal path with alerts with status or abnormality alerts sent to the Appliance to provide input to Appliance Extended-Capability Message generation or (b) be sent to Appliance to be checked in Appliance against criteria in database for what to be messaged with the data stream sent directly from the Appliance or sent back to the Data-Sensor or aggregator device for transmission from there. In some embodiments, the Appliance is plugged into the Sensor-Data device or Aggregator or, if implemented otherwise on Sensor-Data hardware being a Virtual Appliance. A smartphone or other IoT device can be an Appliance or incorporate a Virtual Appliance. Security may be implemented including encryption.

Messages can be generated with Extended-Capability Messages carrying status information to be sent to the appropriate destinations based on two mechanisms. One mechanism is based on alerts from the Sensor Data Device (or aggregator) in which status message such those indicating that a certain threshold has been exceeded. The other mechanism involves the Extended-Capability Appliance receiving the Sensor-Data stream from the Sensor-Data Device (or aggregator), checking the stream against selected criteria and, as appropriate, generate Extended-Capability Messages to be distributed to the designated stakeholders. The criteria are downloaded in the database downloaded to Extended-Capability Messaging Appliance. The Appliance can Sensor or other IoT device every k minutes or other interval.

For troubleshooting purposes or due to dynamic circumstances, the Extended-Capability Messaging Appliance can send an instruction to the Data-Sensor Device to modify its behavior such as increasing the frequency of sensor readings or triggering an associated Actuator to take a photo. One mechanism is to have the ECM Appliance interpret the output of a sensor or set of sensors and send instructions directly to the associated actuator or set of actuators.

Overall Configurations and Embodiments of Appliances

Figures 22, 23:
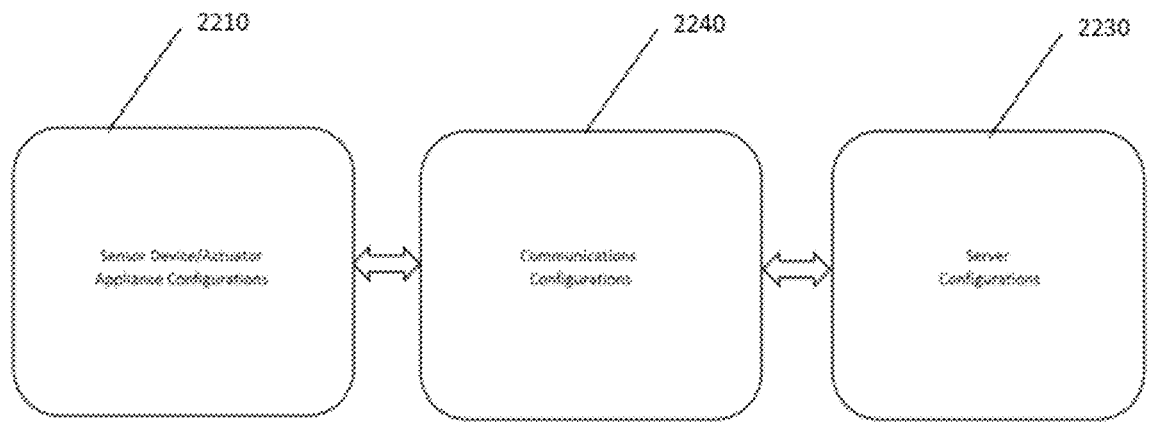
FIG. 22 is a diagram of the three high-level configurations in the Extended-Capability Messaging Appliance system.
FIG. 23 is a table showing communications alternatives among various components of the ECM Appliance system.

Overall, there are three high-level components to Extended-Capability Messaging Appliance (ECMA)/Sensor Device(s) (SD) system. As shown in FIG. 22, they are the ECMA/SD configurations 2210, the bilateral communications configurations 2220, and the Server configurations 2230. Sensor and other IoT data can be wirelessly transmitted from one or multiple sources from sensor or actuator IoT devices, sensor or actuator aggregator devices, or other IoT devices including smartphones. There be wired communication between a sensor and IoT device, including GPS and other sensors built into smartphones. Communications can be achieved using LPWAN, conventional NPWAN cellular, wireless, Bluetooth, and other mechanisms. Types of status messages are, but not limited to declaring scheduling of sensor or other data to be sent, intent to send data immediately, or transfer completed. In some embodiments be send to and held in central database even if sensor or other IoT data are not transmitted through an Extended-Capability Messaging Appliance.

Sensor/Actuator-Appliance Configurations

Variations of the way the sensors and/or actuators communicate with the ECM Appliance that are demonstrated in following figures. In terms of which communications protocols are used in what circumstances, a selection is shown in the table in FIG. 23 where communications-path cases 2310 and mapped against communications-protocol alternatives 2320.

Figure 24:
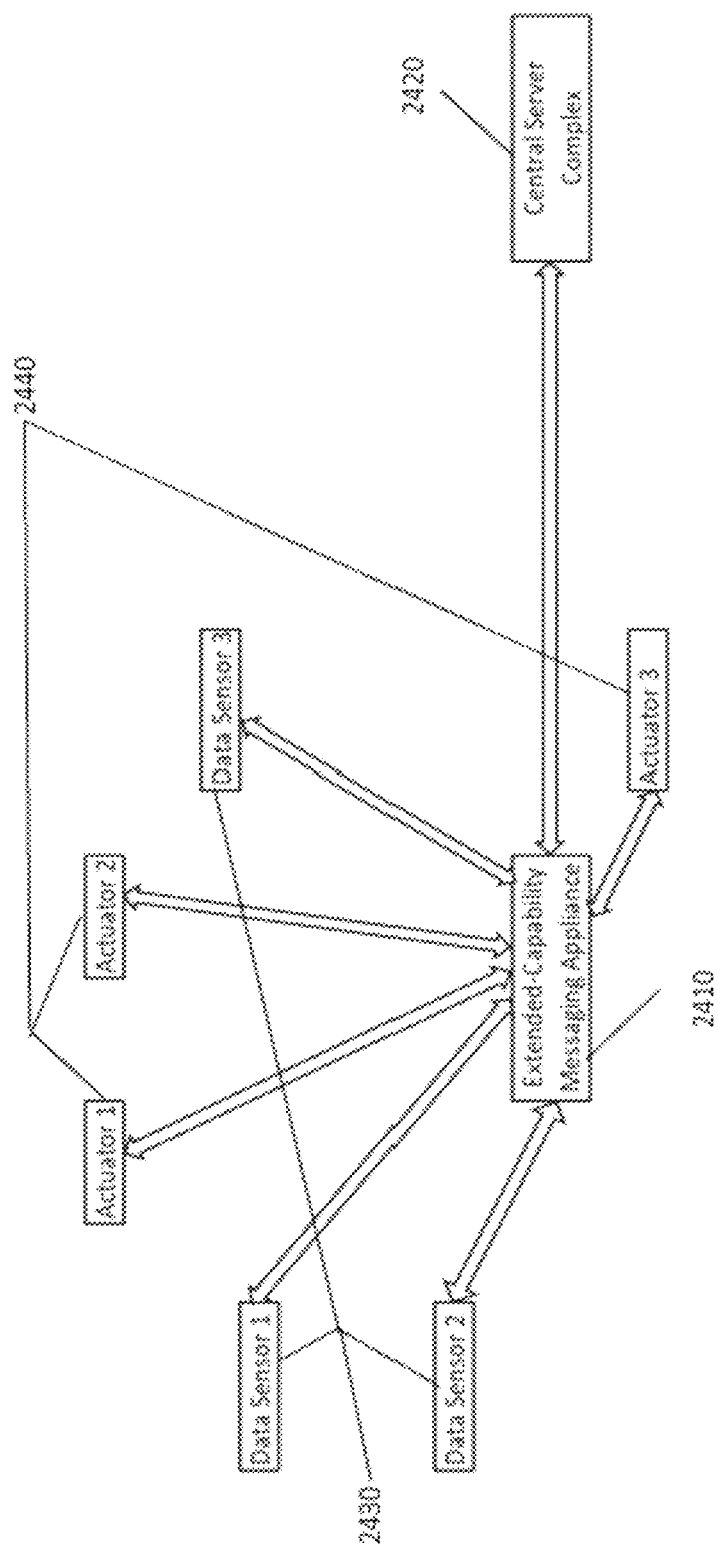
FIG. 24 illustrates one or a multiple of sensor and/or actuator devices communicating with a single ECM Appliance that, in addition to processing EC Messages, functions as a gateway to central site(s).

FIG. 24 illustrates the case where one or a multiple of sensors 2430 and/or actuator devices 2440 communicate with one ECM Appliance 2410 that in addition to processing EC Messages functions as a gateway to central site(s) 2420. The connection to central site(s) may be accomplished by use of LPWAN or NPWAN. The interactions are bidirectional so include messages coming out of the ECMA as well as instruction payloads destined for sensors and actuators. Sensors tend to be battery powered since they purposely draw little power. Typically, batteries will power the sensor for ten years. The may or may not have associated solar panels for recharging the batteries. Depending on the power draw actuators may plugged into a power source or have large batteries and perhaps a local renewable source. This can be true for ECM Appliances as well, although, particularly, if the duty cycle is low, these, like sensors may be solely battery powered or augmented with solar power.

Figure 25:
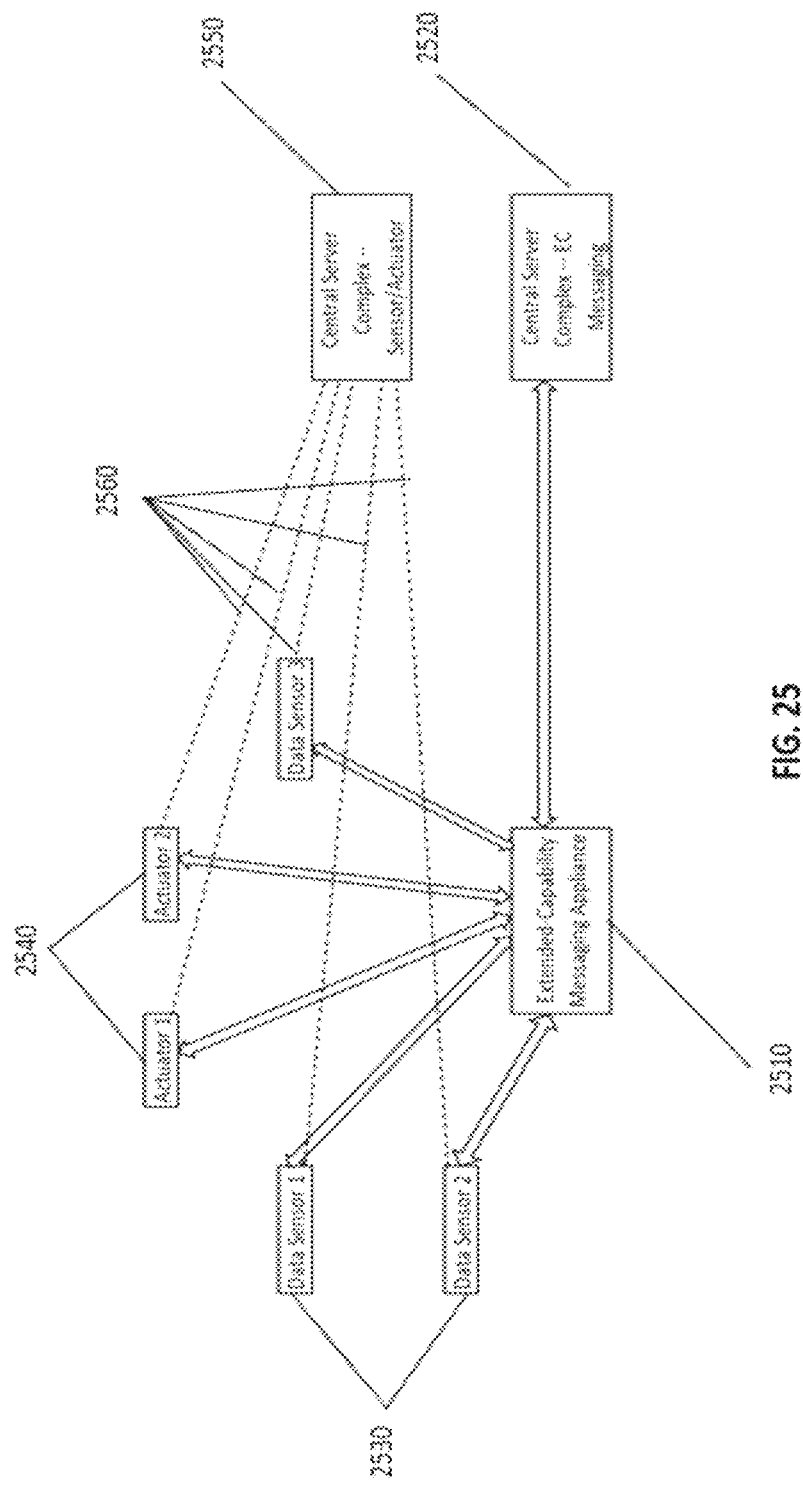
FIG. 25 illustrates one or a multiple of sensor and/or actuator devices communicating with a single ECM Appliance for messaging and interact via LPWAN with the Sensor/Actuator Central Server Complex.

FIG. 25 covers the case where ECM Appliance 2510 has sensors 2530 and actuators 2540 attached. Communications with the sensors and actuators uses LPWAN for communications channels 2560 to their own Central Server Complex-Sensor/Actuator 2550. This includes at least a subset of the sensor data so decisions can be made in ECM Appliance 2510. Both sensor output data and input instructions as well as EC Messages flowing to and from ECM Appliance 2510 from and to Central Server Complex 2520 occur in a communications channel which may be LPWAN or NPWAN. There are sensor gateways (e.g., TEKTELIC Micro- and Macro-Gateways) that combine communications from multiple sensors into one channel for communication with a central server. Such gateways are not typically equipped to do computing of the type that would support Extended-Capability Messaging.

Alternative Regional Ec-Messaging Appliance Sensor/Actuator Deployments/Configurations There are multiple applicable EC Messaging Appliance configurations relative to sensors and actuators and the communication of those devices with a Central Server complex for sensor/actuator interactions. The use cases supported by these cover a broad spectrum whether applied to manufacturing, agriculture, security, smart homes, smart cities, etc. In the smart home, sensors (such as cameras or measuring soil humidity of favorite plants), actuators, such as remotely controllable light switches, or combination sensor/actuators such as HVAC thermostats can be all serviced by a single ECM Appliance. One of the EC message types can be a reminder to check your EcoBee or Nest App on your smartphone.

Figure 26:
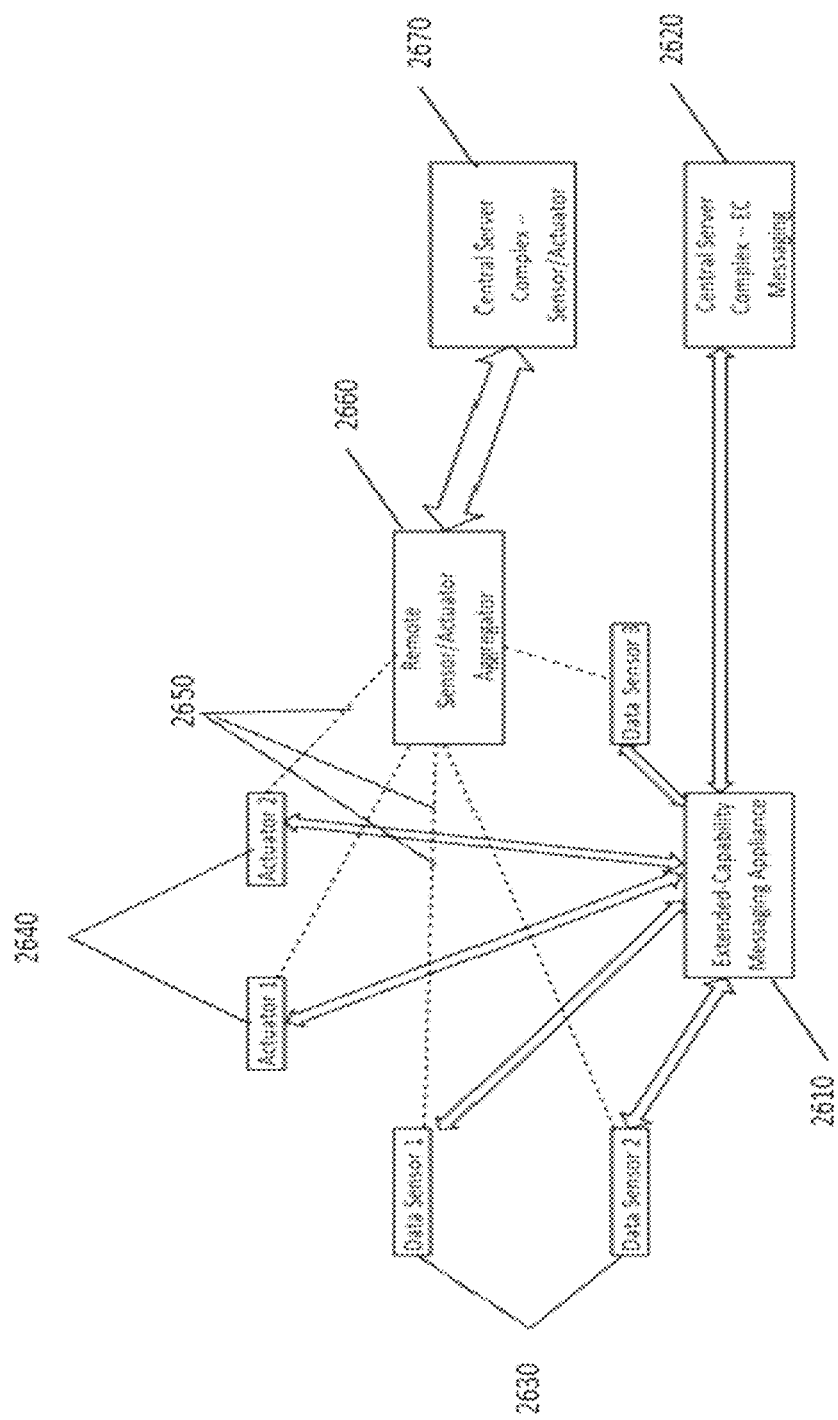
FIG. 26 illustrates one or a multiple of sensor and/or actuator devices communicating with a single ECM Appliance for messaging and interact via LPWAN with the Central Sensor/Actuator Central Server Complex through the Remote Sensor/Actuator Aggregator.

FIG. 26 illustrates one or a multiple of sensor and/or actuator devices communicating with a single ECM Appliance for messaging and interact via LPWAN with the Central Sensor/Actuator Central Server Complex through the Remote Sensor/Actuator Aggregator. FIG. 26 illustrates the case where ECM Appliance 2610 has sensors 2030 and actuators 2040. Communications between ECM Appliance 2610 with the sensors and actuators uses LPWAN or alternative communications channels. This includes at least a subset of the sensor data so decisions can be made in ECM Appliance 2610 and instructions delivered to sensors and actuators. The communications of sensor data and instructions to actuators between those devices and the Central Server Complex-Sensor/Actuator 2670 in this configuration flow through the Remote Sensor/Actuator Aggregator 2660 that may be LPWAN or, less likely, NPWAN. EC Messages flowing to and from ECM Appliance 2610 from and to Central Server Complex-EC Messaging 2620 occur in a communications channel which may be LPWAN or NPWAN.

Figure 27:
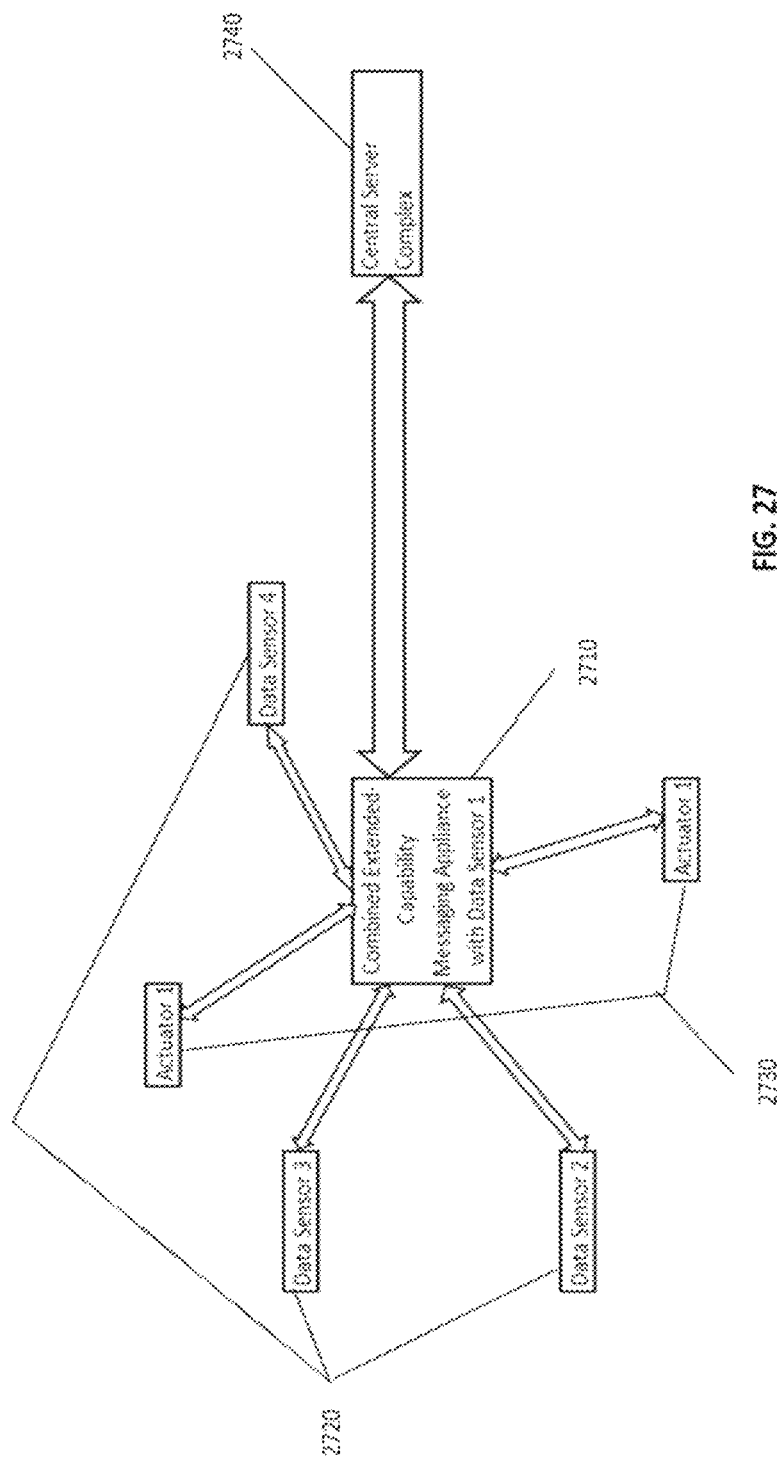
FIG. 27 illustrates one or a multiple of sensor and/or actuator devices communicating with a single ECM Appliance that is combined with one of the data sensors that communicates with the Central Server Complex.

FIG. 27 covers the case where ECM Appliance is integrated with a Sensor (Sensor 1) 2710 showing this type of configuration for the case of a single-sensor. ECM Appliance and Sensor 1 combination 2710 has external sensors 2720 and actuators 2730 attached. Communications with the sensors and actuators uses LPWAN for communications channels. Both sensor output data and input instructions as well as EC Messages flowing to and from ECM Appliance combined with Sensor 1 2710 from and to Central Server Complex 2740 occur in a communications channel which may be LPWAN or NPWAN. The ECM Appliance can be integrated with one or a plurality of sensors.

Figure 28:
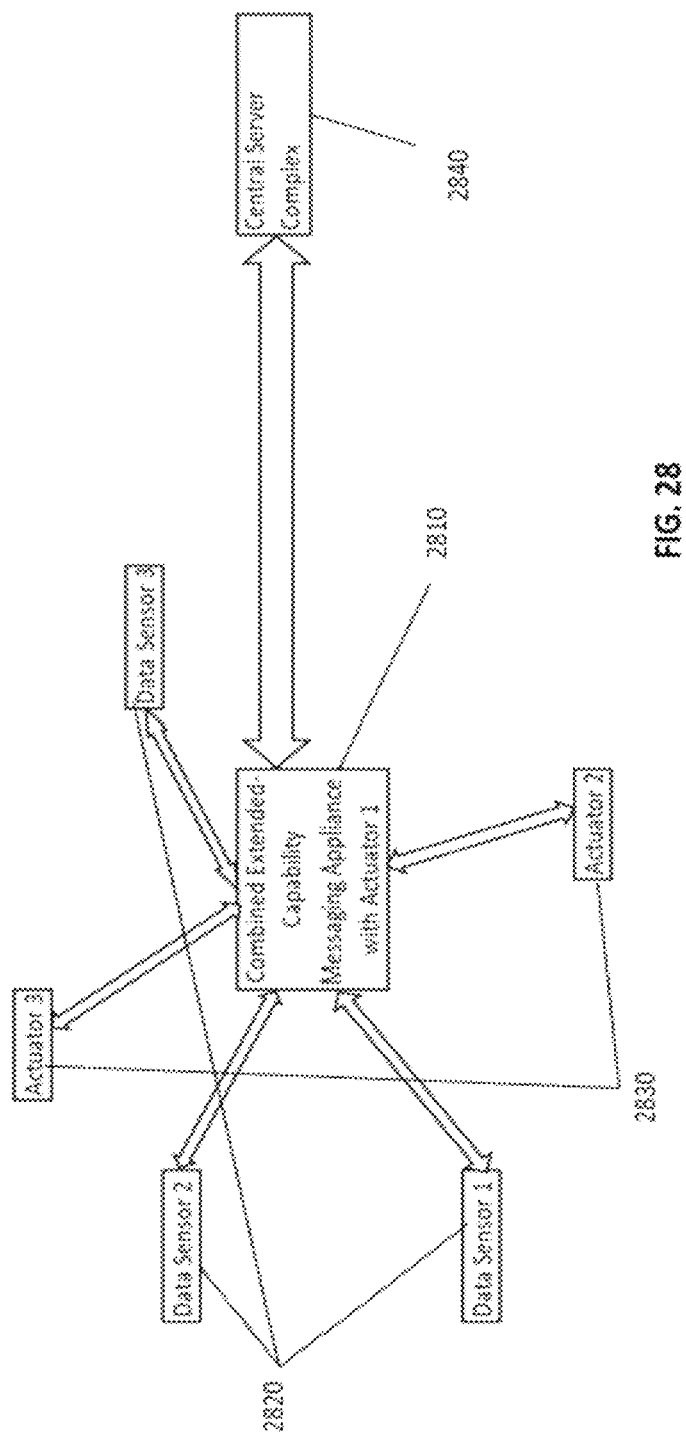
FIG. 28 illustrates one or a multiple of sensor and/or actuator devices communicating with a single ECM Appliance that is combined with one of the actuators that communicates with the Central Server Complex.

FIG. 28 covers the case where ECM Appliance is integrated with an Actuator (Actuator 1) 2810 and shows this type of configuration for the case of a single-actuator. ECM Appliance combined with Actuator 2810 has sensors 2820 and external actuators 2830 attached. Communications with the sensors and actuators uses LPWAN for communications channels. Both sensor output data and input instructions as well as EC Messages flowing to and from ECM Appliance combined with Actuator 1 2810 from and to Central Server Complex 2840 occur in a communications channel which may be LPWAN or NPWAN. The ECM Appliance can be integrated with one or a plurality of actuators.

Figure 29:
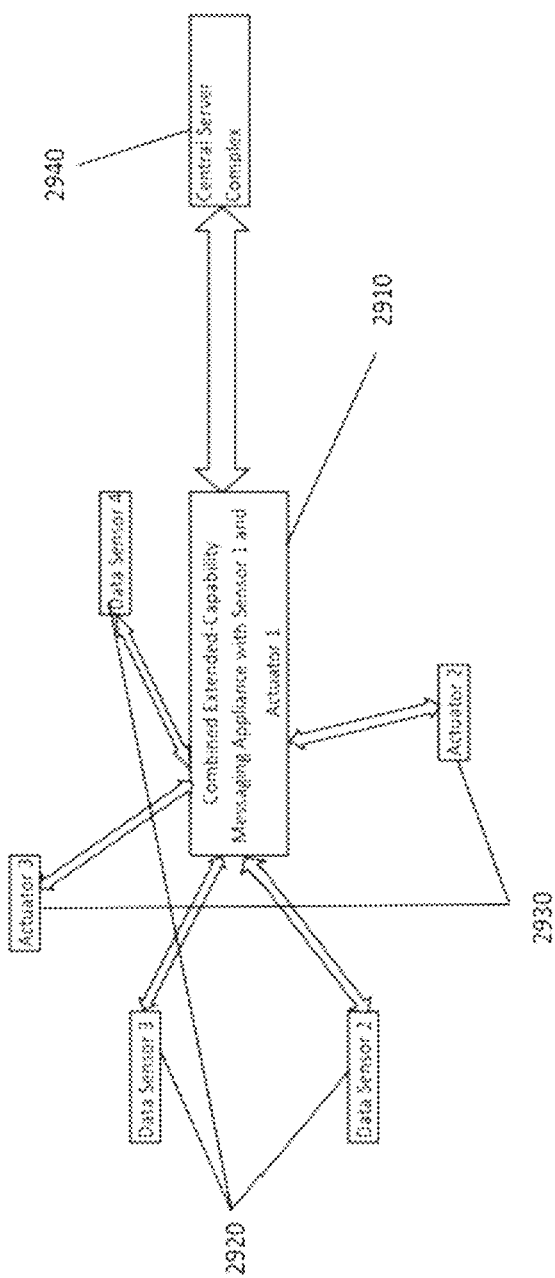
FIG. 29 illustrates one or a multiple of sensor and/or actuator devices communicating with a single ECM Appliance that is combined with one sensor and one actuator that communicates with the Central Server Complex.

FIG. 29 covers the case where ECM Appliance is integrated with both a sensor (Sensor 1) and an actuator (Actuator 1) 2910. ECM Appliance combined with a sensor and an actuator 2910 has external sensors 2920 and external actuators 2930 attached. Communications with the sensors and actuators uses LPWAN for communications channels. Both sensor output data and input instructions as well as EC Messages flowing to and from ECM Appliance combined with a sensor and an actuator 2910 from and to Central Server Complex 2940 occur in a communications channel which may be LPWAN or NPWAN. The ECM Appliance can be integrated with one or a plurality of sensors and one or a plurality of actuators.

Figure 30:
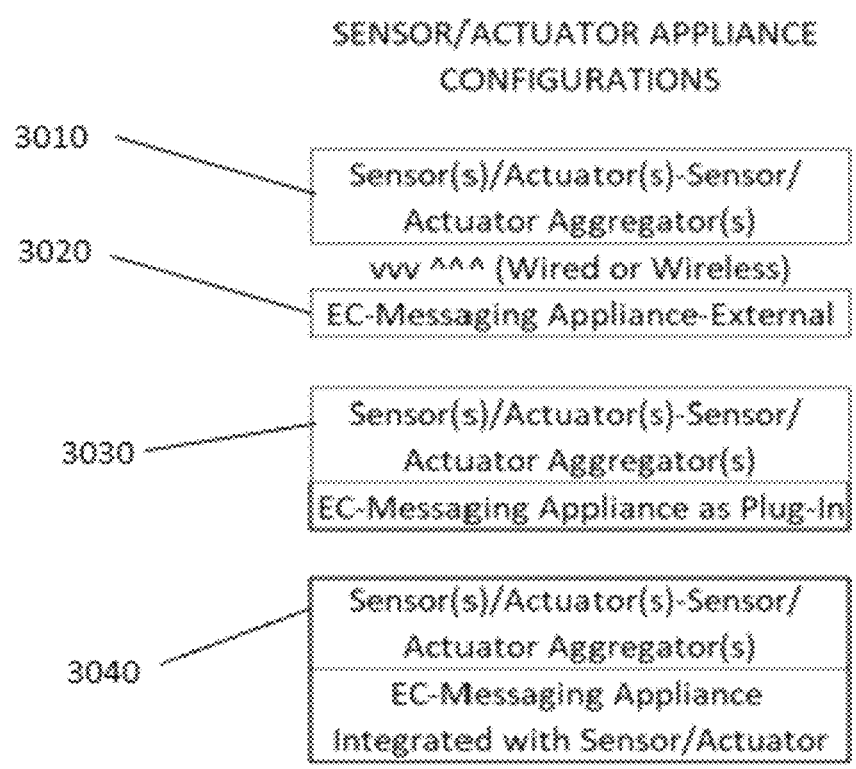
FIG. 30 shows alternative Sensor/Actuator Appliance Configurations.

FIG. 30 shows alternative configurations for the relationships between the Data Sensor Device and the Extended-Capability Messaging Appliance both as to their interactions and which of the devices provides the communications channel. In some cases, there will be a sensor-data aggregator with connections to data collection devices in local regions to consolidate data streams and send them to a central site.

As noted above in some cases, the sensor(s) and/or actuator(s) will be interacting with an ECMA not physically in proximity to them. In some cases, the data sensor(s) and/or actuator(s) will be incorporated in the device for LPWAN transmission, in other cases it/they will be plugged in or communicate wirelessly. In a sample embodiment, NB-IoT communications occur using the Queict BC66 communications module with sensor input and communications to the Extended-Capability Messaging Appliance handled an associated module such as an Arduino or Raspberry Pi or another microcontroller/microprocessor. One can use LoRa/LoRaWAN on both ends of an Arduino-to-Arduino connection so can connect sensors or actuators to an Arduino and use LoRaWAN to for Arduino communication with a central server. LPWAN communications can use NB-IoT, Sigfox, or other protocols and not necessarily LoRaWAN. Overall, communications can be wired, wireless, WiFi, cellular, involving satellite communications, NPWAN, RFID, NFC, Bluetooth, Zigbee. Z-Wave, Ultra-Narrowband Modulation, LTE-M, Narrowband IoT, LoRa, SigFox, EC-GWM-IoT, Weightless, existing equivalent protocols, and others to be developed. Microcontroller/microprocessor to microcontroller/microprocessor can be accomplished not using an Arduino context but instead use Raspberry Pi or STM32, other ARM-based devices, or other such devices.

In some cases, specific sensor devices with NB-IoT built in are available. Extended-Capability Messaging Devices can send SMS text and e-mail messages. The Extended-Capability Message Appliance communicates bidirectionally, both the Sensor Data Device and the target server that supports the Appliance. The functionality of the Extended-Capability Message Appliance is such that Extended-Capability Messages are not only sent to a central service but also directly to targeted recipients. Incoming messages to the Extended-Capability Message Appliance can contain instructions to change the characteristics of Sensor-Data Device such as changing sampling frequency. Instructions in an incoming message can determine processing of data. A given sensor and/or actuator can have special capabilities to send out data already selected by threshold, but generally want to avoid customizing a device connected to an EC Messaging Appliance and instead do the processing in the connected EC Messaging Appliance.

Multiple IO (Input/Output) configurations are applicable: where (a) the IO device(s) including, optionally, aggregators (s) has/have wired or wireless connection to an Extended-Capability Messaging appliance, (b) the IO device(s) including at least one aggregator connected an external Extended-Capability Messaging Appliance that is plugged into the printed circuit board containing the IO devices including, optionally, aggregator(s), and (c) where the IO device(s) including optionally, at least one aggregator connected to an Extended-Capability Messaging Appliance that is directly integrated into the printed circuit board containing the IO devices including optionally, aggregator(s).

FIG. 30 covers the cases of Sensor/Actuator ECM Appliance Configurations where (a) the EC-Messaging Appliance-External is physically in proximity to the sensor(s) or actuator(s) or is remotely located with respect to them interfaced with wireless communications, (b) the case where the ECM Appliance is a plug-in to the sensor(s) and/or actuator(s) assembly, and (c) where the ECM Appliance is physically integrated into the sensor(s) and/or actuator(s) assembly. The breakdown of the detail for the ECMA/SD configurations is shown in FIG. 30. The three basic configurations are (a) where the Sensor(s)-Sensor Aggregator(s) 3020 communicating bilaterally with the external version of the EC-Messaging Appliance 3010 through wired or wireless communications mechanism, (b) where there is a combination 3030 of Sensor(s)-Sensor Aggregator(s) and EC-Messaging Appliance in which EC-Messaging Appliance is plugged into the Sensor(s)-Sensor Aggregator(s), and (c) 3040 in which Sensor(s)-Sensor Aggregator(s) and EC-Messaging Appliance in which both the components are integrated in a single PCB or set of PCBs. The ECM Appliance Receives instructions for sensor device and transmit them to that sensor device. One path is to monitor the incoming data stream and look for altered pattern followed by a Message ID and then check message and take sensor or actuator action based on the instructions.

Communications Configurations

Figure 31:
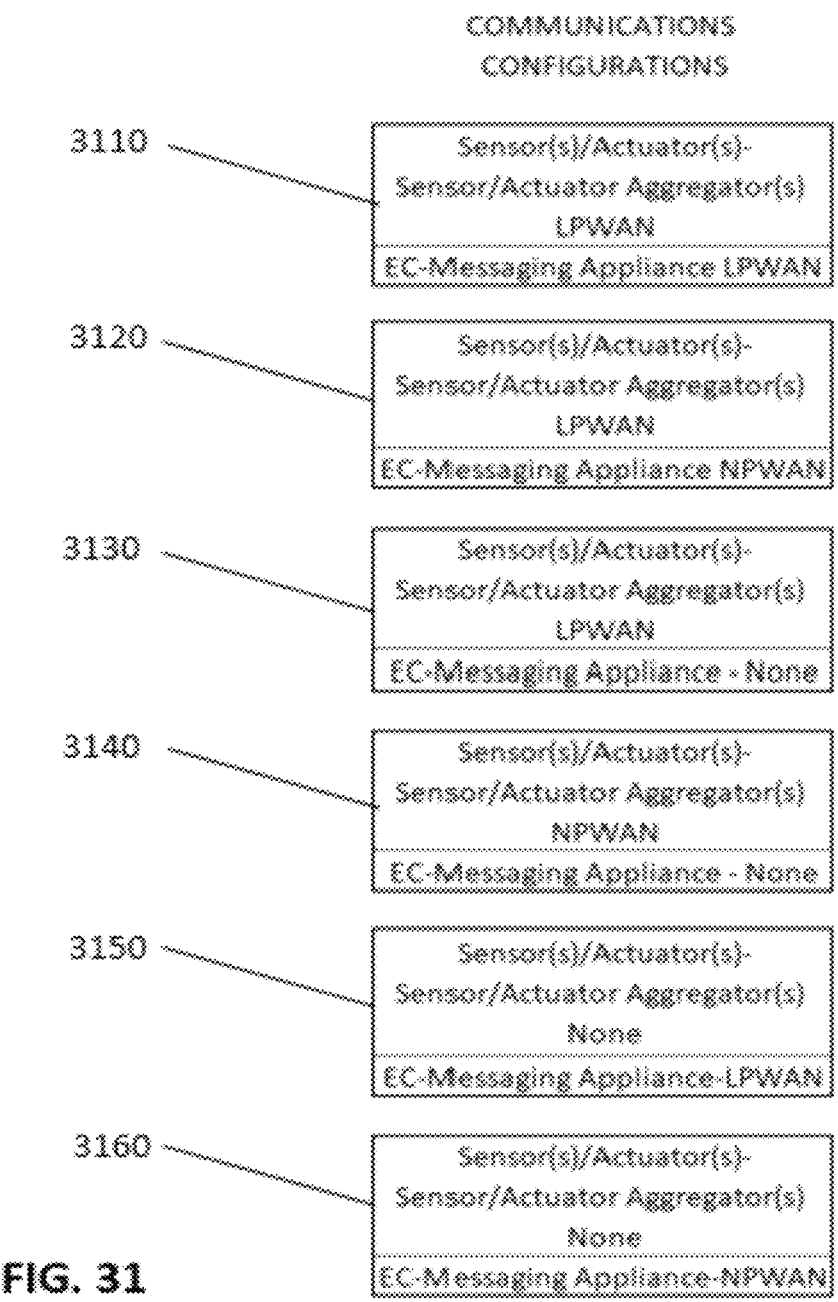
FIG. 31 shows alternative Communications Configurations.

The set of Communications Configurations in FIG. 31 has six alternatives, although other configurations would be covered. The first is 3110 in which Sensor(s)-Sensor Aggregator(s) communicates via LPWAN and associated EC-Messaging Appliance communicates separately via LPWAN. The second is 3120 in which Sensor(s)-Sensor Aggregator(s) communicates via LPWAN and associated EC-Messaging Appliance communicates via NPWAN (Normal Power Wide Area Network). The third is 3130 in which Sensor(s)-Sensor Aggregator(s) and associated EC-Messaging Appliance both communicate via an LPWAN connected that is connected to Sensor(s)-Sensor Aggregator(s). The fourth is 3140 in which Sensor(s)-Sensor Aggregator(s) and associated EC-Messaging Appliance both communicate via an NPWAN connected that is connected to Sensor(s)-Sensor Aggregator(s). The fifth is 3150 in which Sensor(s)-Sensor Aggregator(s) and associated EC-Messaging Appliance both communicate via an LPWAN that is connected to the EC-Messaging Appliance. The sixth is 3160 in which Sensor(s)-Sensor Aggregator(s) and associated EC-Messaging Appliance both communicate via an NPWAN that is connected to the EC-Messaging Appliance. In cases where Sensor Data and/or Actuator Instructions are carried in the same data channel as the EC Messages, the Sensor-Data and its related EC Messages going out from the remote location will be temporally interleaved with appropriate encapsulation identification information. For communications to a remote target, EC Messages containing instructions for control of an Actuator will be carried alone or, if desired, temporally interleaved with the communications stream from a central control source to the given Actuator target(s). In some configurations, Actuators will only receive their instructions from a central control source and EC Messages will not be sent to the given Actuator or Actuators. Communications approaches apply to the various configurations of ECM Appliance with associated sensors and/or actuators as well as various configurations of servers.

In one embodiment pair locking is employed where a special acknowledgement needs to be given before transmission of sensor data or an EC message with pairing with companion Central ECM Appliance or an alternative connection to server, smartphone or other IoT device(s). ECMA communications can be through one of the LPWAN protocols or NPWAN such as traditional cellular protocol. Depending on the geography using Wi-Fi can be done in alternative embodiments or the ECMAs can be served in a mesh-network communications such as Zigbee. Another mechanism for communication is building a web server into the EC Messaging Appliance. The communications approaches cover both the case where the native-data communications channel for the sensors and sensors is combined with the EC Messages or where the channels are handled separately. Communications covered are all varieties of LPWAN and NPWAN or other methods that may evolve.

Server Configurations

Figure 32:
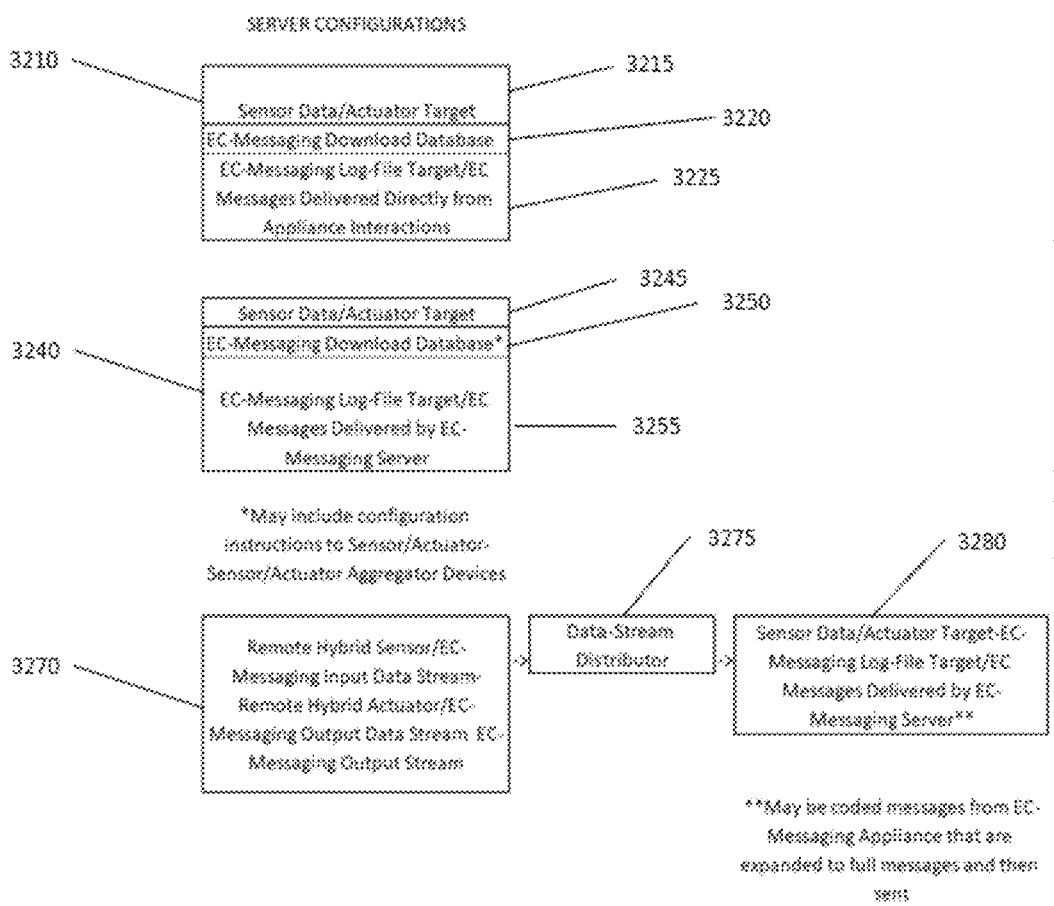
FIG. 32 shows a set of Server Configurations.

FIG. 32 shows a set of Server Configurations that has three variations. In variation 3210, the configuration, includes Sensor Data Target 3215, EC-Messaging Download Database 3220, and EC-Messaging Log-File Target 3225. In this configuration, the Extended-Capability Messages come through one of the Communications Configurations shown in FIG. 32, and are initiated directly by the EC-Messaging Appliance. In variation 3240, the configuration again includes Sensor Data Target 3245, EC-Messaging Download Database 3250, and EC-Messaging Log-File Target 3255, and an associated EC-Message Delivery Server. In this variation, the EC Messages are initiated by the EC-Message Delivery Server. In variations 3210 and 3240, the downloads from the EC-Messaging Download Database may contain configuration instructions to the Sensor Devices/Sensor Aggregator Devices. In variation 3270, the incoming data flow comes from/goes to one of the Communications Configurations shown in FIG. 31 goes through 3270 that includes the Remote Hybrid Sensor/EC-Messaging Input Data Stream and the EC-Messaging Output Stream is connected to Data-Stream Distributor 3275 and then continues to 3280. Servers in 3210 include Sensor Data Target 3215, EC-Messaging Download Database 3220, and EC-Messaging Log-File Target 3225 with, in the case of coded messaging transmitted from an EC-Messaging Appliance, the EC Messages are expanded to full messages with transmission initiated by EC-Messaging Servers 3225 or 3255 or 3280 whether the messages from an EC-Messaging Appliance were full or coded messages. Other elements (not shown) are the Artificial-Intelligence processing server and Extended-Capability Messaging server. Server considerations apply whether the "central server" is implemented on a private server or on an implementation on a shared server. Output of sensor and actuator data displayed to users is either in real time or from previously recorded data. In an alternative embodiment, a set of ECM Appliances configured as a cluster are interfaced among each other constituting their own secure constellation protected from the outside world and interacting with controlled secure interactions with outside world.

Remote Extended Capability Messaging

Figure 33:
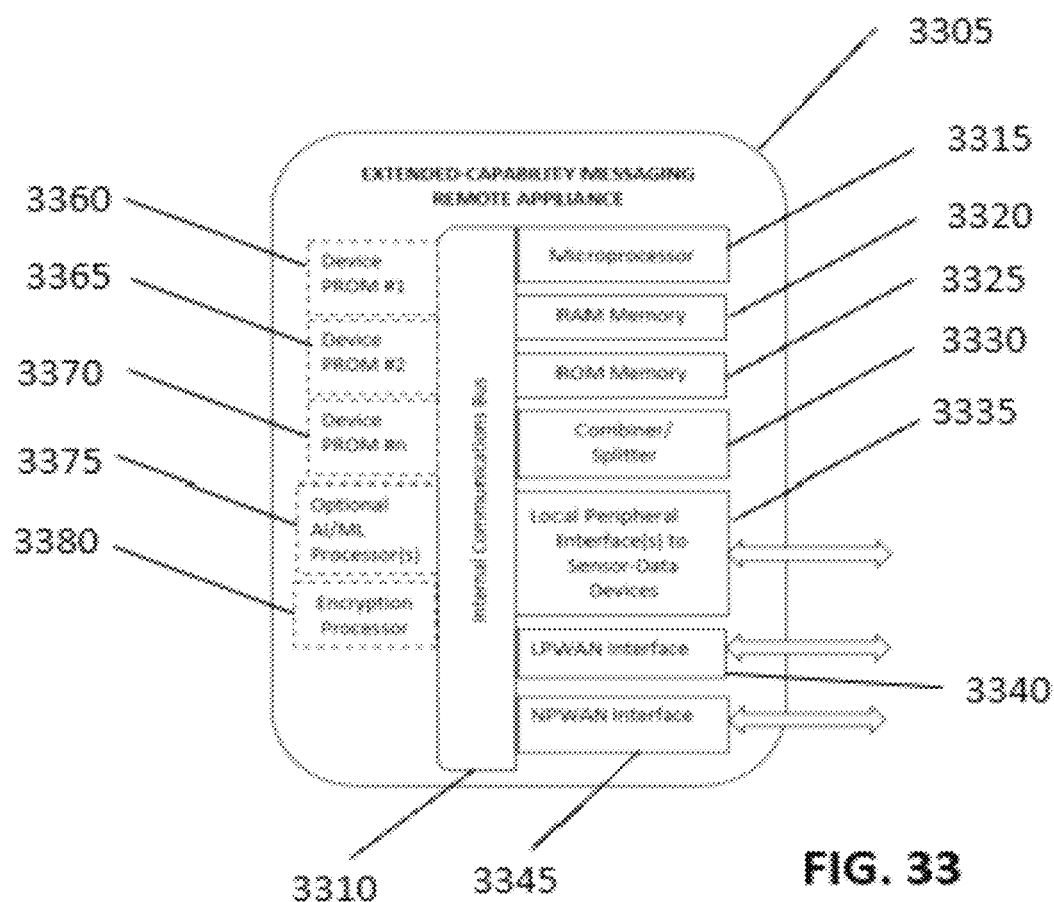
FIG. 33 is a diagram of the Remote Extended-Capability Messaging Appliance.

FIG. 33 shows the internal components of a Remote Extended-Capability Messaging Appliance 3305 composed of Microprocessor 3315, RAM Memory 3320, ROM Memory 3325, Combiner/Splitter 3330, Local Peripheral Interface(s) 3335 to Sensor Data and or Actuator, and LPWAN 3340 or NPWAN 3345 tied together by Internal Communications Bus 3310. Optionally, PROM Devices #1 3360, #2 3365 through #n 3370 (all of which may be PROM, EPROM, EEPROM or equivalents) containing the mapping of generic instructions to sensors and actuators and/or templates for messages coming back), AI/Machine-Learning/Deep-Learning/Adaptive Federated-Learning Processor(s) 3375 and/or Encryption Processor 3380 can be plugged into Internal Communications Bus 3310. Other elements (not shown) are a battery, solar-panel interface, SIM-card interface. The specialized Artificial-Intelligence processors (e.g., NVIDIA) can include GPUS (Graphics Processing Units), Machine Learning Processors, Deep-Learning Processors, Adaptive-Learning Processors, and Federated Learning Processors. Also, the ECM Appliance may also have integrated input devices and integrated output devices, Trusted Platform Module (TM) chips, and custom chips The microprocessor can be a RISC-V, ARM, or other processor including those also supplying some of the components above such as an AI processor (e.g., NVIDIA) or LPWAN hardware that also include general computing capabilities. An example of the latter is an Quectel-BC66 NB-IoT configuration that includes an Arduino module for application-specific use. In some embodiments, GPS sensors are built permitting location information to be included in Extended-Capability Messages. Note devices such as Arduino and Raspberry Pi have reference designs to facilitate incorporation in custom devices such as ECM Appliances. In some embodiments, analog signals are input to the Appliance and comparisons are performed in the analog domain with digital elements. In some embodiments, the ECM Appliance is integrated with a sensor or actuator device and in that configuration can act as an EC Messaging gateway for other sensors or actuators. In some embodiments, the database specifically laid out for messaging is implemented in hardware with or without hardware to handle the EC Messages themselves. The Remote ECM Appliance can be configured to deliver local vocal reminders, if applicable. In some embodiments one or more alert devices are included in the appliance, for example audio output, telephone, light output, vibration, and visual display. Location of the ECM Appliance device can be fixed, mobile, appliance incorporated in smart phones, vehicle mounted, body worn, and other mobile.

Hardware Implementations of Remote Ec Messaging Appliances

Remote EC Messaging Appliances can be created though use of standard available hardware elements such as the Arduino or Raspberry Pi or similar or equivalent microcontrollers/microprocessors for which LPWAN and NPWAN interfaces are available for which reference designs exist. A key element is the ability to plug in PROMs, EPROMS, EEPROMS (forms of Programmable Read-Only Memory) or integrate directly on the printed-circuit board the functionality to (a) take generalized instructions destined for sensors and actuators and convert them to commercial-part-number-specific versions for execution and (b) take data streams coming from sensors and actuators and convert them to generalized output for processing in the Remote ECMA or for transmission to Regional Site(s), the Central Site(s) for processing and reporting. This includes situations where native data is sent from a sensor, they are converted based on instructions in the PROM (or a table) into the generalized version, and a determination made based on those data whether to actuate an actuator (valve, for example), and, if the answer is yes, take the generalized response and in an appropriate actuation PROM convert the given instructions and convert them to a commercial-part-number-specific version for execution by the actuator. Functionality of the PROM/ROM/EPROM/EEPROM is bidirectional and thus includes the ability to convert values from generic to vendor specific and from vendor specific to generic.

In addition, a PROM can contain ECM data to be used for messaging such as type of messaging, addresses of those with a need-to-know who need to receive such messages and any customization of such messages. Alternatively, those data can be downloaded from the central database and which mechanism downloaded from the central database. Another use of the PROM is to provide instructions on how the ECM Appliance should process data transmitted from the sensor including what resultant instructions should be sent to a given actuator. Whether the database is downloaded to the EMC Appliance or contained in a PROM or equivalent, a unique aspect of the invention is having a messaging database in the Appliance.

A variety of functions can be incorporated in the EC Messaging Appliance such as storing typical patterns for that sensor for comparisons, keeping the last k sets of data for that sensor, setting up statistics like average x for the past half hour and the past 24 hours, factoring in some defining characteristics as epoch, say seasonal growing periods, factoring in selected current impacts such as current weather, and, in general look for trends, current status, and patterns to apply and create messages based on them. Preventive maintenance algorithms can be built into the Appliance.

The central database management system (DBMS) for Extended-Capability Messaging can be implemented MySQL or any other appropriate system (e.g., Oracle or Microsoft SQL Server). The database management system does not need to be relational.

As to the use of PROMs or equivalents, the addresses (text or e-mail or other) can also be placed in the devices along with template messages specific to that sensor in the given ecosystem that will be filled out given the current circumstances generating a message. If such message customization information changes for a given overall configuration, the PROM or equivalent can be updated via download or the information changed within the memory of the involved ECM Appliance.

One important aspect of edge computing is power saving obtained by changing LPWAN communications protocols using intermittent transmission. Savings in battery life can be significant. Transmission can be initiated only when sensor data and EC Messages are active.

Sensor-Data Aggregator

Figure 34:
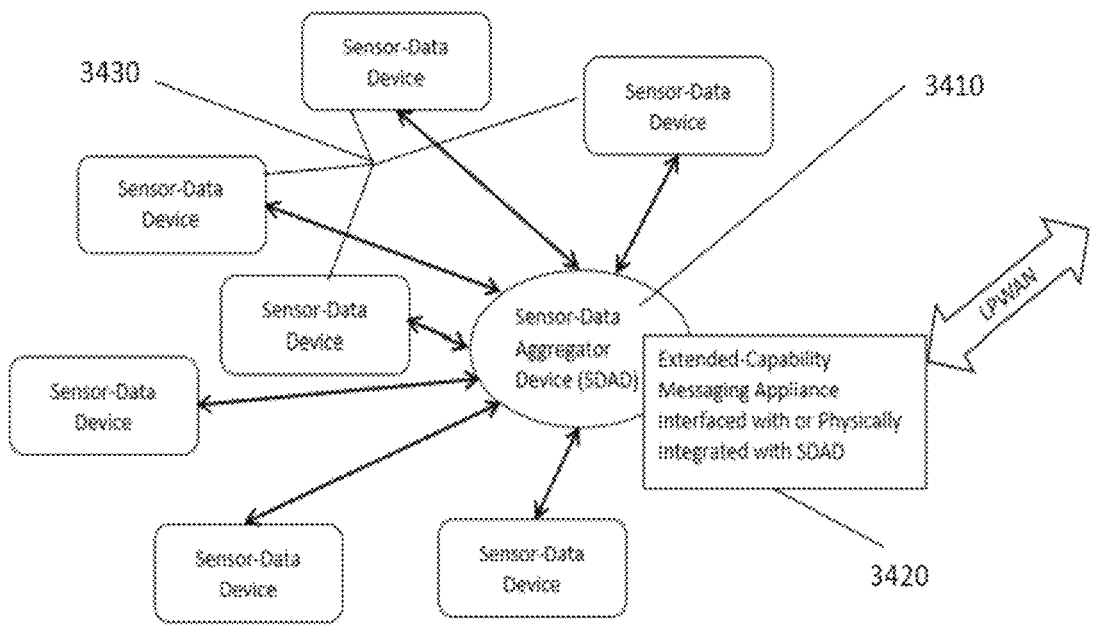
FIG. 34 shows a configuration where sensors are interfaced to a Sensor-Data Aggregator Device integrated with or interfaced to an Extended-Capability Messaging Appliance.

FIG. 34 shows a configuration where a set of Sensor-Data Devices, say including, for example, 3430 is interfaced to a Sensor-Data Aggregator Device (DSAD) 3410 which is interfaced with or integrated to Extended-Capability Messaging Appliance 3420 with communications from a LPWAN or NPWAN channel. The same process is available for aggregation of actuators or a mixture of sensors and actuators.

Alternative Appliance/Data-Sensor Device Configurations

Figure 35:
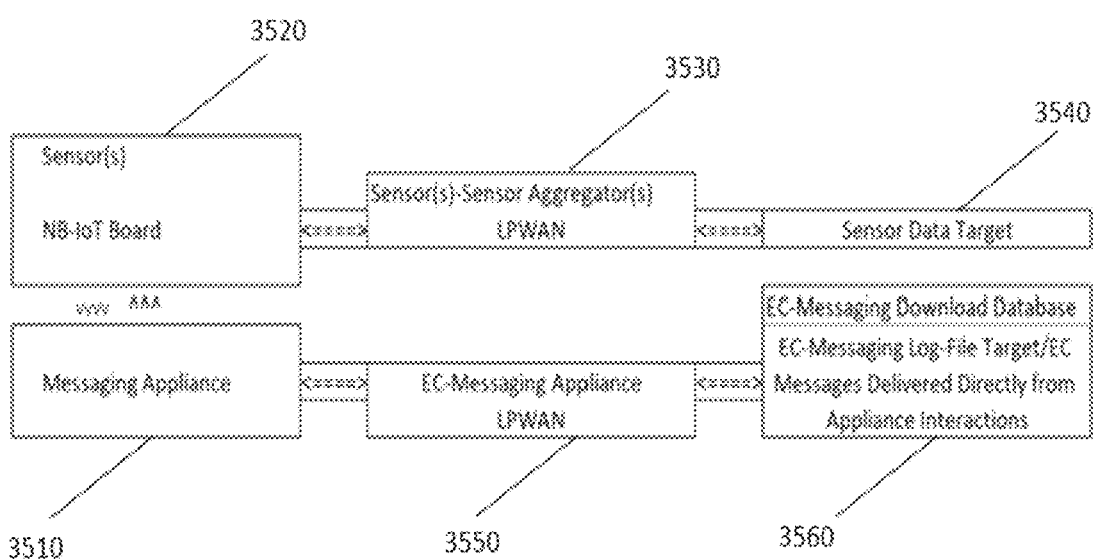
FIG. 35 illustrates one of the alternative relationships between Sensors/Actuator, communications channels, and destinations or sources for those communications channels.

A variety of configurations changing relationships between Sensors/Actuator, communications channels, and destinations or sources for those communications channels. FIG. 35 illustrates the case where the communications connection 3530 from Sensor Device 3520 to its data target 3540 is different than the communications connection from Messaging Appliance 3510 to which Sensor/Activator Device 3510 is connected via bidirectional interface 3550 to EC Messaging central constellation 3560 from which EC Messaging Appliance 3510 receives its downloaded database, uploads its EC Messaging Log File and is the conduit for its Extended-Capability Messages that are not saved on the central servers, but passed through to the network for processing. The LPWAN connection could be instead (or in addition) an NPWAN channel. As noted, both sensors and actuators are supported and other special-purpose devices could be supported as well. With the Extended-Capability Messaging Appliance, one can add enhanced messaging capability without modifying the sensor- or other IoT target server.

Figure 36:
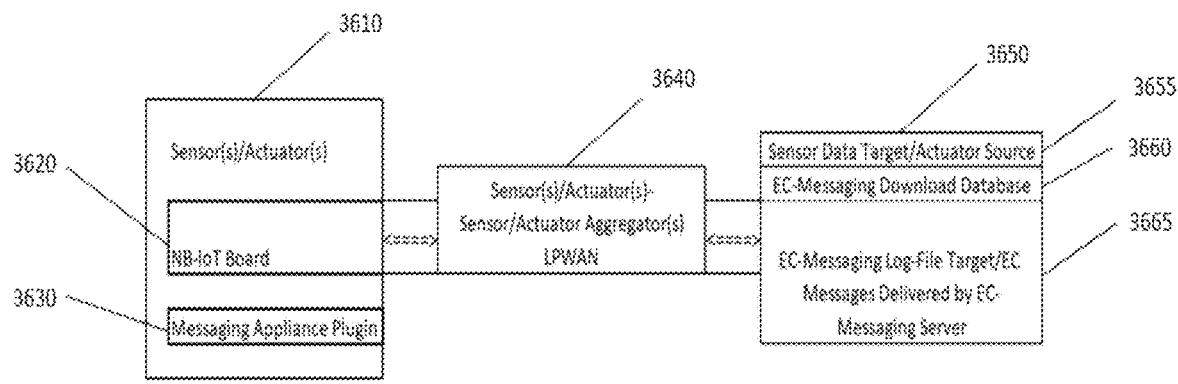
FIG. 36 shows a configuration with sensor device(s) with a plug-in Extended-Capability Messaging Appliance and with communications for both sensor(s) (and/or actuator(s)) via an NB-IoT board through a single LPWAN to a central site.

FIG. 36 illustrates the case where Sensor/Actuator Device component 3610 with its LPWAN interface 3620 (in this case an NB-IoT Board) is integrated with a plugged-in EC Messaging Appliance 3630 and there is a single shared LPWAN (or NPWAN) communications channel 3640 that provides the interface with the shared central server complex 3650 that provides the Sensor Data Target for Sensor Device (or Actuator) component 3655 and from which plugged-in EC Messaging Appliance 3630 receives its downloaded database 3660, uploads its EC Messaging Log File and is the conduit for its Extended-Capability Messages 3665 that are transmitted by the EC Messaging Server. The Extended-Capability Messaging Server distributes the messages (e.g., via text or e-mail) rather than messages being directly sent by an EC Messaging Appliance.

Figure 37:
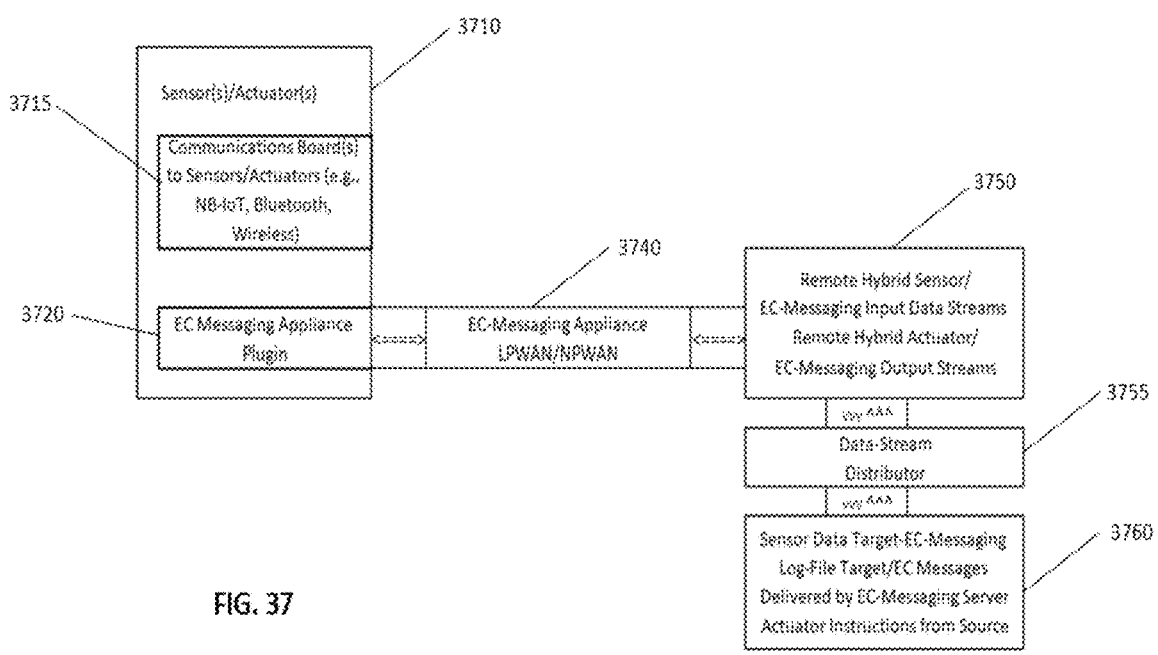
FIG. 37 illustrates a combined device incorporating both Sensors/Actuators and a Plug-In EC Messaging Appliance that communicates via an LPWAN or NPWAN channel from the Plug-In EC Messaging Appliance to a central site using a Data-Stream Distributor to distribute the sensor/actuator and EC Messaging data.

FIG. 37 shows a configuration of a Sensor Device combination 3710 with Communications Board(s) to Sensors and Actuators 3715 is integrated with Plug-In EC Messaging Appliance 3720 served by communications channel 3740 originating with EC Messaging Appliance 3720 connecting the combined Remote Hybrid Sensor/Actuator data/instructions data stream and EC-Messaging Input Data Stream and EC-Messaging Output Data Stream 3750 (downloading of EC Messaging Database to ECM Appliance also included, but not shown) which is connected to Data-Stream Distributor 3755 which in turn is connected to via one or more connections (only one shown) from Data-Stream Distributor) to the combined Sensor/Actuator-Data Target and for EC Messaging, the downloading of the EC Messaging Database, the target for the EC-Messaging Log File, with the EC Messages delivered by the EC Messaging Server 3760 or alternatively sent directly from the ECM Appliance.

Figure 38:
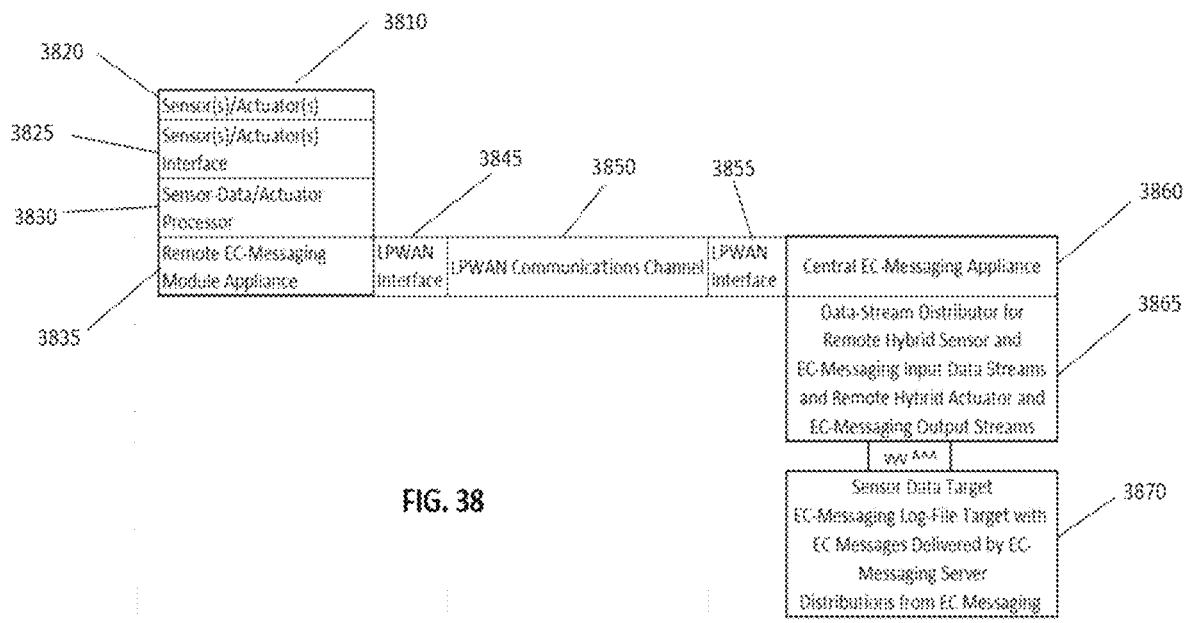
FIG. 38 illustrates the case where there are Extended-Capability Messaging Appliances at both ends of the communications channel.

The ECM Appliance can receive immediate messages (including sensor-data and actuator-control instructions) initiated by authorized user messages input via the ECM Central (Database) Server without having a database downloaded to the ECM Appliance. Alternatively, such messages can be placed in the database and communicated via frequent database downloads or by triggering such a download. In one embodiment, an ECM Appliance is built into an assembly with a single sensor and/or actuator and acting also as a gateway (including concentration function0 for other sensor(s)/actuator(s). In another embodiment the ECM Appliance is incorporated into the SD Card or USB format that can be plugged into another computing device (even into a regional server). For ease of installation, the applicable software configuration can be preloaded into an incorporated EPROM or EEPROM. In another embodiment, a virtual server with the ECM Appliance functionality can be installed. In some embodiments one of the functions built in is the ability to update communications protocols or even change them Appliances at Both Ends of Communications Channel FIG. 38 illustrates the case where there are Extended-Capability Messaging Appliances at both ends of the communications channel. At the remote end 3810, sensors 3820, sensor(s) interface 3825, the Sensor-Data Processor 3830 integrated with EC-Messaging Appliance 3835 with EC-Messaging Appliance 3835, connected to the Central EC-Messaging Appliance 3860 via bidirectional remote LPWAN Interface 3845 and LPWAN Communications Channel 3850 through central LPWAN Interface 3855 to the central Extended-Capability Messaging Appliance 3860 which is interfaced to functionality 3865 containing the Data-Stream Distributor for the Remote Hybrid Sensor/Actuator and EC-Messaging Data Streams and the EC-Messaging Output Stream. Element 3870 provides for distribution to the Sensor-Data Target, delivers the EC-Messaging Log-File, incorporates the Database File to be downloaded to the EC-Messaging Appliance 3835, and receives the EC Messages that are to be delivered by an EC-Messaging Server.

Extended-Capability Messages can be triggered by conditions generated by sensor-data input or time-specified reminders downloaded to the Remote Extended-Capability Messaging Appliance. As to frequency of scheduling of database downloads, the downloads are small and may not constitute a data quantity burden, but one can mark a database to be downloaded as either (a) updated since the last download and if it is time to download the database or (b) there is a request from the Remote EC Messaging Appliance, then do not proceed with the download. The Extended-Capability Messaging data base can also be downloaded a predetermined time or triggered by a defined condition in the data.

Messaging for Non-Sensor Applications

Figure 39:
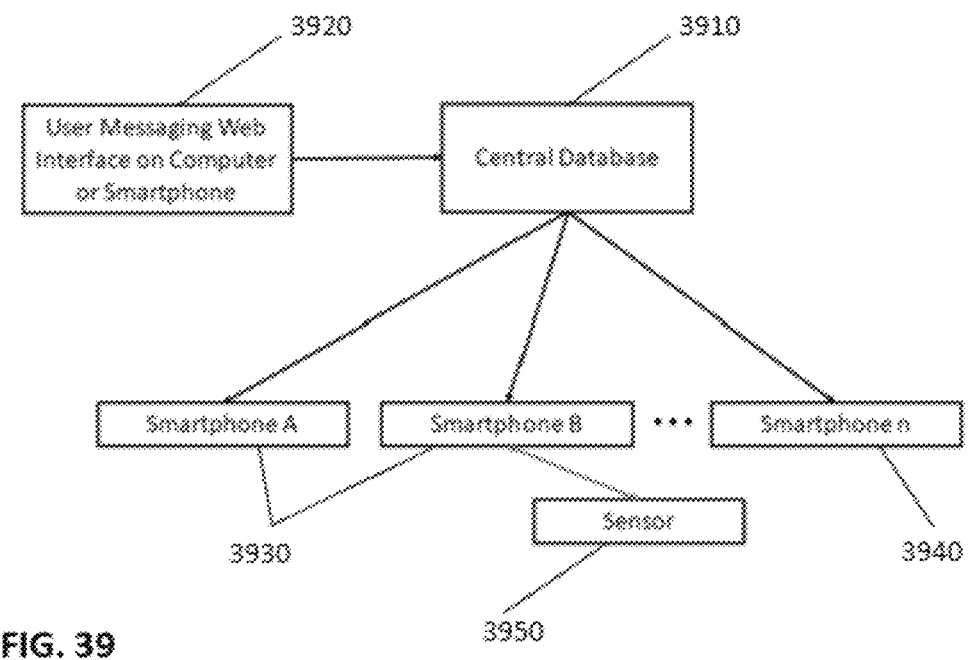
FIG. 39 shows Extended-Capability Messaging used not in a sensor-based context.

FIG. 39 shows a case where the Extended-Capability Messaging is used not in a sensor-based context but for messaging among smartphones (or computer devices supporting messaging). The messaging input 3920 updates the Extended-Messaging Database residing in Central Database 3910. Smartphones A, B (both noted as 3930 through Smartphone n) 3940 have their specific database downloaded to their device. The smartphone application could be implemented with input from an onboard sensor 3950 that can be responded to locally (such as implantation of a fall detector) or communicated externally, such as the communication of GPS coordinates or that a fall has occurred.

Figure 40:
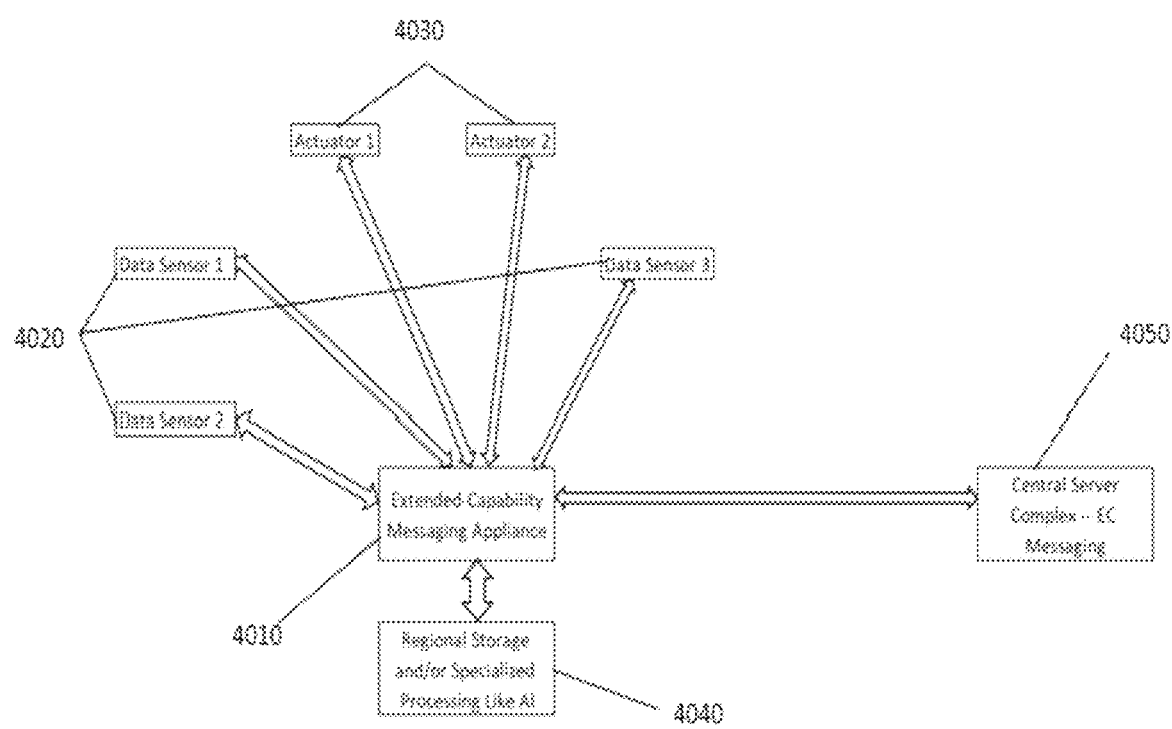
FIG. 40 illustrates a case where the EC Messaging Appliance is connected to a Regional Storage and/or Specialized Process Device.

FIG. 40 shows the case where sensors 4020 and actuators 4030 are connected to ECM Appliance 4010 (usually using LPWAN communications) which is in turn connected to Regional Extended-Capability Messaging Server, Storage and/or Specialized Process Device (for example, an Artificial-Intelligence Processor) 4010 as well as the Central Server Complex (which may include EC Message distribution) 4050. The Regional Extended-Capability Messaging Server, Storage and/or Specialized Processor Device can provide added functionality without having either to add that functionality to the ECM Appliance 4010 or have the desired functions added to Central Server Complex 4050.

Message Flow

Figure 41:
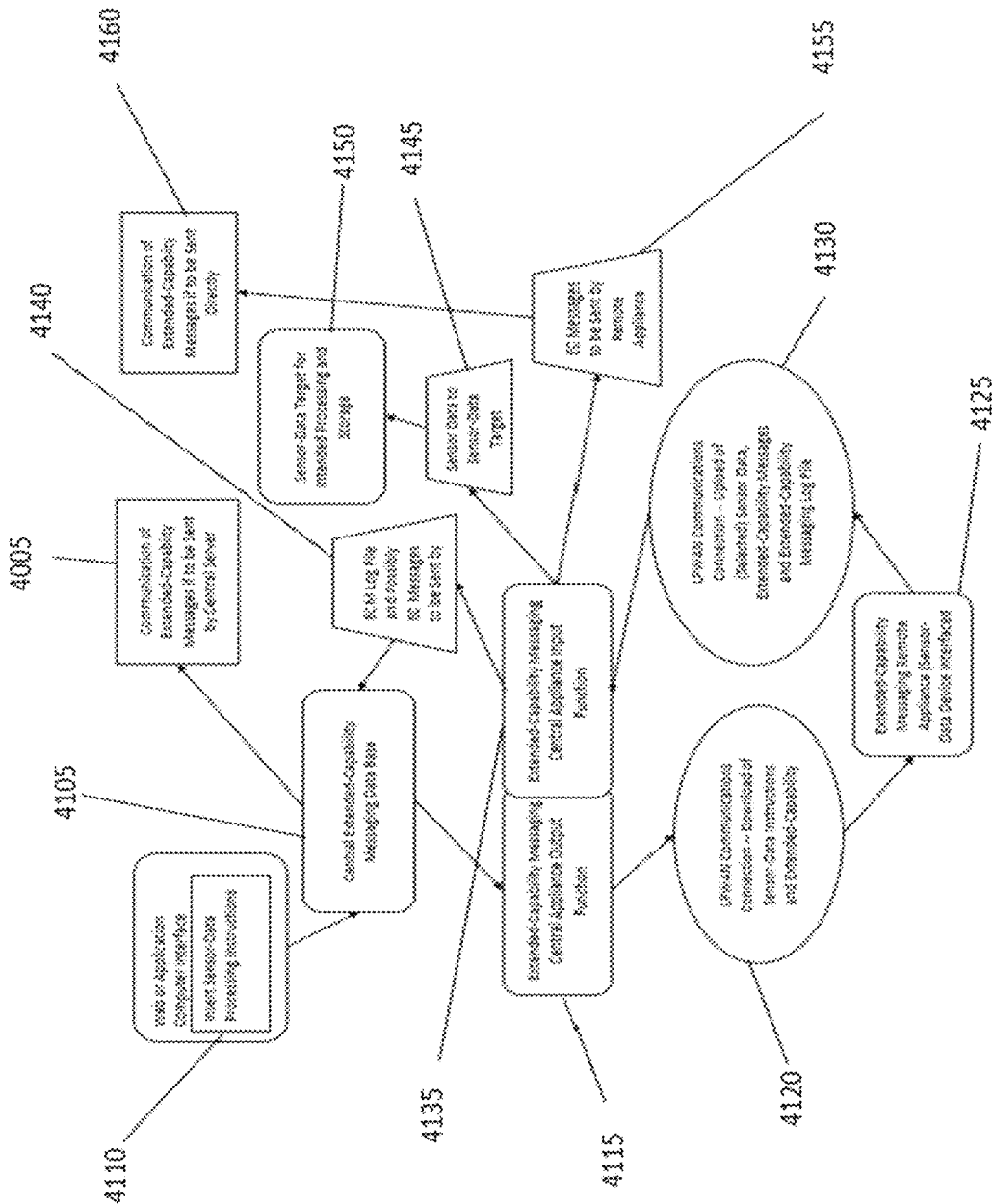
FIG. 41 shows Extended-Capability Message flow applicable to sensor-related use cases.

FIG. 41 shows the Extended-Capability Message flow applicable to sensor-related use cases (also actuator use cases, not shown). Web- or Application-Computer Interface 4110 is the vehicle for inserting Sensor-Data Processing instructions (or actuator instructions) into Central Database 4105. In this figure, the database records specific to a given pair of central and remote EC-Messaging Appliances are extracted from Central Database 4105 are transmitted by Central Appliance Output Function 4115 through LPWAN communications channel 4120 to the Remote Appliance 4125. In terms of return of messaging elements, uploads occur from Remote Appliance 4125 are communicated through LPWAN channel 4130 through the Central Messaging Appliance Input Function 4135 which provides for distribution in terms of transmission of the Extended-Capability Log Files 4140 going to Central Database 4105, Sensor Data destined to Sensor-Data Target 4145 for intended processing and storage 4150, and EC Messages to be sent by Remote Appliance 4155 are sent by Communication of Extended-Capability Messages for those that are to be sent directly. In embodiments where the messages originating in the ECMA are actually going to be sent by a central-server-based Extended-Capability Messaging Server rather than being transmitted directly, the ECMA can send minimal information so partially filled out message template can be completed and sent. This allows different messages to be sent based on user type. For example, water-use messages could be sent to customers as a component of a smart-metering application.

Figure 42:
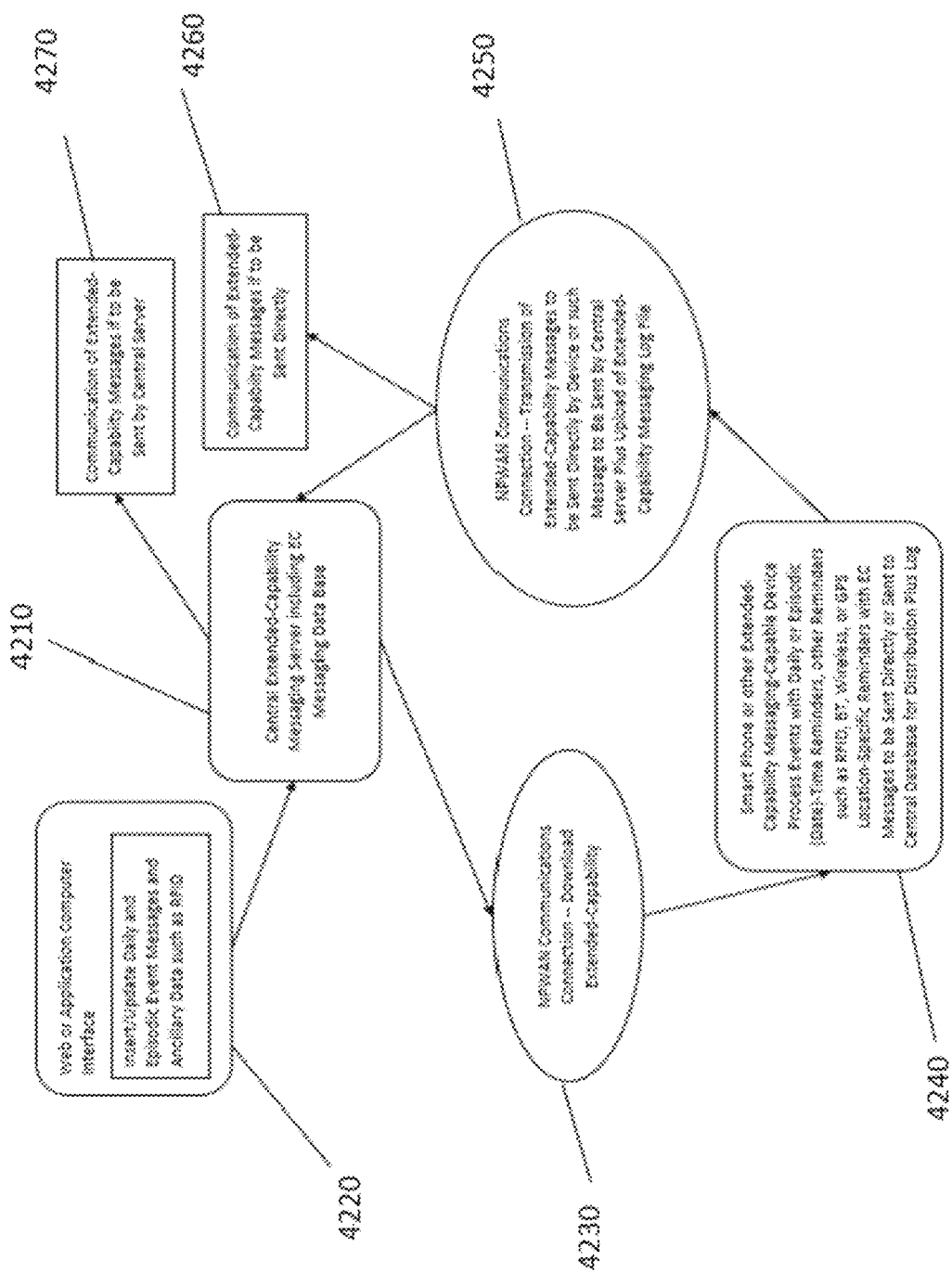
FIG. 42 illustrates Extended-Capability Message flow applicable to non-sensor-related use cases.

FIG. 42 shows the Extended-Capability Message flow applicable to non-sensor-related use cases. Web or Application Computer Interface 4220 is the vehicle for inserting or updating Daily fixed-time and Episodic Event Messages and ancillary data such as reminders related RFID location being sent to Central Extended-Capability Messaging Server that includes the EC-Messaging Database 4210. In this figure, the database records specific to a given target smartphone or another EC-Messaging Capable Device 4240 are extracted from Central Database 4210 and transmitted by NPWAN communications channel 4230 to the target IoT Device 4240. After reminders are processed in target IoT Device 4240, return of messaging elements and uploads from target IoT Device 4240 are communicated through NPWAN channel 4250 to the Central Extended-Capability Message Server 4210 that includes the EC-Messaging Database that receives the uploaded Log Database file whose records are inserted into the EC-Messaging Database. If the Extended-Capability Messages are to be communicated directly through the attached network, they are routed through 4260, for communication of those messages directly. If the Extended-Capability Messages are to be sent by the Central Server, they are routed to 4270 for transmission. In some cases, the web-mediated actions come via micro services. Some of the communications of the ECM Appliance can be handled on a web server implemented on the Appliance including utilizing web services.

Hardware Implementation of Remote Ec Messaging Appliance with Combiner/Splitter

Figure 43:
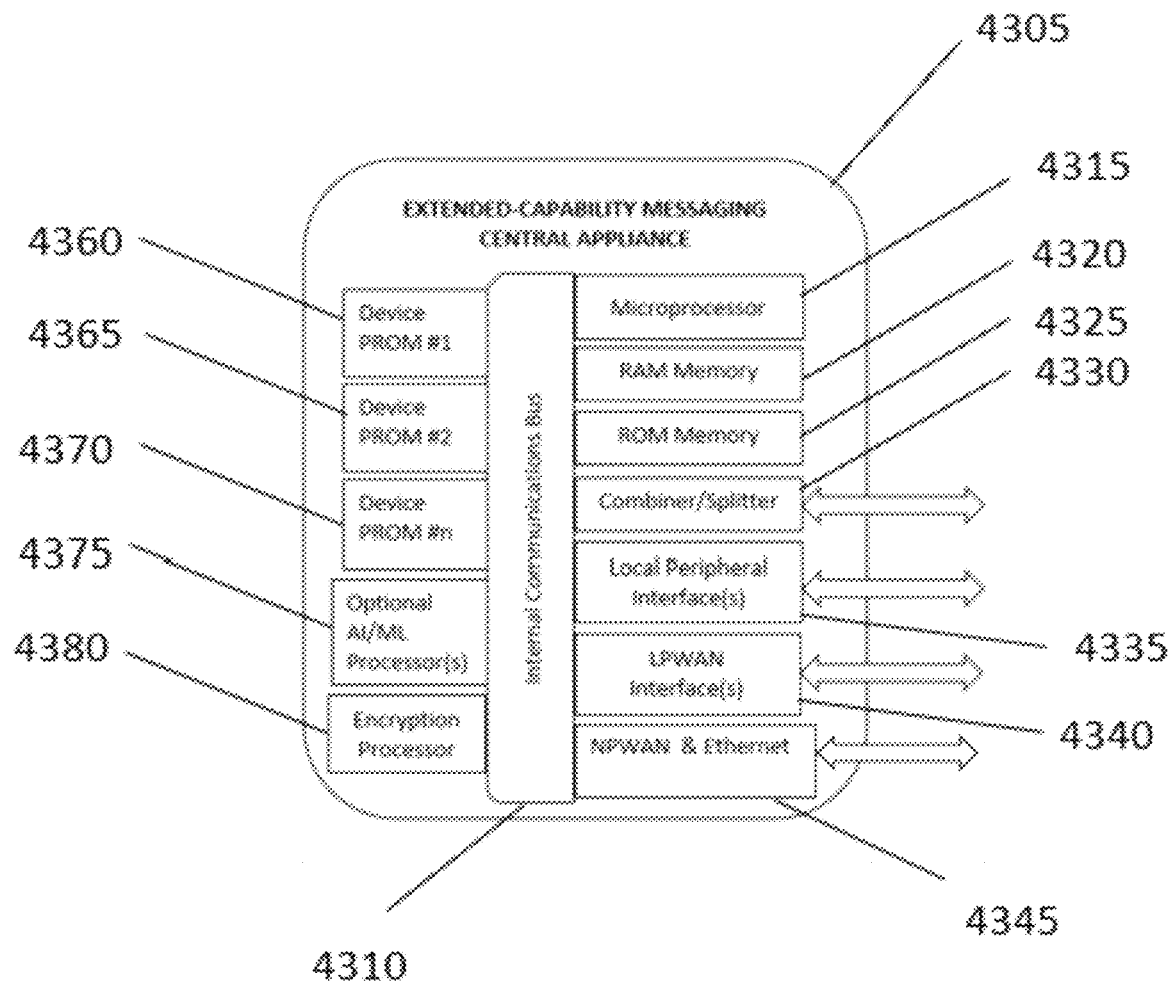
FIG. 43 shows the components of a Central Extended-Capability Messaging Central Appliance.

One embodiment of the Remote Extended-Capability Messaging Appliance is configured to interact with a Central Extended-Capability Messaging Appliance since have Combined/Splitters in both units. FIG. 43 shows the Internal components of an Extended-Capability Messaging Central Appliance 4305 containing a Combiner/Splitter that is composed of Microprocessor 4315, RAM Memory 4320, ROM Memory 4325, Combiner/Splitter 4330, Local Peripheral Interface(s) 4335 (that may include Bluetooth and/or wireless), and LPWAN interface(s) 4340, and NPWAN and Ethernet Interface(s) 4345 tied together by Internal Communications Bus 4310. Optionally, PROM Devices (e.g.,

4360, 4365, through n 4370), AI/ML Processor(s) 4370, and/or Encryption Processor 4375 can be plugged into Internal Communications Bus 4310.

Figure 44:
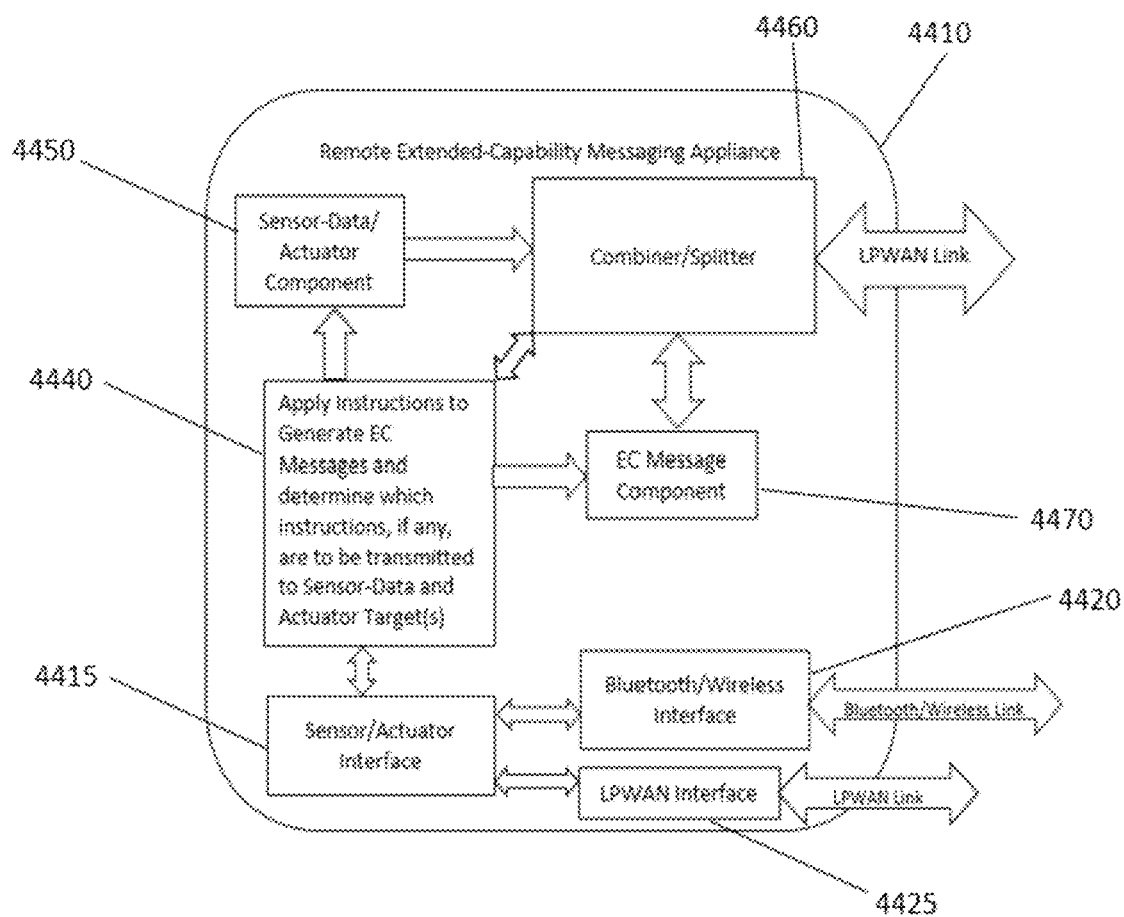
FIG. 44 illustrates the diagram of data flow among the components of the Remote Extended-Capability Messaging Appliance.

In FIG. 44, the Remote EC Messaging Appliance 4410, is composed of Sensor Interface 4415 with its external communications links Wireless and Bluetooth 4420 and LPWAN interface 4425 is connected to block 4440 Apply Instructions to Generate EC Messages and determine which data, if any, are to be transmitted to Sensor-Data/Actuator-Data Component 4450 that is connected to the determine the Sensor-Data/Actuator Component transmitted to Combiner/Splitter 4460. Combiner/Splitter 4460 is also connected to EC Message Component 4470 that provides the EC-Message component generated by Apply Instructions to Generate EC Messages and determine which data, if any, are to be transmitted to Sensor-Data/Actuator Component 4450. Combiner/Splitter 4460 also has a connection to Apply Instructions to Generate EC Messages and determine which data, if any, are to be transmitted to Sensor-Data/Actuator Component 4450 as well as the external-communications LPWAN Link. The configuration supports cases where target sensor data server will want "native" data stream for its use, but for EC Messaging purposes will want to interpret/convert to a generalized version. One function of the Combiner/Splitter is to take care of this with the ability to send two streams from remote ECMA, one with "native" and the other with the generalized version. ECM Appliances at both ends of the communications channel allow complementary functions such as an Appliance-specific communications-channel encryption.

Hardware Implementation of Central Ec Messaging Appliances

Figure 45:
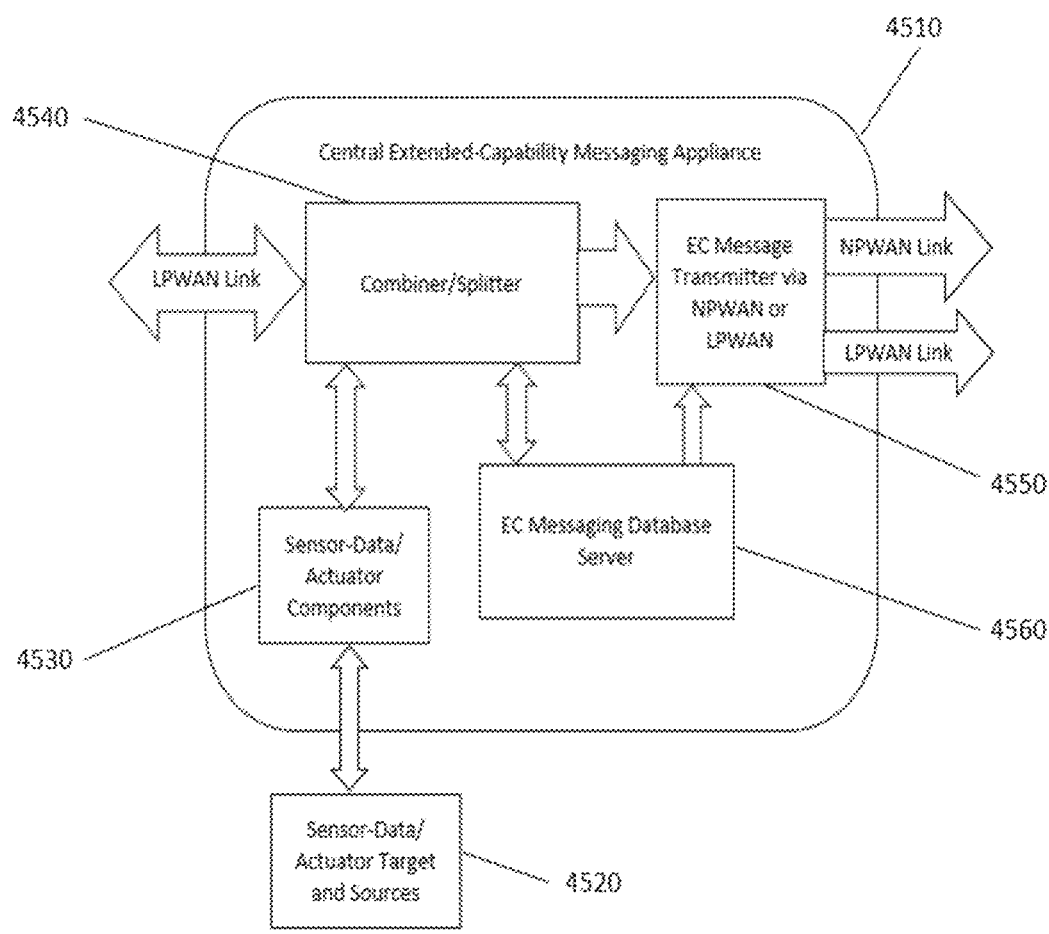
FIG. 45 illustrates the diagram of data flow among the components of the Central Extended-Capability Messaging Appliance.

FIG. 45 illustrates the configuration of the Central Extended-Capability Messaging Appliance 4510. Elements are input link LPWAN Link interacting Combiner/Splitter 4540 from which Sensor-Data/Actuator Components 4530 whose output goes to the Sensor-Data/Actuator Target and Sources 4520. With respect to EC Messaging, interactions of the Combiner/Splitter 4540, one output goes to the EC Message Transmitter 4550 via NPWAN or LPWAN for messages being sent directly. Another output goes to EC Messaging Database Server 4560 to generate the EC Messages with transmission of those messages to the EC Message Transmitter via NPWAN or LPWAN. EC Messages are transmitted from the EC Message Transmitter via NPWAN or LPWAN. The hardware of the Combiner/Splitters has the capability to handle either "native" or generalized data/instruction streams and to handle LPWAN and NPWAN streams as well as to handle security including multi-level authentication. The Central Extended-Capability Messaging Appliance also handles downloads of the kgiven Remote ECM Appliance database. Blockchain can be included as well. The LPWAN Link input to the Remote ECM Appliance could be NPWAN as well. In addition (not shown) are AI functions (AI Processor 4375 shown in FIG. 43, if so configured. Other elements of FIG. 43 can be included as well, including encryption processing and use of PROM/EPROM/EEPROM for functions like holding templates for messaging or even instructions for sensors, actuators, or other hardware. Use for instructions, however is less likely than such use in Remote ECM Appliances.

In some embodiments, two device (e.g., sensor) data streams will be transmitted to the Central ECM Appliance, one a native data stream for transmission to the target data processor and the other in a more generalized version for interpretation processing in another target such as an EC Messaging Server.

Lpwan Alternative Communications Configurations

Communications protocols applicable to EC Messaging are myriad since EC Messaging is protocol agnostic. This wheel and spoke protocols, Mesh communications protocols (like Zigbee), and other protocols (e.g., NB-IoT, Bluetooth, and Wi-Fi) are compatible. Extended-Capability Messaging Appliance can be supported by essentially any IoT communications provider.

Communications Security

Two aspects of security are encryption of messages and whether the operating system upon which the given application is built is secure. Communications protocols like LoRaWAN have security built in. LoRaWAN networks are protected by end-to-end AES128 encryption and include mutual authentication, integrity protection, and confidentiality. One embodiment of the ECM App includes its own built-in secure-messaging protocol. Other embodiments are a multilevel authentication protocol is implemented, any standard IoT security protocols, a blockchain mechanism, and a custom security protocol.

Most operating systems are based on the C and/or C++ languages. These are inherently weak because of use of pointers and potential for memory leaks. Two operating systems, Tock and Redleaf, have been implemented on kernels that are implemented in Rust. Not all functions have been implemented yet without using at least C and/or C++ (e.g., SQLite), but likely will be. In at least some embodiments of the Extended-Capability Messaging Appliance, the operating system software platform will be implemented in Tock, Redleaf or their equivalents. Messaging can include blockchain implementations.

Time Series Databases

As opposed to Relational Database Management Systems (RDMS) Time-Series Databases as opposed to Relational Database Management Systems handle time-series data very efficiently. This includes selective preprocessing of data such as averages over a given period of time such that the calculated data are immediately available. TDEngine is a time-series database management system that can be deployed on a central server or at the Edge. There are a number of time series databases available including those that are open source such as InFluxDB and QuestDB. One Appliance implementation includes a Raspberry Pi or ARM processor on which a time-series database management system like TDEngine is installed. Output of the time-series database engine can be input to the AI processor.

Artificial Intelligence (AI)

Applications of AI occur at both the edge, integrated with the ECM Appliance on one or more central websites or both. This is besides deterministic and stochastic processing including calculation, logic and calculation and logic. Examples include Machine Learning, Deep Learning, Adaptive Learning, Federated Learning, Knowledgeable-Based Systems, Model-Based Reasoning, Rule-Based Reasoning, Case-Based Reasoning, Large Language Models including domain-specific or subdomain-specific tailored models, Generative AI, Retrieval-Augmented Generation, ChatBots including inputs from any AI modality, Active Inference, Fuzzy-Logic Reasoning, Cognitive Computing, and other modalities, including a hybrid approach applying one or a multiple AI modalities through application of one one or more mechanisms among determined priorities, voting among outputs, and other mechanisms.

The one or more AI modalities are located locally, regionally, or centrally, where if located locally, contents are obtained from one or more sources such as downloaded content and plug-in modules, communicated through one or more mechanisms such as generally accessible and specialized portals. Such modalities can be used to detect patterns, data filtering, determine sensor fusion, or decide on changes to sensor-sampling characteristics. Examples are calculating times that a device is in given states, determining compliance with system rules describing overall systems results, describing targeted system results, determining results for a specific IoT device, determining results for a designated set of IoT devices, generating suggestions for changes in messages, and generating suggestions for changes in system behaviors. This includes analysis of log files for events that have already occurred and for directing actions on a real-time basis. The ECM Appliance has an option to include AI modules on board such as TensorFlow functionality. As to AI on the web server, Oracle with its MySQL HeatWave Database has brought Machine-Learning functionality into the database as opposed to having to export data to apply Machine-Learning functionality. Because of the massive amount data that can be generated in some sensor applications, unless those data are consolidated in summary values, Machine Learning/Deep Learning are typically more useful than Rule-Based Reasoning and Model-Based Reasoning in very specific applicable domains. The location of AI processing can be implemented in the Remote Extended-Capability Messaging Appliance, the Central Extended-Capability Messaging Appliance, the Extended-Capability Messaging Database, or an Ancillary Server.

Whether Artificial Intelligence is involved or not, data are processed based on factors combined from one or more sources selected from the group consisting of any local elements, interfaced Extended-Capability Messaging Appliances, interfaced Internet of Things devices, regional servers, including incorporated databases, if any, and central servers, including incorporated databases, if any, where the source connections can be selected from the group consisting of continuously connected and disconnected after relevant information received. AI and other processing can be done at the edge, on regional servers (fog computing layer) or central servers (cloud computing layer), with ability to distribute computing where the overall system is optimized.

Artificial Intelligence can be applied to various aspects of Extended-Capability Messaging. One can have an AI-based advisor making messaging suggestions or supporting automated message generation. One element is the selection of which category or subcategory of message targets. A key functionality is to have the ability to revise instruction payloads to sensor and actuator devices. A key element is to analyze past and current incoming data and draw conclusions or make suggestions on operating the system more effectively or efficiently. Another function of AI is to analyze the stream of Extended-Capability Messages using one or more of techniques above to look for patterns such as sensor-data out-of-bounds alerts. An aspect of this is to predict upcoming situations to better prepare for them. An example is to predict the need for pumping at a higher water pressure or have availability of more water. One function is to analyze the predictions and automatically take or recommend actions. One approach is to build a model to be used by AI agents. Suitably trained, the agent generating different timed messages, fixed-time messages, calendared messages, and activity messages as well as capturing of behaviors. An agent can use appropriate Extended-Capability Message Cluster for selecting message contents and destinations and relaying. Whether Artificial Intelligence is incorporated or not, the system includes the capability of optimizing performance of the overall system being automated such as quantity and quality of crop to be harvested.

Whether Artificial-Intelligence is involved messages can be triggered by one or more actions of initiation and provision of input come from conditions occurring in the associated Extended-Capability Messaging Appliance, conditions occurring in the overall network, episodic times in a local or server database, fixed times in a local or server database, determined bu AI, generated prompts, replies to Extended-Capability Messages made by a human user or a system.

Hybrid AI Backbone

Figure 46:
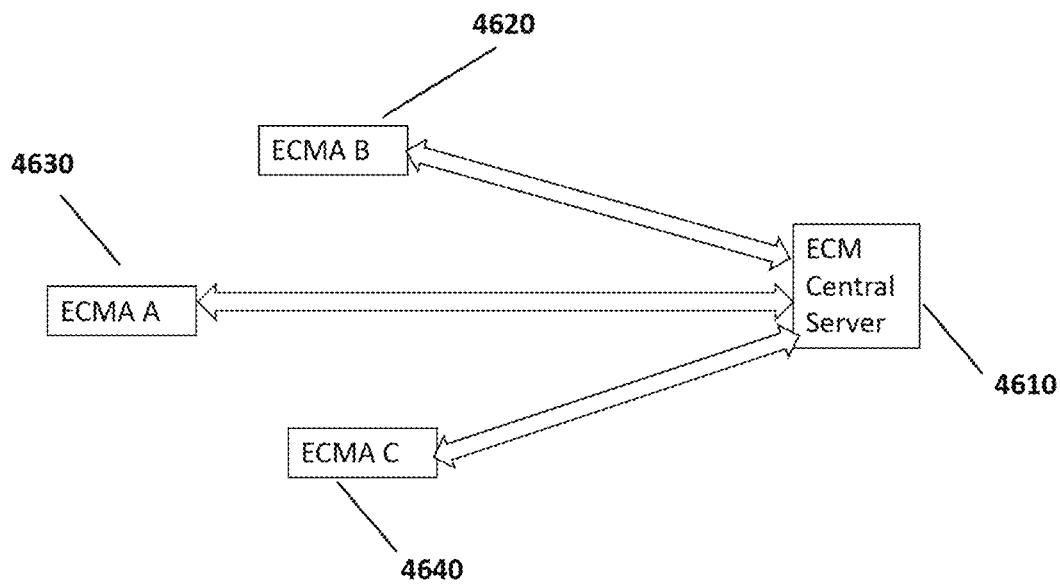
FIG. 46 shows a diagram of an Extended-Capability Messaging Appliance Backbone.
Figure 47:
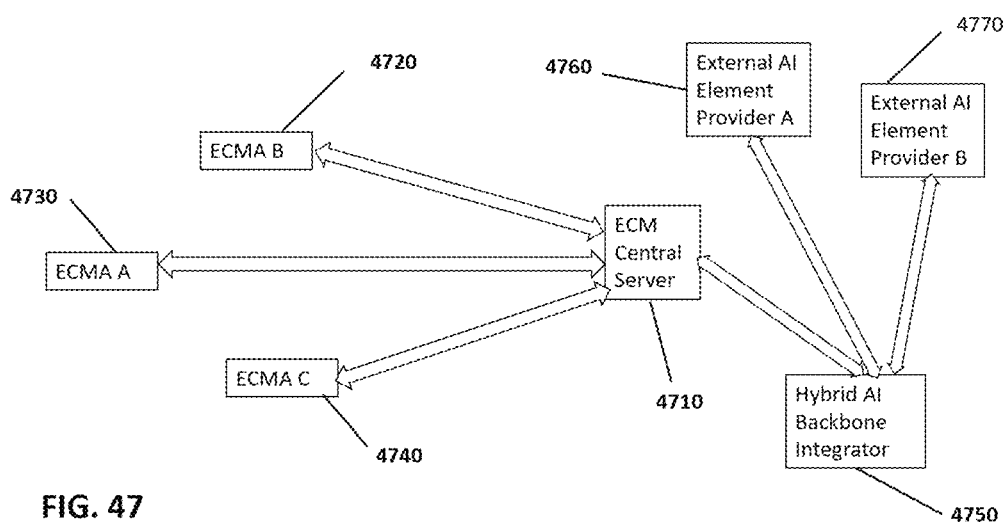
FIG. 47 illustrates a diagram of a Hybrid AI Backbone.
Figure 48:
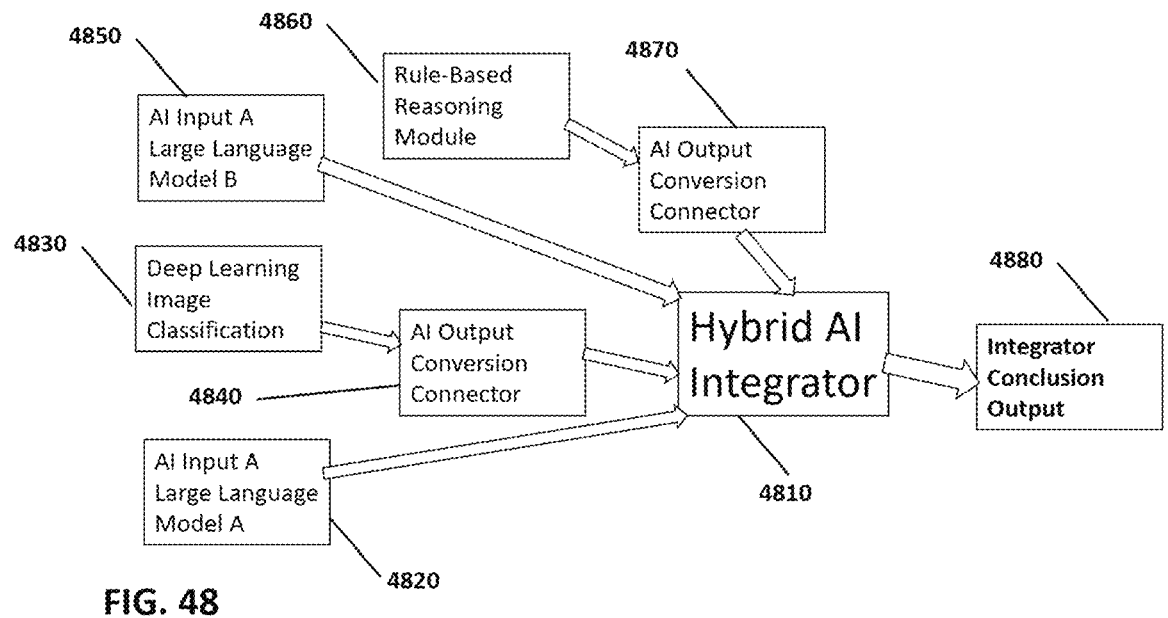
FIG. 48 shows a diagram of an Extended-Capability Messaging Hybrid AI Backbone Integrator.

One or more ECM Appliances combined with network components such as networked IoT devices, smart devices, servers, desktop computers, laptop computers and smartphones constitute a basic backbone. Overall, components of Hybrid AI Backbone deploying Artificial-Intelligence elements include one or more Extended-Capability Messaging Appliances, networked IoT device, plurality of networked IoT devices, networked smart device, plurality of networked smart devices, networked server, plurality of networked servers, computer of any type, and plurality of computers of all types. A simple example of backbone involving real or virtual ECM Appliances and a servers is shown in FIG. 46. The overall basic backbone has ECM Appliance elements 4620, 4630, and 4640 that communicate with central server 4610 When one or more Artificial-Intelligence capabilities are incorporated or overlaid on such a backbone, possibly including additional elements, one creates Hybrid AI Backbone, recognizing that AI systems of different types such as Deep Learning and Rule-Based Reasoning approaches can potentially be included, that constitutes a Hybrid AI Backbone. An example of a Hybrid AI Backbone is shown in FIG. 47. ECM Appliances. 4720, 4730, AND 4740 communicate with ECM central server 4710. When Artificial-Intelligence capabilities are added to these elements, one has a Hybrid AI network. One can also add additional elements to the Hybrid AI Backbone including Hybrid AI Integrator 4750 that interacts with ECM central server 4710 and external AI element providers 4760 and 4770. As illustrated in FIG. 48, the multiple AI elements functioning within a Hybrid AI Backbone along with non-AI elements participating in the process can contribute to reaching a conclusion or conclusions or guide actions output from Artificial-Intelligence Integrator 4810. One mechanism for determining such a multiple-input conclusion is to use the diverse elements is to use the output of AI sources as input to the Hybrid AI Integrator including natural language, specialized data sets, mathematical formulations, tables and other information formats incorporated in the Hybrid AI Backbone. The outputs of the diverse elements are optionally transformed into their natural-language versions to be used as input to the Hybrid AI Integrator. The output of the Hybrid AI Integrator is a natural-language conclusion generated by a Large Language Model optionally including data sets, mathematical formulations, tables, or other information formats including the ability to generate a combined summary statement.

An example of a network including a Hybrid AI Integrator shown in FIG. 48, inputs to Hybrid AI Integrator 4810 are AI input elements Large Language Models 4850 and 4820, Deep Learning Image Classification elements 4830 with optional AI Output Conversion 4840 element transforming the output of the classification element, and Rule-Based Reasoning Module 4860 with optional AI Output Conversion 4870 element transforming the output of the Rule-Based Reasoning element 4860. The processing in the Hybrid AI Integrator 4810 involves a Large Language Model including other elements generates an Integrator Conclusion Output 4880. The conclusion may be in natural language, data set, mathematical formulation, table, and other information formats including the ability to generate a combined summary statement.

It is possible using this technique to come to multiple conclusions that can be rated if they relate to the same topic and selected by having the conclusion with the best rating score win. If the multiple conclusions can productively be combined to reach a single conclusion, a Large Language Model having been trained in problem domain (e.g., manufacturing or agriculture) is prompted to ask for the best solution. The Hybrid AI Integrator or any incorporated Artificial-Intelligence vehicle can generate an explanation for its conclusions as well as passing on any explanation by the Integrator's input modules about they have reached their conclusions. One mechanism used for this is to organize the inputs to the integrator as well as the results of the integrators intermediate steps placed in framework slots for easy access and reference.

One can have the messaging output of the ECM Appliance to other systems such as deep-learning training is a byproduct of its operational messaging. Whether a Hybrid AI Backbone is involved or not, the message output from one or more ECM Appliances can be used for such functions of acting as an integrating hub for new information as it evolves, training of Artificial-Intelligence vehicles, exercise of digital twins, and automation of any type. For example, exercising of digital twins could involve comparing the results of an actual chemical processing facility to its digital twin and run various scenarios on the digital twin and determine what scenario can be productively applied (e.g., process optimization) to the physical processing facility. Additional functions are operator training and predictive maintenance. Examples of the application of Artificial-Intelligence elements include balancing loads, adjusting processing times, semantic filtering, scheduling, predictive maintenance, home automation, facility automation, system configuration, automation of smart cities, diagnosis, monitoring, congestion reduction, and process automation.

Figure 49:
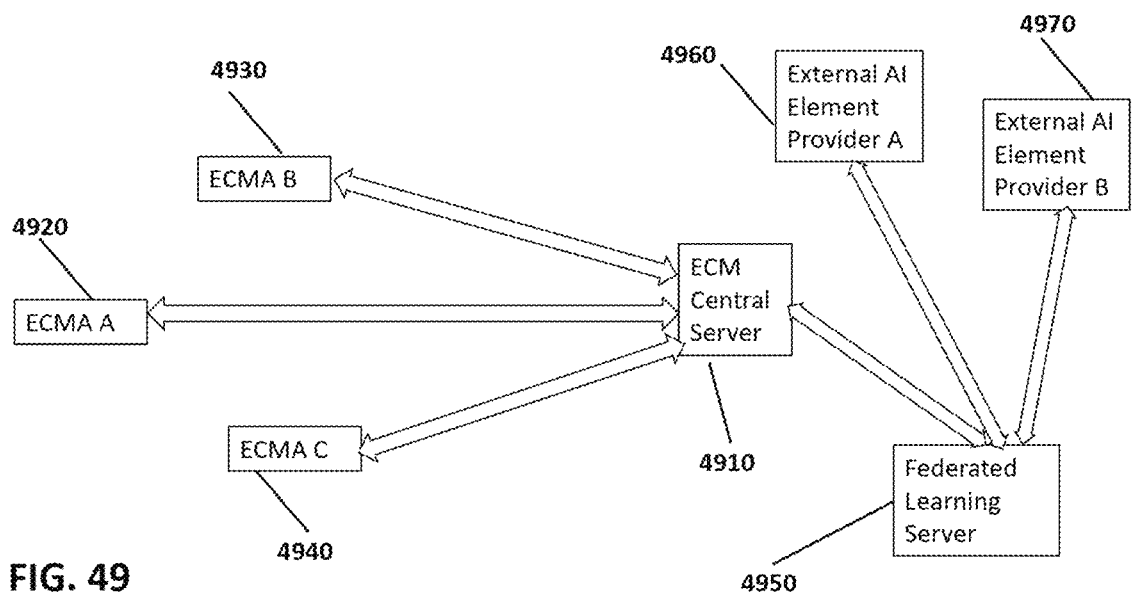
FIG. 49 illustrates a diagram of a Federated-Learning Configuration.

Another modality of AI is Federated Learning as illustrated in FIG. 49. The Hybrid AI Backbone shown has AI-containing elements of ECM Appliances 4920, 4930, and 4940 interfaced to Federated Learning Server 4950 with addition AI elements External AI Element Provider A 4960 an External AI Provider B 4970. Each of the components communicating with Federated Learning Server 4950 has a its own Machine-Learning or Deep-Learning model that is applied locally with results communicated to the Federated-Learning Server 4950 that has significant AI-processing power (e.g., perhaps 100s of GPUs). Retraining is done on the Federated-Learning Server 4950 based on updated inputs from the various AI sources 4920, 4930, 4940, 4960, and 4970 and then the resultant updated model is downloaded back to the input sources. This approach is a powerful technique because the various contributing AI sources, such at the ECM Appliances, in general are not powerful enough to do the desired retraining themselves.

Application to Use Cases

As to use cases, Extended-Capability Messaging can use integrated as a hub or individual-source information to allow those with a need to know to deal with status, comments, instructions, conditions to look out for, elements to be tracked and actions to be taken applied to environments such as home, facility, health, human development, human medicine, veterinary medicine, industry, vehicles, retail, agriculture, manufacturing including robots, warehouses including robots, distribution, transportation, recreation, and other controlled environment. The message content and/or the message targets are determined by having been predetermined, determined by situation, determined by human or AI. The Extended-Capability Messaging Appliance can be applied for the purposes of, but not limited to monitoring, process control, resource management such as conservation and balancing of resources such as water, air, energy, money, time, yield management, capacity monitoring, capacity management, diagnostics, treatment, physiological monitoring, and physiological control acting as an integrating hub for new information as it evolves, training, generating training for AI vehicles, answering questions, automation of any type, configuration, synthesis of input data, analysis of output, implementation of digital twins, AND exercise of digital twins with messaging output to other systems using byproduct of operational messaging or not.

Figures 50, 51:
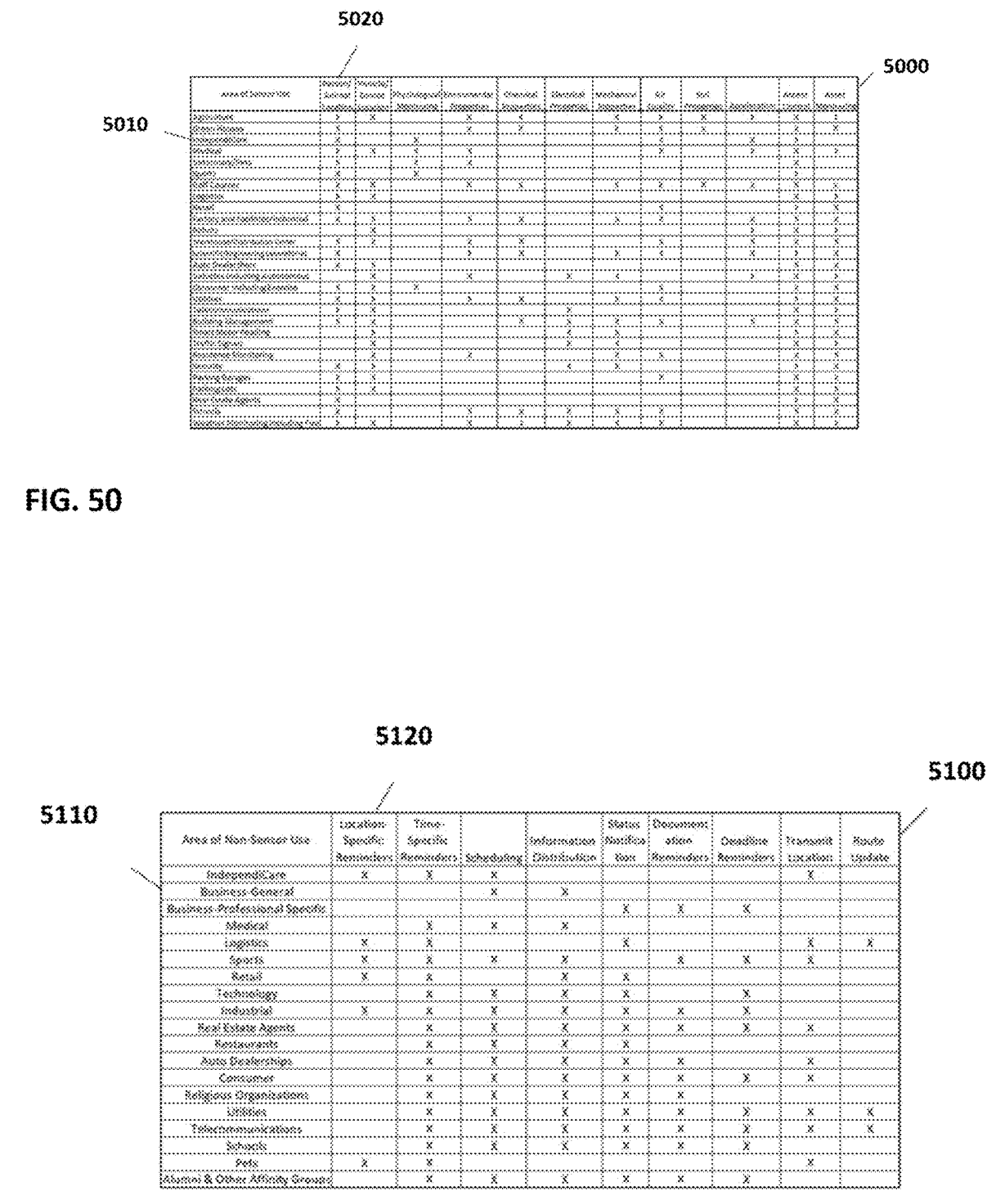

In the sensor world there is a wide swath of use-case examples. A selection is shown in the table 5000 of sensor-related use cases shown in FIG. 50 with the area 5010 for each use and the category of associated sensors for each area 5020 (person/animal tracking, vehicle device location, physiological monitoring, environmental properties, chemical properties, electrical properties, mechanical properties, air quality, soil quality, acceleration, access control, and asset tracking). Additional applications include autonomous vehicle navigation and body-area networking. As to body-area networking, one or more ECMAs interfaced with one or more elements such as sensors, actuators, and smart devices directly or indirectly connected by wire or on a person or animal. Purposes include monitoring of health, delivery of therapies, monitoring of performance, and delivery of performance enhancement information. As whether involving AI of not, a processing configuration consisting of one ECM appliance device or a cluster of ECM appliance devices optionally combined with servers or other IoT devices services an incoming message is serviced with the highest relevance selected from the group consisting of message level, history of message processing, designated function, or determined by AI processing.

An example in the healthcare arena is patient biometrics measured by piece of furniture like a bed or a chair. For checking of status or as sensor-value changes, in addition to values being recorded, causing an actuator to be activated, or transmitted to a regional or central server complex, Extended-Capability Messages can be sent to those with a need to know like a healthcare professional, caregiver, stakeholders like friends or family members, or monitoring facilities. This may result in an action by the message recipient like making sure that the patient is being cared for properly. Examples of actuator use are changing the firmness of a bed or chair, modifying its temperature, or changing head or foot elevation, if applicable based on response to a sensor-value change and/or on a timed basis.

An important application of Extended-Capability Messaging is sending messages from the given ECM Appliance to the user of an energy-using like a vacuuming robot or a lawn-mowing robot of how much energy is being used by those devices and, using Artificial Intelligence, suggestions for using them more energy efficiently. Mike Hazas (Roombas and Landroids): Do Domestic Service Robots Save Energy?" Computing Edge, Digital Objective Identifier 10.1109/MPRV.2021.3067375) notes research showing that projected energy savings touted by vendors are not achieved because the devices are not programmed for efficiency plus standby power can be significant. The EC Messaging can be extended to a household (or a manufacturing plant) with smart IoT Appliance devices to even out energy usage by timing the on and off state of the various connected IoT devices. Use cases where an ECM Appliance interfaced to an accelerometer is utilized to detect conditions selected from the group consisting of detecting an incipient fall by a human and detecting tipping of a package load and issuing a preemptive warning message or detecting an actual human fall or tipping over a package and issuing a notification message. Another use case where an RFID tag reader, imaging device, camera, Radar, Lidar, or other applicable device interfaced to an ECM Appliance is used to detect when an entity such as a human, animal, object, or robot is in proximity and the detection is followed by issuing of a preemptive warning, providing additional information, suggesting actions, answering questions, analyzing data, including messaging those with a need to know. Examples include giving seniors with dementia reminders about what they might best do or consider at a given location or in an inventory application notifying a worker other locations for an item, notifying a system of the need to reorder stock, or updating a database.

There are also a number of use-case examples in the non-sensor world. A selection of these is shown in the table 5100 shown in FIG. 51 with the area for each non-sensor use 5110 and the category of activity for each 5110 (Location-Specific Reminders, Time-Specific Reminders, Scheduling, Information Distribution, Status Notification, Documentation Reminders, Deadline Reminders, Transmit Location, and Route Update).

Other areas or combination categories of use cases are drones, robotics, using cameras for documentation of activity compliance or non-compliance, security applications, support of ghost kitchens, using location-determination devices such as RFID tags with time-stamped data allowing checking whether or not a sequence of locations makes sense. One application is to have a person or animal wear an EC Messaging Appliance (with input from multiple body sensors) with suggestions on medicines or to slow down or to take a walk. EC Messaging in the case of a patient can send need-to-know messages, as appropriate to the patient, health professionals, family, and friends. Except for the animal patient, EC Messages can be sent to the other categories. AI can be incorporated in the ECM Appliance for such purposes as mapping weed versus crop areas from video taken a drone. An overall consideration is that EC Messages allow remote operations with the functionality of allowing those involved with a need-to-know to do so with the comfort of knowing that key information will be messaged to them on a continuing basis. Whether an application involves sensors or not ECM supports query-response functionality answering questions using Retrieval Augmented Generation combining information from one or more sources such as one or more databases, files, scraped web pages, user inputs, and explicit statements with that contained in a language model selected from the group consisting of small, medium, and large.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention.

I claim:

1. An appliance device for Extended-Capability Messaging with Input-Output (IO) device capabilities, where instructions for generating messages are downloaded from a database in a manner selected from the group consisting of whole database and interim updating, messages of the category selected from the group consisting of received, transmitted, and processed are of type selected from one or a plurality of the group consisting of time-specific, location-specific, commands for processing to be executed in the Extended-Capability Messaging (ECM) Appliance, and commands to another internet of Things (IoT) device where the origin of the messages is selected from the group consisting of programmed into the appliance device including in response to IO conditions, received from another ECM Appliance, received from a non-ECM Appliance IoT device, downloaded from a regional server, downloaded from a central server, downloaded from another ECM Appliance, calculated internally any form of read-only memory (ROM), and Artificial Intelligence (AI), where the messages can cause one or a plurality of actions selected from the group consisting of audio, light output, vibration, visual display, text, text with indication of originating position based on GPS coordinates, e-mail, e-mail with indication originating positions based on GPS coordinates, forced notifications, images, binary, custom operated actuator, operate robots, instructions to other ECM Appliances, instructions to other IoT devices, and custom messaging, where message actions by the ECM Appliance are triggered by one or a plurality of factors selected from the group consisting of time, location, instruction, AI, and meeting criteria in an analyzed data stream, delivered by a mode selected from the group consisting of directly, via regional server, and via central server, where messages to targets are selected from the group consisting of relayed and not relayed.

2. The appliance device of claim 1 where the ECM Appliance is composed of one or a plurality of the group consisting of microprocessor, battery, solar-panel interface, RAM, ROM, PROM, EEPROM, Combiner/Splitter, local peripheral interface, SIM-card interface, Low-Power Wide Area Network (LPWAN) interface, Normal-Power Wide Area Network (NPWAN) interface, and Ethernet Interfaces tied together by an Internal Communications Bus including one or a plurality of elements selected from the group consisting of ROM Devices, AI processors including GPUs, Machine-Learning Processors, Deep-Learning Processors, Federated-Learning Processors, integrated input devices, integrated output devices, Trusted Platform Module (TPM) chips, custom chips, and Encryption Processor plugged into an Internal Communication.

3. The appliance device of claim 1 where the translation from a generic instruction to a vendor-specific sensor or actuator IoT device is carried out by a component selected from the group consisting of PROM, EPROM, EEPROM, FPGA, and ASIC connected to the appliance in a manner selected from the group consisting of plugged into and integrated-directly with the printed circuit board of the appliance.

4. The appliance device of claim 1 in which the overall system configuration for the purposes selected from the group of set up, modification, and monitoring by interaction with an interface whose generic instructions may be translated into vendor-device specific instructions where the type of user interface is selected from the group consisting of Graphic User Interface and command-line user interface.

5. The appliance device of claim 1 where elements associated with the server configuration are selected from one or a plurality of the group consisting of sensor data target, ECM download database, ECM log-file target, ECM-delivery server, Artificial-Intelligence processing server, remote hybrid sensor, remote hybrid actuator, Extended-Capability-Messaging ECM input data stream, ECM output stream connected to data-stream distributor with outputs to sensor data target, and ECM server.

6. The appliance device of claim 1 where the translation of data streams from sensors and actuators are converted to generalized output for processing in the ECM Appliance for transmission to one or a plurality of sites selected from the group consisting of regional and central sites for processing and reporting is carried out by a component selected from the group consisting of PROM, EPROM, EEPROM, FPGA, and ASIC connected to the appliance in a manner selected from the group consisting of plugged-into and integrated-directly with the printed circuit board of the appliance.

7. The appliance device of claim 1 where the location of the ECM Appliance device is selected from the group of fixed, mobile, vehicle mounted, and body worn.

8. The appliance device of claim 1 where the appliance is virtually implemented on one or a plurality of devices selected from the group consisting of desktop computer, laptop computer, server, smartphone, and IoT device.

9. The appliance device of claim 1 where the IO devices are selected from the group consisting of accelerometer, location, compass heading, weight, magnetometer, radiation level, wind speed, fingerprint identification, facial identification, imaging, proximity, gyroscope, motion, gravity, fluid level, orientation, chemical characteristics, Radar, Lidar, moisture, humidity, vapor pressure, temperature, pressure, barometric pressure, keyboard, switches, microphone, sound, annunciator, speaker, light, RFID reader, motor, RF transmitter, electrical stimulation, ultrasound stimulation, and valve.

10. The appliance device of claim 1 where the IO configurations are selected from the group consisting of including one or a plurality of aggregators and not including one or a plurality of aggregators are selected from the group consisting of wired or wireless connection to an ECM Appliance, where the one or a plurality of IO devices are connected to an ECM Appliance that is plugged into the printed circuit board containing the IO devices and where the one or a plurality of IO devices are connected to an ECM Appliance that is directly integrated into the printed circuit board containing the IO devices.

11. The appliance device of claim 1 where set of ECM Appliances configured in a cluster are interfaced among each other constituting their own secure constellation protected from the outside world and interacting with controlled secure interactions with outside world.

12. The appliance device of claim 1 where communications with associated elements are selected from one or plurality of mechanisms selected from the group consisting of wireless, wired, WiFi, cellular, involving satellite communications, NPWAN, LPWAN, RFID, NFC, Bluetooth, Zigbee, Z-Wave, Ultra-Narrowband Modulation, LTE-M, Narrowband IoT, LoRa, SigFox, EC-GSM-IoT, Weightless, and existing equivalent protocols.

13. Appliance device of claim 1 where communications related to one or a plurality of elements are selected from the group consisting of sensors, actuators, local processing, and instruction messages, where the communications are communicated to one or a plurality of destinations selected from the group consisting of another ECM Appliance, sensor aggregator, actuator aggregator, regional server, central server, and ECM central server.

14. The appliance device of claim 1 where one of a plurality of the ECM Appliances interfaced with one or a plurality of elements selected from the group consisting of sensors, actuators, and smart devices connected in a manner selected from the group consisting of wired directly, wireless directly, wired indirectly and wireless indirectly constitute a Body Area Network for one or a plurality of purposes selected from the group consisting of monitoring of health, delivery of therapies, monitoring of performance, and delivery of performance enhancement.

15. The appliance device of claim 1 where the messaging is encrypted by one or a plurality of mechanisms selected from the group consisting of Long Range Wide Area Network (LoRaWAN) network security, a multilevel authentication protocol, any standard IoT security protocol, a blockchain mechanism, and custom security protocol.

16. The appliance device of claim 1 where data are processed based on factors combined from one or a plurality of sources selected from the group consisting of any local elements, interfaced ECM Appliances, interfaced IoT devices, regional servers including incorporated databases, if any, and central servers including incorporated databases, if any, where the source connections can be selected from the group consisting of continuously connected and disconnected after relevant information received.

17. The appliance device of claim 1 where messaging is triggered by mechanism related to downloaded database involving conditions to be detected by application of a technique selected from one or a plurality of the group consisting of measurement using one or a plurality of sensors selected from the group consisting of GPS, RFID tag reader, beacon, accelerometer, pressure, weight, camera, electrical variable, magnetic variable, physical variable, physiological variable, result of calculation, result of AI, and time detected selected from the group consisting of fixed and episodic with condition satisfied by criteria stated in criteria selected from the group consisting of downloaded from a database and developed within the associated network, triggering one or a plurality of messages of type selected from the group consisting of text, e-mail, audio, telephone, vibration, light, and instructions to one or a plurality of networked devices, to be delivered to one or a plurality of targets having a need to know selected from person and system where messaging may be used for one or a plurality of purposes selected from prompting a person to take action, prompting a person to pay attention, instructing a device to perform a given action, and instructing a system to perform a given action.

18. The appliance device of claim 1 where actionable ECMs are replied to with instructions to catalyze actions to modify the behavior of that appliance and attached system elements including one or a plurality of actions selected from the group consisting of confirming suggested candidate actions, overriding suggested candidate actions, substituting for suggested candidate actions, setting specified variable values, providing specific instructions, asking another user to weigh in, and asking a system to weigh in where the actionable messages are replied to using a mechanism selected from the group consisting of being displayed on a software interface that includes the capability of one or a plurality of actors selected from the group consisting of user or agent acting on behalf of the user and automated agent and the response type optionally including instructions, is selected from the group consisting of response to sender and forwarding to one or a plurality of others.

19. The appliance device of claim 1 where one or a plurality of ECM Appliances in connection with one or a plurality of mechanisms selected from the group consisting of calculation, logic, calculation and logic, AI applied using one or a plurality of the mechanisms selected from the group consisting of Machine Learning, Deep Learning, Adaptive Learning, Federated Learning, Knowledge-Based Systems, Model-Based Reasoning, Rule-Based Reasoning, Case-Based Reasoning, Large Language Models including those tailored to a specific domain or subdomain, Generative AI, Retrieval-Augmented Generation, ChatBots including input prompts from any AI modality, Fuzzy-Logic Reasoning, Cognitive Computing, including a hybrid approach through application of one or more of a plurality of mechanisms selected from the group consisting of determined priorities and voting among outputs located in one or a plurality of locations selected from the group consisting of local, edge, regional (fog computing), and central (cloud computing) where, if located locally, the database contents come from one of a plurality of sources selected from the group consisting of downloaded and plug-in module, communicated through one or more of a plurality mechanisms selected from the group consisting of generally accessible and specialized portals.

20. The appliance device of claim 1 where AI elements are applied for one or a plurality purposes selected from the group consisting of balancing loads, adjusting processing times, semantic filtering, scheduling, predictive maintenance, home automation, facility automation, system configuration, automation of smart cities, diagnosis, monitoring, congestion reduction, and process automation.

21. The appliance device of claim 1 where any incorporated AI vehicle selected from the group consisting of individual vehicle and Hybrid AI integrator generate an explanation for its conclusions.

22. The appliance device of claim 1 where one or a plurality of entities involved with AI are selected from the group consisting of ECM appliance, plurality of ECM appliances, networked IoT device, plurality of networked IoT devices, networked smart device, plurality of networked smart devices, networked server, plurality of networked servers, computer of any type, and plurality of computers of all types are incorporated in a Hybrid AI Backbone.

23. The appliance device of claim 1 in which the output of a Hybrid AI Integrator resulting from the inputs of multiple AI elements that are used to develop one or a plurality of conclusions resulting from their inputs selected from the group consisting of natural language, specialized data set, mathematical formulation, and table where generation of conclusions can occur by application of a Large Language Model with output including elements selected from the group selected from natural language, data set, mathematical formulation, and table including the ability to generate a combined summary statement.

24. The appliance device of claim 1 where a processing configuration consisting of one or a plurality of elements selected from the group consisting of one ECM Appliance device, a cluster of ECM Appliance devices, servers and other IoT devices services an incoming message with the highest relevance selected from the group consisting of message level, history of message processing, designated function, and determined by AI processing.

25. The appliance device of claim 1 where one or a plurality of triggering actions are selected from one or a plurality of the group consisting of initiation and provision of input are selected from the group consisting of conditions occurring in the associated ECM Appliance, conditions occurring in the overall network, episodic times in a local or server database, fixed times in a local or service database, determined by AI, generated prompts, replies to ECMs made by entities selected from the group consisting of human user and system.

26. The appliance device of claim 1 where one or a plurality of messages output whose content is selected from the group consisting of status, comments, instructions including actions to be taken and conditions to look out for, and paired elements to be tracked are selected from the group consisting of audio reminders, audio prompts, text messages, e-mail messages, phone calls, and delivered to IO devices with communications vehicle selected from the group consisting of wired, Bluetooth, and wireless with output targets selected from the group consisting of sensor, actuator, robot, other ECM Appliance, other computer, other IoT device, and server including communications via a web server implemented on the ECM Appliance where message elements selected from the group consisting of message content and message targets are determined by one or a plurality of mechanisms selected from the group consisting of predetermined, determined by situation, determined by human, or AI.

27. The appliance device of claim 1 where ECMs are sent in a cascaded fashion where messages to target addresses at one level in the message hierarchy are forwarded to target addresses, which may be a group, to the next lower level in the message hierarchy determined by the forwarding instructions contained within a given level such that the message senders at a higher level will not know the target addresses generated from a lower level in the message hierarchy unless copies are sent to the initiating messaging element at one or more levels above in the messaging hierarchy where the messaging elements associated with any level of the message hierarchy are selected from one or a plurality of the group consisting of message content, response to message content, addressees, and target response addresses are generated by AI.

28. The appliance device of claim 1 where one or a plurality of the ECM Appliances utilizing elements selected from the group consisting of devices and systems act in a manner selected from the group consisting of individually and as a hub to integrate information performs allowing those with a need to know to deal with one or more functions selected from the group consisting of status, comments, instructions, and actions to be taken are applied to environments selected from the group consisting of home, facility, health, human medicine, veterinary medicine, industry, vehicles, retail, agriculture, manufacturing including robots, warehouses including robots, distribution, transportation recreation, and other controlled environment for one or a plurality of purposes selected from the group consisting of monitoring, process control, resource management selected from the group of conservation and balancing of resources selected from the group consisting of water, air, energy, money, time, yield management, capacity monitoring, capacity management, diagnostics, point-of-care treatment, physiological monitoring, physiological control, acting as an integrating hub for new information as it evolves, training, generating training for AI vehicles, answering questions, automation of any type, configuration, synthesis of input data, analysis of output, implementation of digital twins, and exercise of digital twins where whether messaging output to other systems selected from the group consisting of byproduct of operational messaging and not a product of operational messaging.

29. The appliance device of claim 1 where for a falling/tipping application an interfaced accelerometer sensing is utilized to detect conditions selected from the group consisting of detecting an incipient fall by a human and detecting tipping of a package load and issuing a preemptive warning message or detecting an actual human fall or tipping over a package and issuing a notification message, for a proximity-determination application an interfaced device selected from the group consisting of an RFID tag reader, imaging device, camera, Radar, Lidar, or other applicable device interfaced to an ECM Appliance is used to detect when an entity selected from the group consisting of human, animal, object, or robot is in proximity and the detection is followed by one of a plurality of actions selected from the group of issuing of a preemptive warning, providing additional information, suggesting actions, answering questions, analyzing data, and messaging those with a need to know, and for a query-response applications answering questions using Retrieval-Augmented Generation combining information from one or a plurality of sources selected from the group consisting of databases, files, scraped web pages, user inputs, and explicit statements, with that contained in a language model selected from the group consisting of small, medium, and large.

* * * * *